United States Patent
Yang et al.

(10) Patent No.: US 11,868,725 B2
(45) Date of Patent: Jan. 9, 2024

(54) SERVER, CLIENT DEVICE, AND OPERATION METHODS THEREOF FOR TRAINING NATURAL LANGUAGE UNDERSTANDING MODEL

(71) Applicant: SAMSUNG ELECTRONICS CO., LTD., Suwon-si (KR)

(72) Inventors: Hejung Yang, Suwon-si (KR); Kwangyoun Kim, Suwon-si (KR); Sungsoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 307 days.

(21) Appl. No.: 17/140,619

(22) Filed: Jan. 4, 2021

(65) Prior Publication Data
US 2021/0209304 A1 Jul. 8, 2021

Related U.S. Application Data

(60) Provisional application No. 62/956,500, filed on Jan. 2, 2020.

(30) Foreign Application Priority Data

Feb. 18, 2020 (KR) .................. 10-2020-0019989

(51) Int. Cl.
*G10L 15/187* (2013.01)
*G06F 40/295* (2020.01)
*G10L 13/00* (2006.01)

(52) U.S. Cl.
CPC ............ *G06F 40/295* (2020.01); *G10L 13/00* (2013.01); *G10L 15/187* (2013.01)

(58) Field of Classification Search
CPC .... G06F 40/295; G06F 40/205; G06F 40/242; G06F 40/268; G06F 40/279; G06F 40/30; G10L 13/00; G10L 15/187; G10L 15/26
See application file for complete search history.

(56) References Cited

U.S. PATENT DOCUMENTS 7,302,389 B2 * 11/2007 Gupta .................... G09B 19/06
704/250
9,311,298 B2   4/2016 Sarikaya et al.
(Continued)

FOREIGN PATENT DOCUMENTS

JP   2015-118354 A   6/2015
JP   2016-188944 A   11/2016
(Continued)

OTHER PUBLICATIONS

International Search Report (PCT/ISA/210) and Written Opinion (PCT/ISA/237) issued by the International Searching Authority in International Application No. PCT/KR2020/019445, dated Apr. 8, 2021.

(Continued)

*Primary Examiner* — Abdelali Serrou
(74) *Attorney, Agent, or Firm* — Sughrue Mion, PLLC

(57) ABSTRACT

Provided are a server, a client device, and operation methods thereof for training a language model. The server, the client device, and the operation methods thereof identify a word or phrase including a named entity that is incorrectly pronounced by a user or is difficult for the user to accurately pronounce from an input text for use in training a natural language understanding (NLU) model, generate text candidates for use in training the NLU model by replacing the identified word or phrase with a word or phrase predicted to be uttered by the user and having high phonetic similarity to the identified word or phrase, and train the NLU model by using the generated text candidates.

15 Claims, 23 Drawing Sheets

(56) References Cited

U.S. PATENT DOCUMENTS

| | | | |
|---|---|---|---|
| 10,163,436 B1 | 12/2018 | Slifka et al. | |
| 11,501,764 B2* | 11/2022 | Bromand | G10L 15/22 |
| 2005/0182628 A1 | 8/2005 | Choi | |
| 2012/0109649 A1* | 5/2012 | Talwar | G10L 15/08 |
| | | | 704/E15.001 |
| 2016/0124970 A1* | 5/2016 | Hwang | G06F 3/04886 |
| | | | 707/767 |
| 2017/0060848 A1* | 3/2017 | Liu | G06F 40/295 |
| 2018/0068661 A1* | 3/2018 | Printz | G06F 40/295 |
| 2018/0314689 A1* | 11/2018 | Wang | G10L 15/1822 |
| 2019/0130904 A1 | 5/2019 | Homma et al. | |
| 2019/0267007 A1* | 8/2019 | Sankoda | G10L 15/22 |
| 2019/0378509 A1 | 12/2019 | Chae | |
| 2020/0020319 A1* | 1/2020 | Malhotra | G10L 15/26 |
| 2020/0020320 A1* | 1/2020 | Lee | G10L 15/187 |

FOREIGN PATENT DOCUMENTS

| | | |
|---|---|---|
| KR | 10-1971513 B1 | 4/2019 |
| KR | 10-2267561 B1 | 6/2021 |

OTHER PUBLICATIONS

Snipsco "Key Concepts & Data Model" retrieved from https://snips-nlu.readthedocs.io/en/latest/data_model.html , 2018, (10 pages total).

* cited by examiner

SERVER, CLIENT DEVICE, AND OPERATION METHODS THEREOF FOR TRAINING NATURAL LANGUAGE UNDERSTANDING MODEL

CROSS-REFERENCE TO RELATED APPLICATIONS

This application is based on and claims the benefit of U.S. Provisional Application No. 62/956,500, filed on Jan. 2, 2020, in the U.S. Patent and Trademark Office, and is based on and claims priority under 35 U.S.C. § 119 to Korean Patent Application No. 10-2020-0019989, filed on Feb. 18, 2020, in the Korean Intellectual Property Office, the disclosures of which are incorporated by reference herein in their entireties.

BACKGROUND

1. Field

The disclosure relates to a server, a client device, and operation methods thereof for training a natural language understanding (NLU) model.

2. Description of the Related Art

With the development of multimedia technology and networking technology, users have been able to receive various services by using devices. In particular, with the development of speech recognition technology, users have been able to input voice (for example, utterance) to a device and receive a response message according to the voice input through a voice service providing agent.

A user's intention included in the voice input of the user may be ascertained by utilizing artificial intelligence (AI) technology or by utilizing rule-based natural language understanding (NLU). When a device or a server receives a voice input of a user and performs automatic speech recognition (ASR) on the received voice input, mismatch may occur between a result of the ASR and a text input to an NLU model. In this case, the device or server fails to ascertain an accurate utterance intention. In related art NLU technology, when a user utters a named entity, a place, a region name, a movie title, or a game title with an incorrect pronunciation or incorrectly utters the named entity, the place, the region name, the movie title, or the game title due to not clearly knowing the same, the output text of ASR does not match with text pre-trained through an NLU model. Similarly, when the user clearly pronounces the named entity, the place, the region name, the movie title, or the game title but an output text of ASR is incorrect due to the ASR model not being trained to recognize the named entity, the place, the region name, the movie title, or the game title uttered by the user, the output text of ASR does not match with text pre-trained through an NLU model. In NLU technology according to the related art, because ASR output text and text of the NLU model do not match each other, an appropriate response according to a user's intention may not be provided.

SUMMARY

Provided are a server, a client device, and operation methods thereof for identifying a word or phrase including a named entity incorrectly pronounced by a user or difficult to be accurately pronounced by the user and an entity name highly likely to have an error when being converted to a text through automatic speech recognition (ASR), from an input text for use in training a natural language understanding (NLU) model, generating text candidates for use in training the NLU model by replacing the identified word or phrase with a word or phrase predicted to be uttered by the user and having a high phonetic similarity to the identified word or phrase, and training the NLU model by using the generated text candidates.

Additional aspects will be set forth in part in the description which follows and, in part, will be apparent from the description, or may be learned by practice of the presented embodiments.

In accordance with an aspect of the disclosure, a method, performed by a server, of training a language model by using a text, includes: receiving, from a client device, an input text input by a user; identifying a replacement target text to be replaced from among one or more words included in the input text; generating a replacement text that is predicted to be uttered for the identified replacement target text by the user and has a phonetic similarity with the identified replacement target text; generating one or more training text candidates by replacing, within the input text, the replacement target text with the generated replacement text; and training a natural language understanding (NLU) model by using the input text and the one or more training text candidates as training data.

The identifying the replacement target text may include: receiving, from the client device, a user input of selecting at least one word or phrase from the input text; identifying, from the input text, the selected at least one word or phrase; and determining the identified at least one word or phrase as the replacement target text.

The identifying the replacement target text may include: parsing the received input text in units of words, morphemes, and phrases; searching for at least one parsed word in a dictionary database (DB) including phoneme sequence information about a plurality of words or information about an embedding vector; and determining, based on a result of the searching the dictionary DB, a word not found in the dictionary DB or having a lower use frequency than a preset threshold as the replacement target text.

The identifying the replacement target text may include: detecting a domain into which the input text is classified, by interpreting the input text by using a pre-trained NLU model; detecting an intent from the input text by interpreting the input text by using the pre-trained NLU model; identifying a slot from the input text by interpreting the input text by using the pre-trained NLU model, and performing slot tagging; and determining a text corresponding to the identified slot as the replacement target text.

The generating the one or more training text candidates may include determining the generated replacement text to have a same slot as the slot identified from the input text.

The generating the replacement text may include: extracting a phoneme sequence for the replacement target text; searching, from among words pre-stored in a dictionary DB, for a text having a similar phoneme sequence to the extracted phoneme sequence, based on phonetic relevance of phoneme sequences; and generating the replacement text by using at least one text having a high similarity to the extracted phoneme sequence, based on a result of the searching.

The generating the replacement text may include: converting the replacement target text into an embedding vector by using a word embedding model; generating a text having a similar vector value to the embedding vector, by using a neural network model; and generating, based on the generated text, the replacement text.

The generating the replacement text may include: converting the replacement target text into a wave signal by using a text-to-speech (TTS) model; outputting the wave signal; converting the wave signal into an output text by using an automatic speech recognition (ASR) model; and generating the replacement text by replacing the replacement target text based on the output text.

The training the NLU model may include: transmitting the input text and the one or more training text candidates to the client device; receiving, from the client device, an identification (ID) value of at least one text selected, according to a user input, from among the input text and the one or more training text candidates; selecting, based on the received ID value, at least one text from the input text and the one or more training text candidates; and training the NLU model by using the selected at least one text as training data.

In accordance with another aspect of the disclosure, a method, performed by a client device, of providing an application for training a language model, includes: displaying, on a display of the client device, a first graphical user interface (GUI) for receiving a first user input of inputting an input text for training the language model; transmitting the input text to a server; displaying a second GUI for receiving a second user input, by a user, of selecting at least one from among one or more replacement target texts identified from the input text; receiving, from the server, one or more training text candidates generated by replacing the selected at least one replacement target text with a text predicted to be uttered by the user; and displaying a third GUI for receiving a third user input of selecting at least one from among the one or more training text candidates.

The method may further include displaying a fourth GUI for receiving a fourth user input of selecting at least one of pieces of context information that is considered to generate the replacement text, the context information including at least one of an age, a gender, a region, a used language, or a dialect of the user.

In accordance with another aspect of the disclosure, a server for training a language model by using a text, includes: a communication interface configured to perform data communication with a client device; a memory storing a program including one or more instructions; and a processor configured to execute the stored one or more instructions to: receive, from the client device through the communication interface, an input text input by a user, identify a replacement target text to be replaced from among one or more words included in the input text, generate a replacement text that is predicted to be uttered for the identified replacement target text by the user and has a phonetic similarity with the identified replacement target text, generate one or more training text candidates by replacing, within the input text, the replacement target text with the generated replacement text, and train a natural language understanding (NLU) model by using the input text and the one or more training text candidates as training data.

The processor may be further configured to execute the stored one or more instructions to: receive, from the client device through the communication interface, a user input of selecting at least one word or phrase from the input text; identify, from the input text, the selected at least one word or phrase, and determine the identified at least one word or phrase as the replacement target text.

The memory may store a dictionary database (DB) including phoneme sequence information about a plurality of words or information about an embedding vector; and the processor may be further configured to execute the stored one or more instructions to: parse the received input text in units of words, morphemes, and phrases and search for at least one parsed word in the dictionary DB, and determine, as the replacement target text, a word not found in the dictionary DB or having a lower use frequency than a preset threshold.

The memory may store at least one pre-trained NLU model; and the processor may be further configured to execute the stored one or more instructions to: detect a domain, into which the input text is classified, and an intent by interpreting the input text by using an NLU model from among the at least one pre-trained NLU model stored in the memory, identify a slot from the input text by interpreting the input text by using the pre-trained NLU model, and perform slot tagging, and determine a text corresponding to the identified slot as the replacement target text.

The processor may be further configured to execute the stored one or more instructions to: extract a phoneme sequence for the replacement target text, and search, from among words included in a dictionary DB stored in the memory, for a text having a similar phoneme sequence to the extracted phoneme sequence, based on phonetic relevance of phoneme sequences; and generate the replacement text by using at least one text having a high similarity to the extracted phoneme sequence, based on a result of the searching.

The memory may store a word embedding model; and the processor may be further configured to execute the stored one or more instructions to: convert the replacement target text into an embedding vector by using the word embedding model, generate a text having a similar vector value to the embedding vector, by using a neural network model, and generate, based on the generated text, the replacement text.

The memory may store a text-to-speech (TTS) model configured to convert a text into a wave signal; and the processor may be further configured to execute the stored one or more instructions to: convert the replacement target text into a wave signal by using the TTS model, output the wave signal, and convert the wave signal into an output text by using an automatic speech recognition (ASR) model stored in the memory, and generate the replacement text by replacing the replacement target text based on the output text.

The processor may be further configured to execute the stored one or more instructions to: transmit the input text and the one or more training text candidates to the client device by using the communication interface, and receive, from the client device, an identification (ID) value of at least one text selected, according to a user input, from among the input text and the one or more training text candidates; select, based on the received ID value, at least one text from the input text and the one or more training text candidates; and train the NLU model by using the selected at least one text as training data.

In accordance with another aspect of the disclosure, a client device for providing an application for training a language model, includes: a display; a communication interface configured to perform data communication with a server; a memory storing a program including one or more instructions; and a processor configured to execute the stored one or more instructions to: control the display to display a first graphical user interface (GUI) for receiving a first user input of inputting an input text, control the display to display a second GUI for receiving a second user input, by a user, of selecting at least one from among one or more replacement target texts identified from the input text, control the communication interface to receive, from the server, one or more training text candidates generated by replacing the selected at least one replacement target text with a text predicted to be uttered by the user, and control the display to display a third GUI for receiving a third user input of selecting at least one from among the one or more training text candidates.

The processor may be further configured to execute the stored one or more instructions to control the display to display a fourth GUI for receiving a fourth user input of selecting at least one of pieces of context information that is considered to generate the replacement text, the context information including at least one of an age, a gender, a region, a used language, or a dialect of the user.

In accordance with another aspect of the disclosure, a non-transitory computer-readable recording medium has recorded thereon a computer program, which, when executed by a computer, performs the method of the server.

In accordance with another aspect of the disclosure, a non-transitory computer-readable recording medium has recorded thereon a computer program, which, when executed by a computer, performs the method of the client device.

In accordance with another aspect of the disclosure, an apparatus for training a language model by using a text, includes: a memory storing a program includes one or more instructions; and a processor configured to execute the stored one or more instructions to: obtain a text, identify a replacement target text to be replaced from among one or more words included in the text, obtain a replacement text that has a phonetic similarity with the identified replacement target text, obtain one or more training text candidates by replacing, within the text, the replacement target text with the obtained replacement text, and train a natural language understanding (NLU) model by using the text and the one or more training text candidates as training data.

The processor may be further configured to execute the stored one or more instructions to: receive, from a client device through a communication interface, a user input of selecting at least one word or phrase from the text; identify, from the text, the selected at least one word or phrase; and determine the identified at least one word or phrase as the replacement target text.

The memory may store a dictionary database (DB) including phoneme sequence information about a plurality of words or information about an embedding vector; and the processor may be further configured to execute the stored one or more instructions to: parse the text in units of words, morphemes, and phrases and search for at least one parsed word in the dictionary DB, and determine, as the replacement target text, a word not found in the dictionary DB or having a lower use frequency than a preset threshold.

The memory may store at least one pre-trained NLU model; and the processor may be further configured to execute the stored one or more instructions to: detect a domain, into which the text is classified, and an intent by interpreting the text by using an NLU model from among the at least one pre-trained NLU model stored in the memory, identify a slot from the text by interpreting the text by using the pre-trained NLU model, and perform slot tagging, and determine a text corresponding to the identified slot as the replacement target text.

The processor may be further configured to execute the stored one or more instructions to: extract a phoneme sequence for the replacement target text, and search, from among words included in a dictionary DB stored in the memory, for a text having a similar phoneme sequence to the extracted phoneme sequence, based on phonetic relevance of phoneme sequences; and generate the replacement text by using at least one text having a high similarity to the extracted phoneme sequence, based on a result of the searching.

The memory may store a word embedding model; and the processor may be further configured to execute the stored one or more instructions to: convert the replacement target text into an embedding vector by using the word embedding model, generate a text having a similar vector value to the embedding vector, by using a neural network model, and generate, based on the generated text, the replacement text.

The memory may store a text-to-speech (TTS) model configured to convert a text into a wave signal; and the processor may be further configured to execute the stored one or more instructions to: convert the replacement target text into a wave signal by using the TTS model, output the wave signal, and convert the wave signal into an output text by using an automatic speech recognition (ASR) model stored in the memory, and generate the replacement text by replacing the replacement target text based on the output text.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
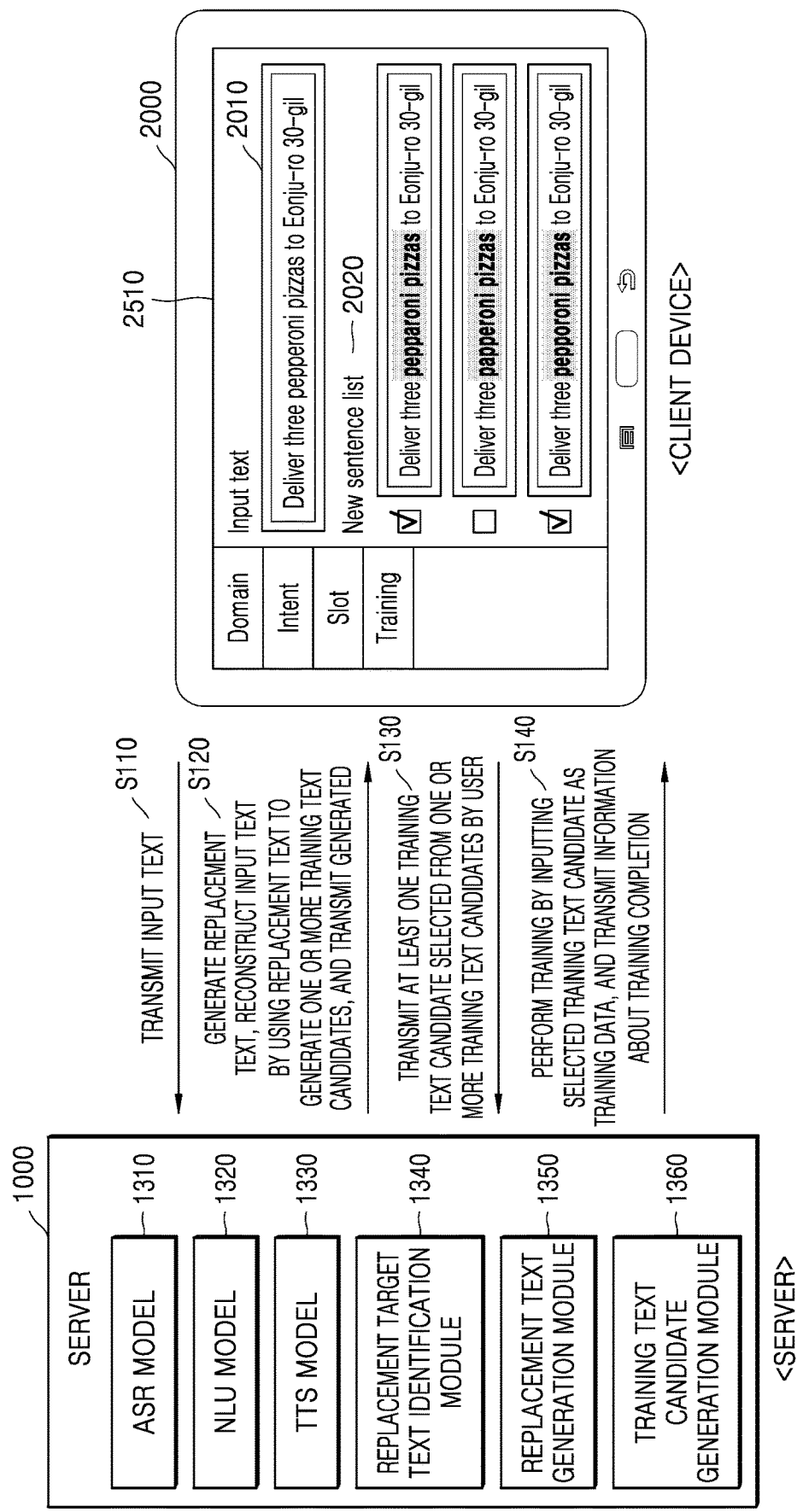
FIG. 1 is a conceptual diagram illustrating operations performed by a server and a client device according to an embodiment, to train a language model.

Although general terms widely used at present were selected for describing the disclosure in consideration of the functions thereof, these general terms may vary according to intentions of one of ordinary skill in the art, case precedents, the advent of new technologies, or the like.

An expression used in the singular may encompass the expression of the plural, unless it has a clearly different meaning in the context. Unless otherwise defined, all terms (including technical and scientific terms) used herein have the same meaning as commonly understood by one of ordinary skill in the art to which this disclosure belongs.

The terms "comprises" and/or "comprising" or "includes" and/or "including" when used in this specification, specify the presence of stated elements, but do not preclude the presence or addition of one or more other elements. The terms "unit", "-er (-or)", and "module" when used in this specification refers to a unit in which at least one function or operation is performed, and may be implemented as hardware, software, or a combination of hardware and software.

Throughout the disclosure, expressions such as "at least one of a, b [and/or] c" indicates only a, only b, only c, both a and b, both a and c, both b and c, all of a, b, and c, or variations thereof.

The expression "configured to" or "set to" used in the disclosure may be used interchangeably with, for example, "suitable for", "having the capacity to", "designed to", "adapted to", "made to", or "capable of", according to situations. The expression "configured to" or "set to" may not only necessarily refer to "specifically designed to" in terms of hardware. Instead, in some situations, the expression "device configured to" may refer to a situation in which the device is "capable of" together with another device or parts. For example, the phrase "a processor configured (or set) to perform A, B, and C" may mean a dedicated processor (such as an embedded processor) for performing a corresponding operation, or a generic-purpose processor (such as a central processing unit (CPU) or an application processor (AP)) that can perform a corresponding operation by executing one or more software programs stored in a memory device.

In the disclosure, a natural language understanding (NLU) model is a model trained to obtain a domain and an intent corresponding to a text converted from a speech signal by interpreting the text. The NLU model can identify information about a slot as well as the domain and the intent by interpreting the text.

In the disclosure, the NLU model may be referred to as a 'language model', a 'language understanding model', a 'natural language understanding model', a 'natural language processing model', a 'language processing model', and a 'language understanding technology model'.

In the disclosure, a 'domain' is a category or region associated with a user's intention identified by interpreting a text. The domain may be detected by interpreting the text using an NLU model. The domain may be associated with an intent detected from the text by using an NLU model. According to an embodiment, domains may be classified according to services associated with texts. The domains may include categories corresponding to texts, for example, one or more regions, such as a movie domain, a music domain, a book domain, a game domain, an airline domain, and a food domain.

In the disclosure, an 'intent' is information indicating the intention of a user determined by interpreting a text. The intent is information indicating an utterance intention of the user, and may include information indicating an operation or function that the user intends to execute by using a device. The intent may be determined by interpreting the text using an NLU model. For example, when a text translated from a user's voice input is "Search for the release date of the movie Avengers Endgame", the domain may be "movie" and the intent may be "movie search". The intent may include an intent action and an intent object.

The intent may include not only information indicating a user's utterance intention (hereinafter, intention information), but also a numerical value corresponding to the information indicating the user's intention. The numerical value may indicate a probability that the text is associated with information indicating a specific intention. When a plurality of pieces of information indicating a user's intention are obtained as a result of interpreting the text by using the NLU model, intention information having a maximum numerical value may be determined as the intent.

In the disclosure, a 'slot' refers to variable information for obtaining detailed information related to an intent or determining a detailed operation. The slot is information related to the intent, and a plurality of types of slots may correspond to one intent. The slot may include a numerical value indicating the probability that the text is associated with the variable information. According to an embodiment, a plurality of pieces of variable information indicating a slot may be obtained as a result of interpreting a text by using an NLU model. In this case, variable information having a maximum numerical value from among the numerical values corresponding to the plurality of pieces of variable information may be determined as a slot. For example, when the text is "Search for the release date of the movie Avengers Endgame", the slots obtained from the text may be "movie title (Avengers Endgame)" and "movie release date".

The domain, the intent, and the slot may be automatically identified or detected using an NLU model, but embodiments are not limited thereto. According to an embodiment, for example, a domain, an intent, and a slot may be manually designated or determined respectively by a user input made through a client device.

FIG. 1 is a conceptual diagram illustrating operations performed by a server 1000 and a client device 2000 according to an embodiment, to train a language model. The server 1000 and the client device 2000 may perform operations for training an NLU model.

Referring to FIG. 1, the server 1000 may transmit or receive data to or from the client device 2000 through a wired or wireless communication method.

The client device 2000 may be a computing device that provides a developer software tool for training an NLU model. Examples of the client device 2000 may include, but are not limited to, a smartphone, a tablet personal computer (PC), a PC, a laptop computer, a workstation, a server device, a smart television (TV), a mobile phone, a personal digital assistant (PDA), a media player, a global positioning system (GPS) device, an electronic book terminal, a digital broadcasting terminal, a navigation device, a kiosk, an MP3 player, a digital camera, home appliances, and other mobile or non-mobile computing devices.

The developer software tool provided by the client device 2000 may receive an input text through an application, and may display on a display 2510 one or more training text candidates generated with respect the input text by the server 1000 through an interaction with the server 1000. The one or more training text candidates are generated by the server 1000 by replacing a word or phrase of the input text with a word or phrase having a similar pronunciation or similar phoneme sequence predicted to be uttered by a user who uses a voice assistant function. The one or more training text candidates may be input data that is used to train an NLU model 1320. The NLU model 1320 may be an NLU model pre-trained according to a specific domain, but embodiments are not limited thereto.

The server 1000 may receive an input text from the client device 2000, generate one or more training text candidates for the received input text, and train the NLU model 1320 by inputting the input text and the generated one or more training text candidates as training data. The server 1000 may update the pre-trained NLU model 1320 or generate a new NLU model, by using the input text and the one or more training text candidates as the training data. According to an embodiment, the server 1000 may include an automatic speech recognition (ASR) model 1310, the NLU model 1320, a text-to-speech (TTS) model 1330, a replacement target text identification module 1340, a replacement text generation module 1350, and a training text candidate generation module 1360.

Data transmission and reception between the server 1000 and the client device 2000 will now be described.

In operation S110, the client device 2000 receives the input text from the user and transmits the input text to the server 1000. According to an embodiment, the client device 2000 may display a first graphical user interface (GUI) 2010 for receiving the input text on the display 2510, and receive the input text through the first GUI 2010.

In operation S120, the server 1000 generates a replacement text, reconstructs the input text by using the replacement text to generate one or more training text candidates, and transmits the generated one or more training text candidates to the client device 2000. According to an embodiment, the server 1000 may identify a replacement target text to be replaced from the input text, by using data and a program code of the replacement target text identification module 1340. According to an embodiment, the server 1000 may generate a replacement text that is predicted to be uttered for the identified replacement target text by the user and has a high phonetic similarity to the identified replacement target, by using data and a program code of the replacement text generation module 1350. According to an embodiment, the server 1000 may generate a training text candidate that is input to train the NLU model 1320, by replacing the replacement target text identified from the input text with the replacement text, by using data and a program code of the training text candidate generation module 1360.

For example, when the input text input by the user through the client device 2000 is "Deliver three pepperoni pizzas to Eonju-ro 30-gil", the server 1000 may identify 'pepperoni' as the replacement target text, generates 'pepperoni', 'pepperoni', and 'pepperoni' that are predicted to be uttered for 'pepperoni' by the user and have similar phoneme sequences to 'pepperoni', as replacement texts, and generates training text candidates of "Deliver three papparoni pizzas to Eonju-ro 30-gil", "Deliver three papperoni pizzas to Eonju-ro 30-gil", and "Deliver three pepporoni pizzas to Eonju-ro 30-gil" by replacing the replacement target text with the replacement texts.

In the embodiment of FIG. 1, only 'pepperoni' has been described as being identified as a replacement target text from the input text. It is understood, however, that embodiments are not limited thereto. According to an embodiment, the server 1000 may identify a plurality of replacement target texts from the input text, by using the data and the program code of the replacement target text identification module 1340. For example, the server 1000 may identify 'Eonju-ro 30-gil', which is a slot indicating an address, as the replacement target text, from the input text of "Deliver three pepperoni pizzas to Eonju-ro 30-gil". When 'Eonju-ro 30-gil' is identified as the replacement target text, the server 1000 may generate 'Anju-ro 30-gil', 'Unju-ro 30-gil', and 'Eonjo-ro 30-gil' predicted to be uttered for 'Eonju-ro 30-gil' by the user and having similar phoneme sequences to 'Eonju-ro 30-gil', as replacement texts, by using the data and the program code of the replacement text generation module 1350. Further, in this case, the server 1000 may generate training text candidates of "Deliver three pepperoni pizzas to Anju-ro 30-gil", "Deliver three pepperoni pizzas to Unju-ro 30-gil", and "Deliver three pepperoni pizzas to Eonjo-ro 30-gil" by replacing the replacement target text with the generated replacement texts.

When a plurality of replacement target texts are identified, the server 1000 may generate a replacement text for each of the identified plurality of replacement target texts. For example, when 'pepperoni', which is a slot indicating a type of pizza topping, and 'Eonju-ro 30-gil', which is a slot indicating an address, are both identified as replacement target texts, the server 1000 may generate respective replacement texts for 'pepperoni' and 'Eonju-ro 30-gil' by using the replacement text generation module 1350. As described above, the server 1000 may generate 'pepperoni', 'pepperoni', and 'pepporoni' as replacement texts for 'pepperoni' and 'Anju-ro 30-gil', 'Unju-ro 30-gil', and 'Eonjo-ro 30-gil' as replacement texts for 'Eonju-ro 30-gil', and may generate training text candidates for replacing the input text, by combining the generated replacement texts.

The server 1000 may transmit the generated one or more training text candidates to the client device 2000.

In operation S130, the client device 2000 receives the one or more training text candidates from the server 1000, and transmits at least one training text candidate selected by the user from among the one or more training text candidates to the server 1000. According to an embodiment, the client device 2000 may display on the display 2510 a second GUI 2020 representing a new sentence list including the one or more training text candidates received from the server 1000. The client device 2000 may receive a user input for selecting at least one from the one or more training text candidates included in the new sentence list through the second GUI 2020, and select at least one training text candidate, based on the received user input.

The client device 2000 may transmit an index or identification (ID) value of the selected at least one training text candidate to the server 1000.

According to an embodiment, the server 1000 may transmit a result (domain, intent and slot information) of training using the input text and the one or more training text candidates to the client device 2000. According to an embodiment, the server 1000 may identify a domain, an intent action, an intent object, and a slot in which the input text and the one or more training text candidates are classified by using the NLU model 1320. According to an embodiment, the server 1000 may automatically perform slot tagging for the slot within the input text and the one or more training text candidates, based on the identified domain, intent action, and intent object.

In operation S140, the server 1000 performs training by inputting the training text candidate selected based on the user input received through the client device 2000 as training data to the NLU model 1320, and transmits information about training completion to the client device 2000. According to an embodiment, the server 1000 may identify a domain into which the input text and the one or more training text candidates are classified, by using the NLU model 1320, and may select an NLU model trained by being specialized for the identified domain from among a plurality of NLU models 1320a through 1320c stored in a memory 1300 of FIG. 2. According to an embodiment, the server 1000 may perform training by inputting the input text and the training text candidate selected from the one or more training text candidates as the training data to the selected NLU model, and may update the NLU model. However, it is understood that embodiments are not limited thereto. For example, according to another embodiment, the server 1000 may generate a new NLU model by using the input text and the one or more training text candidates.

Figure 2:
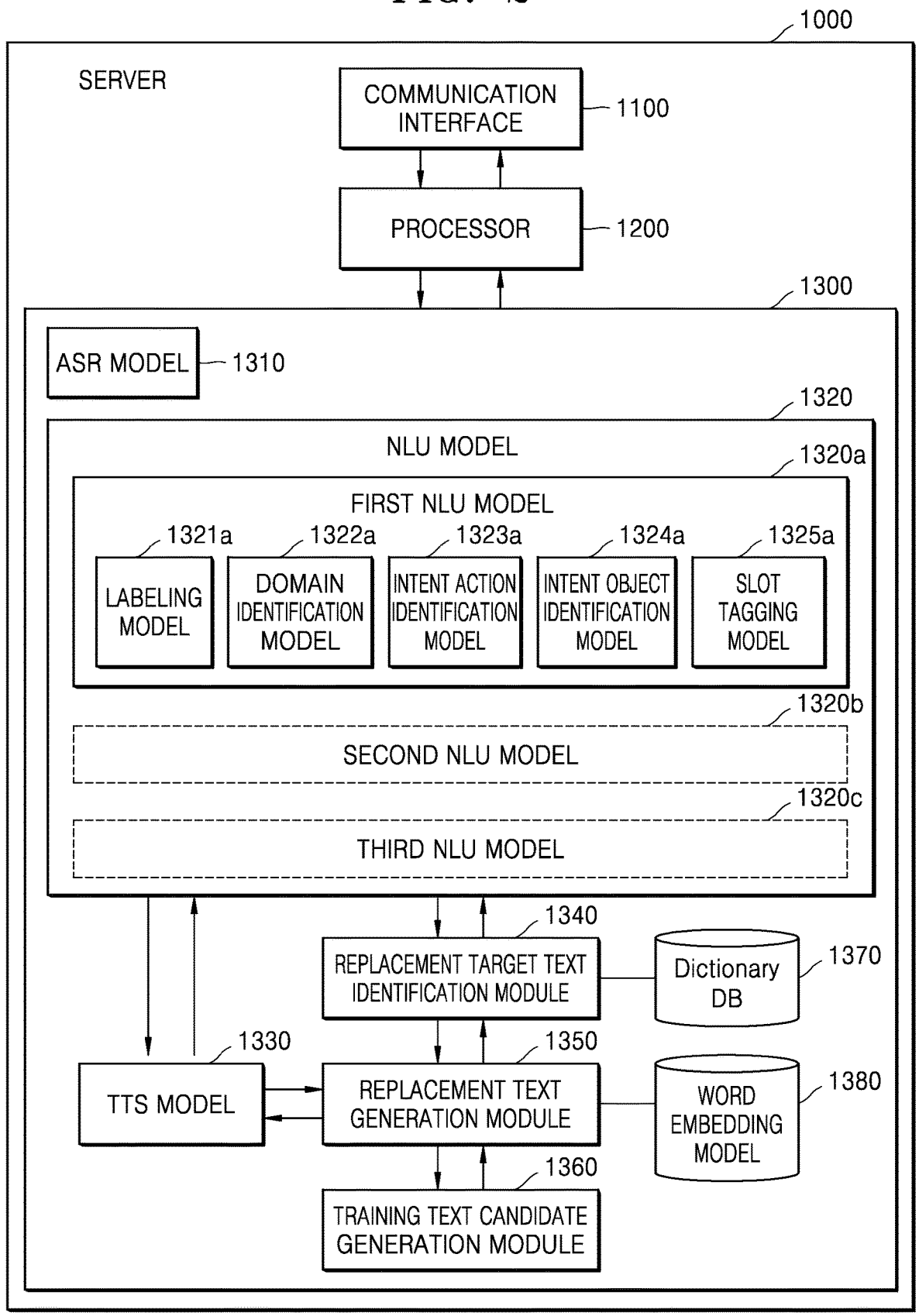
FIG. 2 is a block diagram of a server according to an embodiment.

FIG. 2 is a block diagram of a server 1000 according to an embodiment.

Referring to FIG. 2, the server 1000 may include a communication interface 1100, a processor 1200, and the memory 1300.

The communication interface 1100 may perform data communication with the client device 2000 under the control of the processor 1200. The communication interface 1100 may perform data communication with not only the client device 2000, but also another server. The communication interface 1100 may perform data communication with the client device 2000 or another server by using at least one of data communication methods including, for example, a wired LAN, a wireless LAN, Wi-Fi, Bluetooth, Zigbee, Wi-Fi Direct (WFD), infrared Data Association (IrDA), Bluetooth Low Energy (BLE), near field communication (NFC), wireless broadband Internet (Wibro), World Interoperability for Microwave Access (WiMAX), a shared wireless access protocol (SWAP), wireless gigabit alliance (WiGig), and RF communication.

The processor 1200 may execute one or more instructions of a program stored in the memory 1300. The processor 1200 may be configured with a hardware component that performs arithmetic, logic, and input/output operations and signal processing. The processor 1200 may include, but is not limited to, at least one of, for example, a central processing unit, a microprocessor, a graphic processing unit, application specific integrated circuits (ASICs), digital signal processors (DSPs), digital signal processing devices (DSPDs), programmable logic devices (PLDs), or field programmable gate arrays (FPGAs).

The memory 1300 may include a non-volatile memory including at least one selected from among a flash memory type, a hard disk type, a multimedia card micro type, a card type memory (for example, a secure digital (SD) or extreme digital (XD) memory), a read-only memory (ROM), an electrically erasable programmable ROM (EEPROM), a programmable ROM (PROM), a magnetic memory, a magnetic disk, and an optical disk, and a volatile memory such as a random access memory (RAM) or a static random access memory (SRAM).

The memory 1300 may store instructions, a data structure, and a program code that may be read by the processor 1200. According to an embodiment, the processor 1200 may be implemented by executing instructions or codes of a program stored in the memory. The memory 1300 may store data and program instruction codes corresponding to the ASR model 1310, the NLU model 1320, the TTS model 1330, the replacement target text identification module 1340, the replacement text generation module 1350, the training text candidate generation module 1360, a dictionary database (DB) 1370, and a word embedding model 1380.

The processor 1200 may receive an input text input by a user from the client device 2000 through the communication interface 1100. The input text may be obtained through a typing input via a user input interface 2410 of FIG. 3 of the client device 2000, but embodiments are not limited thereto. For example, according to another embodiment, the input text may be obtained by converting a speech input received through a microphone 2420 of FIG. 3 of the client device 2000 into a text by using the ASR model 1310. In this case, the server 1000 may receive, from the client device 2000, an audio signal into which the speech input has been converted (or generated from the input speech).

According to an embodiment, the processor 1200 may perform ASR by using the data and the instruction code regarding the ASR model 1310, and may convert the audio signal received from the client device 2000 into an input text. The ASR model 1310 is a speech recognition model for recognizing a speech of a user, and may convert the speech input of the user into the input text and may output the input text. The ASR model 1310 may be an artificial intelligence (AI) model including, for example, an acoustic model, a pronunciation dictionary, and a language model. Alternatively, the ASR model 1310 may be an end-to-end ASR model having a structure including an integrated neural network without separately including, for example, an acoustic model, a pronunciation dictionary, and a language model. Because the end-to-end ASR model uses an integrated neural network, the end-to-end ASR model may translate a speech into text without a process of recognizing a phoneme from a speech and then translating the phoneme into text.

The memory 1300 may store a plurality of NLU models 1320. Although only a first NLU model 1320a, a second NLU model 1320b, and a third NLU model 1320c are illustrated in FIG. 2, this illustration is for convenience of explanation. It is understood that the number of NLU models stored in the memory 1300 is not limited to three as shown in FIG. 2. According to another embodiment, for example, the memory 1300 may store only the first NLU model 1320a.

The first through third NLU models 1320a through 1320c may be pre-trained NLU models. Each of the first through third NLU models 1320a through 1320c may be an AI model trained based on a specific domain. For example, the first NLU model 1320*a* may be a model trained using label values (ground truth) about a word or text related to a movie and an intent and a slot specialized for a movie domain, the second NLU model 1320*b* may be a model trained using label values about a word or text related to a game and an intent and a slot specialized for a game domain, and the third NLU model 1320*c* may be a model trained using label values about a word or text related to control of a home appliance and an intent and a slot specialized for a home appliance control domain. It is understood, however, that embodiments are not limited thereto, and at least one of the first through third NLU models 1320*a* through 1320*c* may be a model not specialized for a specific domain and trained using label values of a universal word, a universal text, a universal intent, and a universal slot.

According to an embodiment, the first through third NLU models 1320*a* through 1320*c* may be new NLU models trained using a new domain, a new intent, a new slot, and an input text.

The components of the first through third NLU models 1320*a* through 1320*c* will now be described by focusing on the first NLU model 1320*a*.

The first NLU model 1320*a* may include a labeling model 1321*a*, a domain identification model 1322*a*, an intent action identification model 1323*a*, an intent object identification model 1324*a*, and a slot tagging model 1325*a*. However, these components are exemplary, and the first NLU model 1320*a* according to another embodiment may include only some of the labeling model 1321*a*, the domain identification model 1322*a*, the intent action identification model 1323*a*, the intent object identification model 1324*a*, and the slot tagging model 1325*a* illustrated in FIG. 2.

The labeling model 1321*a* may include data and program codes configured to label information about a domain, an intent, and a slot that are detected from the input text. For example, the labeling model 1321*a* may be used by a user to add his or her own tag to the intent and the slot. The processor 1200 may automatically determine labels about the domain, the intent, and the slot detected from the input text by using the data and the program code of the labeling model 1321*a*.

It is understood, however, that embodiments are not limited thereto, and the processor 1200 may receive information about a domain, an intent, and a slot determined based on a user input for the input text from the client device 2000, by using the communication interface 1100. In this case, the processor 1200 may label the received domain, intent, and slot to the input text by using the data and the program code of the labeling model 1321*a*.

The processor 1200 may allow the user to generate a new domain, a new intent action, a new intent object, and a new slot by using the data and the program code of the labeling model 1321*a*. For example, the labeling model 1321*a* may be used when the user adds an arbitrary tag to an intent and a slot or selects an automatically determined tag. The labeling model 1321*a* may use the domain identification model 1322*a*, the intent action identification model 1323*a*, the intent object identification model 1324*a*, and the slot tagging model 1325*a*.

The domain identification model 1322*a* is used to identify a domain corresponding to the input text by interpreting the input text. The processor 1200 may identify a domain that is category information to or into which the input text may belong or be classified, by interpreting the input text by using the data and the program code of the domain identification model 1322*a*. According to an embodiment, the processor 1200 may identify one domain or a plurality of domains from the input text. According to an embodiment, the processor 1200 may calculate a relationship between the input text and a domain as a numerical value by interpreting the input text by using the domain identification model 1322*a*. According to an embodiment, the domain identification model 1322*a* may be configured to calculate relationships between the input text and one domain or a plurality of domains as probability values and determine a domain having a highest probability value from among the calculated probability values to be a domain into which the input text is classified.

The intent action identification model 1323*a* is configured to predict an intent action from the input text by interpreting the input text. The intent action refers to an action performed by the input text, for example, searching, posting, playing, purchasing, or ordering. The processor 1200 may identify the intent action from the input text by performing syntactic analysis or semantic analysis by using data and a program code of the intent action identification model 1323*a*. According to an embodiment, the processor 1200 may parse the input text in units of morphemes, words, or phrases by using the data and the program code of the intent action identification model 1323*a*, and may infer the meaning of a word or phrase extracted from the parsed input text by using linguistic characteristics (e.g., a syntactic element) of the parsed morpheme, word, or phrase. The processor 1200 may determine an intent action corresponding to the meaning of the inferred word or phrase by comparing the meaning of the inferred word or phrase with pre-defined intents provided by the NLU model.

The intent action identification model 1324*a* is configured to identify an intent object from the input text by interpreting the input text. The intent object refers to an object associated with the identified intent action. The intent object is an object that is a target of the identified intent action, and may refer to, for example, a movie, a picture, sports, a weather, or an airline. The processor 1200 may identify the intent object associated with the intent action from the input text by interpreting the input text, by using data and a program code of the intent object identification model 1324*a*.

The intent action identification model 1323*a* and the intent object identification model 1324*a* may identify the intent action and the intent object, based on a result of training specialized for a specific domain.

For example, when the input text is "Search for the release date of the movie Avengers Endgame", the processor 1200 may interpret the input text by using the intent action identification model 1323*a*, may identify the intent action as 'Search for' as a result of the interpretation, and may detect the intent object as 'Movie' by using the intent object identification model 1324*a*. As another example, when the input text is "Order a pepperoni pizza at Domino's Pizza", the processor 1200 may interpret the input text by using the intent action identification model 1323*a*, identify the intent action as 'Order' as a result of the interpretation, and detect the intent object as 'Food' by using the intent object identification model 1324*a*.

According to an embodiment, the intent action identification model 1323*a* and the intent object identification model 1324*a* may identify the intent action and the intent object, respectively, from the input text, based on a matching model. A relationship between each word or phrase parsed from the input text and an intent action and an intent object may be calculated as a certain numerical value. According to an embodiment, a relationship between a word or phrase of the input text and an intent (the intent action and the intent object) may be calculated as a probability value. According to an embodiment, the processor 1200 may obtain a plurality of numerical values representing the degrees of relationships between words parsed from the input text and pre-stored intention actions, and identify an intent action having a maximum value from among the plurality of numerical values as an intent action for the input text, by applying a matching model of the intent action identification model 1323*a* to the input text. For example, when the input text is "Order 3 pepperoni pizzas from Domino's Pizza", the processor 1200 may calculate the degree of matching between the input text and 'Order' as an intent action as a numerical value of 0.9 and the degree of matching between the input text and 'Search for' as a numerical value of 0.1, by applying the matching model of the intent action identification model 1323*a* to the input text. The processor 1200 may determine an intent action calculated to have a maximum value from among the numerical values to be the intent action associated with the input text, although it is understood that embodiments are not limited thereto. For example, according to another embodiment, the processor 1200 may determine the intent action for the input text, based on a user input of selecting one from among a plurality of intents.

A method in which the processor 1200 identifies an intent object from an input text is the same as the method of identifying the intent action, and thus a repeated description thereof is omitted below.

Although the intent action identification model 1323*a* and the intent object identification model 1324*a* are separate models in FIG. 2, it is understood that embodiments are not limited thereto. For example, according to another embodiment, the intent action identification model 1323*a* and the intent object identification model 1324*a* may be incorporated into a single intent identification model.

The slot tagging model 1325*a* is configured to identify a slot from the input text and perform slot tagging to associate the identified slot with the domain, the intent action, and the intent object. The slot refers to variable information for obtaining detailed pieces of information associated with the domain, the intent action, and the intent object from the input text or determining a detailed operation. The slot is information related to the intent action and the intent object, and a plurality of types of slots may correspond to one intent. The slot tagging refers to an operation of identifying the slot from the input text and matching the identified slot with an element related to the domain, the intent action, and the intent object.

According to an embodiment, the processor 1200 may identify the slot from the input text and automatically match the identified slot with a slot element related to the domain, the intent action, and the intent object, by using the slot tagging model 1325*a*. For example, when the input text is "Search for the release date of the movie Avengers Endgame", the processor 1200 may identify 'the movie Avengers Endgame' and 'the release date' as slots from the input text, tag 'the movie Avengers Endgame' on 'Movie title' as a slot related to a movie domain and a movie search intent, and tag 'the release date' on a slot of 'Movie release date', by using the data and the program code of the slot tagging model 1325*a*. As another example, when the input text is "Order three pepperoni pizzas from Domino's Pizza to Eonju-ro 30-gil", the processor 1200 may identify 'Domino's Pizza', 'pepperoni pizzas', 'three', and 'Eonju-ro 30-gil' as slots from the input text and may tag 'Domino's Pizza', 'pepperoni pizzas', 'three', and 'Eonju-ro 30-gil' respectively on 'Restaurant name', 'Pizza topping', 'Order amount', and 'Place' as slots associated with a food domain and an intent of food ordering, respectively, by using the data and the program code of the slot tagging model 1325*a*.

The processor 1200 may automatically perform slot tagging with respect to the input text by using the slot tagging model 1325*a*, but embodiments are not limited thereto. For example, the processor 1200 may receive a user input of selecting a specific slot or adding a new slot, for a word or phrase within the input text, from the client device 2000 through the communication interface 1100. In this case, the processor 1200 may tag the word or phrase of the input text on a slot determined or added by the user input.

When the input text input by the user is received from the client device 2000 through the communication interface 1100, the processor 1200 may calculate a probability that the input text corresponds to a specific domain, and may select one from the first through third NLU models 1320*a* through 1320*c*, based on the calculated probability value. The processor 1200 may perform intent detection and slot tagging of the input text, identify a replacement target text, and generate a replacement text, by using the selected NLU model. This is described in greater detail below with reference to FIG. 16.

The processor 1200 may transmit an intent, slot tagging information, and calculated numerical values matched with the input text to the client device 2000 by using the communication interface 1100. The transmitted intent, slot tagging information, and calculated numerical values may be displayed on the display 2510 of FIG. 3 of the client device 2000. This is described in greater detail below with reference to FIG. 18.

The TTS model 1330 is configured to convert a text into a wave signal. According to an embodiment, the processor 1200 may convert the text into the wave signal and output the wave signal as a signal in a binary data streaming form, by using data and a program code of the TTS model 1330.

According to an embodiment, the TTS model 1330 may include a personalized TTS model in which a context including information of a region or a specific person has been reflected. The personalized TTS model may convert a text into a wave signal by reflecting at least one feature from among, for example, a specific region, an age, the way of speaking of a person according to gender, intonation, and dialect, and may output the wave signal.

The replacement target text identification module 1340 is configured to identify the replacement target text needed to be replaced from the input text. According to an embodiment, the processor 1200 may identify the replacement target text needed to be replaced from one or more words included in the input text, by using the data and the program code of the replacement target text identification module 1340. The replacement target text may refer to a word or phrase incorrectly pronounced by a user who uses an application including a language model or difficult to be accurately trained when being input to the NLU model 1320 due to inaccuracy of a text output as a result of ASR through the ASR model 1310. The replacement target text may include, for example, a named entity, a keyword, a place, a region name, a movie title, or a game term included in the input text. The replacement target text may be, for example, a slot.

The replacement target text identification module 1340 may be trained to identify one or more replacement target texts from the input text. For example, when the input text is "Order 3 pepperoni pizzas to be delivered to Eonju-ro 30-gil", the processor 1200 may identify 'pepperoni' or 'Eonju-ro 30-gil' from the input text by using the replacement target text identification module 1340.

The replacement target text identification module 1340 may be configured to obtain a result of interpretation of the input text from the NLU model 1320 and automatically identify the replacement target text from the input text, based on the result of interpretation of the input text. According to an embodiment, the processor 1200 may identify a domain, an intent action, an intent object, and a slot into which the input text is classified, by interpreting the input text by using the pre-trained NLU model, may tag the identified slot on a slot related to the domain, the intent action, and the intent object, and may determine a text corresponding to the tagged slot to be the replacement target text by using the replacement target text identification module 1340. In this case, the replacement text that replaces the replacement target text may be tagged on the same slot as the slot on which the replacement target text is tagged.

It is understood, however, that embodiments are not limited thereto, and the replacement target text identification module 1340 may be configured to determine a word or phrase manually determined by the user input to be the replacement text. According to an embodiment, the processor 1200 may receive a user input of selecting one or more words or phrases from the input text, from the client device 2000 through the communication interface 1100, may identify one or more words or phrases selected based on the user input, by using the replacement target text identification module 1340, and may determine the identified one or more words or phrases to be the replacement target text. According to an embodiment, the replacement target text identification module 1340 may identify, as a named entity, the one or more words or phrases selected based on the user input.

According to an embodiment, the replacement target text identification module 1340 may be configured to identify a named entity included in the input text, by performing part-of-speech (POS) tagging of words identified from the input text. However, embodiments are not limited thereto, and the replacement target text identification module 1340 may be configured to identify the named entity from the input text by using various well-known named entity recognition (NER) methods.

According to an embodiment, the replacement target text identification module 1340 may identify the replacement target text, based on a result of searching for a word pre-stored in the dictionary DB 1370. The dictionary DB 1370 may store phoneme sequence information about a plurality of words or information about a converted embedding vector for each of the plurality of words. The dictionary DB 1370 stores phoneme sequence information about a plurality of words and an embedding vector about a phoneme sequence included in each of the plurality of words. According to an embodiment, the processor 1200 may parse the input text in units of words, morphemes, and phrases, search for one or more parsed words from the dictionary DB 1370, and determine a word not found or having a lower use frequency than a preset first threshold to be the replacement target text, based on a result of searching the dictionary DB 1370, by using the data and the program code of the replacement target text identification module 1340. The first threshold is a set (e.g., preset or predetermined) value for a use frequency for determining the replacement target text, as a result of searching the dictionary DB 1370. According to an embodiment, the first threshold may be set based on a user input. For example, the first threshold may be set by a user input received through a user interface (UI) displayed by the client device 2000. The UI for setting the first threshold is described in detail below with reference to FIG. 18.

For example, when the first threshold is set to be relatively low, a small number of words of which use frequencies are less than the first threshold may be found from the dictionary DB 1370, and thus the number of replacement target texts may be relatively small. On the other hand, when the first threshold is set to be relatively high, even words of which use frequencies are lower than the first threshold may be highly likely to be determined as replacement target texts as a result of searching the dictionary DB 1370, and thus a relatively large number of replacement target texts may be determined.

The replacement text generation module 1350 is configured to generate a replacement text that is predicted to be uttered by a user for the replacement target text identified by the replacement target text identification module 1340 and has a high phonetic similarity to the identified replacement target text. According to an embodiment, the processor 1200 may obtain the replacement target text identified from the replacement target text identification module 1340, and may generate a replacement text capable of replacing the replacement target text, by using the data and the program code of the replacement text generation module 1350. According to an embodiment, the processor 1200 may generate one or more replacement texts by using the replacement text generation module 1350.

The replacement text may be an example of a text that is phonetically similar to a specific named entity, a keyword, or a word or phrase identifiable as a slot by the NLU model 1320 or predicted to be pronounced by the user for the specific named entity, the keyword, or the identifiable word or phrase. The replacement text may be an example of a text that is predicted to be converted from a speech input of the user through the ASR model 1310 and output. For example, when the replacement target text is 'pepperoni pizza', replacement texts may be 'pepperoni', 'pepperoni', 'pepporoni', and the like that may be uttered with an inaccurate or similar pronunciation when the user pronounces the replacement target text. By way of another example, when the replacement target text is 'Eonju-ro 30-gil', replacement texts may be 'Anju-ro 30-gil', 'Unju-ro 30-gil', 'Eonjo-ro 30-gil', and the like that are predicted to be pronounced for 'Eonju-ro 30-gil' by the user or have similar phoneme sequences to 'Eonju-ro 30-gil'.

According to an embodiment, the processor 1200 may extract a phoneme sequence for the replacement target text, search for a similar text to the extracted phoneme sequence from a word pre-stored in the dictionary DB 1370, based on phonetic relevance of the phoneme sequence, and generate the replacement text by using at least one text having a high similarity to the extracted phoneme sequence, based on a result of the searching, by using the data and the program code of the replacement text generation module 1350. The similarity may be calculated as a confidence score. A detailed method in which the processor 1200 generates a replacement text, based on similarity of a phoneme sequence is described in detail below with reference to FIGS. 8 and 9.

According to an embodiment, the processor 1200 may convert the replacement target text into an embedding vector, generate a text having a similar vector value to the embedding vector by using a neural network model, and generate a replacement text by using the generated text, by using the data and the program code of the replacement text generation module 1350. The processor 1200 may convert the replacement target text into the embedding vector by using the word embedding model 1380. The word embedding model 1380 is configured to quantify at least one word that constitutes the input text. The word embedding model

1380 is a model for quantifying a word with a vector value, and may include, for example, well-known embedding models such as a continuous bag of words (CBOW) embedding model, a skip-gram embedding model, and word2vec. The processor 1200 may generate a replacement text having a similar vector value to the embedding vector by using, for example, a generative network. A method in which the processor 1200 generates a replacement text by using a generative network is described in detail below with reference to FIGS. 10 and 11.

According to an embodiment, the processor 1200 may convert the replacement target text into the wave signal by using the TTS model 1330, output the wave signal, and convert the wave signal into the output text by using the ASR model 1310. The processor 1200 may generate the replacement text by replacing the replacement target text with the output text, by using the data and the program code of the replacement text generation module 1350. A method in which the processor 1200 generates a replacement text by using the ASR model 1310, the TTS model 1330, and the replacement text generation module 1350 is described in detail below with reference to FIGS. 12 and 13.

The training text candidate generation module 1360 is configured to generate a training text candidate that is input for training the NLU model 1320, by replacing the replacement target text identified from the input text with the replacement text generated by the replacement text generation module 1350. According to an embodiment, the processor 1200 may generate one or more training text candidates by performing a paraphrasing operation of replacing the replacement target text within the input text with the replacement text or concatenating a word or phrase obtained by excluding the replacement target text from the input text with the replacement text, by using the data and the program code of the training text candidate generation module 1360. The training text candidate refers to a text serving as a candidate of training data that is used as input data for training the NLU model 1320.

For example, when the input text is "Order 3 pepperoni pizzas to be delivered to Eonju-ro 30-gil", the processor 1200 may generate three training text candidates including "Order 3 pepparoni pizzas to be delivered to Eonju-ro 30-gil", "Order 3 papperoni pizzas to be delivered to Eonju-ro 30-gil", or "Order 3 papporoni pizzas to be delivered to Eonju-ro 30-gil" by replacing 'pepperoni' identified as the replacement target text with 'pepperoni', 'pepperoni', and 'pepporoni', by using the training text candidate generation module 1360. It is understood, however, that embodiments are not limited thereto, and, when a plurality of replacement target texts are identified from the input text, the processor 1200 may generate a training text candidate by using a replacement text for each of the plurality of replacement target texts. For example, when 'pepperoni' as a slot indicating the type of pizza topping and 'Eonju-ro 30-gil' as a slot indicating an address are identified as replacement target texts from the input text of "Order 3 pepperoni pizzas to be delivered to Eonju-ro 30-gil", the processor 1200 may generate a replacement text for each of 'pepperoni' and 'Eonju-ro 30-gil' and generate 'pepperoni', 'pepperoni', and 'pepporoni' as replacement texts for 'pepperoni' and 'Anju-ro 30-gil', 'Unju-ro 30-gil', and 'Eonjo-ro 30-gil' for 'Eonju-ro 30-gil' as replacement texts, by using the replacement text generation module 1350. When three replacement texts are generated for each of 'pepperoni' and 'Eonju-ro 30-gil' as in the above example, the processor 1200 may generate a total of 9 training text candidates by combining the replacement texts by using the training text candidate generation module 1360.

When the training text candidate is generated by replacing the replacement target text identified as a slot within the input text with the replacement text, the training text candidate generation module 1360 may provide the domain, the intent, and the slot information of the training text candidate to the NLU model 1320. According to an embodiment, the training text candidate generation module 1360 may identify a slot of the replacement text replaced within the training text candidate as the same slot as the slot of the replacement target text, and may provide the slot information and the replacement target text to the NLU model 1320.

According to an embodiment, the training text candidate generation module 1360 may provide the replacement text, the slot information of the replacement text, and the replacement target text identified from the input text to the NLU model. The slot information may include, for example, a slot type of the identified slot, a slot value thereof, and a slot replacement value thereof. The slot replacement value refers to a replacement target text having the same slot value as the slot from which the replacement text has been identified, namely, refers to the original text. For example, when the training text candidates are "Order 3 pepparoni pizzas to be delivered to Eonju-ro 30-gil", "Order 3 papperoni pizzas to be delivered to Eonju-ro 30-gil", and "Order 3 papporoni pizzas to be delivered to Eonju-ro 30-gil", the training text candidate generation module 1360 may provide the NLU model 1320 with 'pizza topping' as a slot type, a slot value for pizza topping, and 'pepperoni' as the original text replaced by the replacement text, for each of 'pepperoni', 'pepperoni', and 'pepperoni' as the replacement texts in the training text candidates.

The processor 1200 may perform training by inputting the one or more training text candidates as the input data to the NLU model 1320. According to an embodiment, when the intent action, the intent object, and the slot of the input text are all identified by the NLU model 1320, the training text candidates may have information about the same intent action, the same intent object, and the same slot as the input text by succeeding all of pieces of information about the intent action, the intent object, and the slot of the input text. According to an embodiment, the processor 1200 may train an NLU model by using the replacement target text and slot information including a slot type and a slot value of the replacement text within a training text candidate. In this case, the processor 1200 may select an NLU model corresponding to the domain and the intent of one or more training text candidates from the pre-trained plurality of NLU models 1320a through 1320c. The processor 1200 may update the NLU model by performing training by inputting the one or more training text candidates, the intent action, the intent object, and the slot information as training data to the selected NLU model.

When the processor 1200 does not interpret the input text by using a pre-trained NLU model, the processor 1200 may identify the domain, the intent action, and the intent object of the one or more training text candidates by interpreting the one or more training text candidates by using the pre-trained NLU model, and perform slot tagging. In this case, the processor 1200 may perform training by using the identified domain, the identified intent action, the identified intent object, and the identified slot information as the training data of the NLU model, and may update the NLU model.

According to an embodiment, the processor 1200 may generate a new NLU model without updating the pre-trained NLU model. The processor 1200 may count the number of input texts and one or more training text candidates, and perform training by using the input text, the one or more training text candidates, and the identified domain, intent, and slot information as input data for training, when the counted number is greater than a preset third threshold, thereby generating a new NLU model. A method in which the processor 1200 updates one of the pre-trained plurality of NLU models 1320a through 1320c or generates a new NLU model is described in detail below with reference to FIG. 16.

According to an embodiment, the processor 1200 may perform training by selecting only some of the one or more training text candidates without using all of the one or more training text candidates and inputting the selected training text candidates as input data to the NLU model. In this case, the processor 1200 may transmit the one or more training text candidates to the client device 2000 through the communication interface 1100, and may receive from the client device 2000 an ID value for a text selected based on a user input of selecting at least one training text candidate from the one or more training text candidates. The processor 1200 may select at least one text, based on the received ID value, and input the selected at least one text and the input text as the input data to the NLU model, thereby performing training.

According to an embodiment, when the processor 1200 performs training using the input text and the training text candidate, the processor 1200 may generate a text normalizer module. The text normalizer module may include a rule table that receives a replacement text within a training text candidate and outputs a replacement target text that is the original text of the replacement text. For example, when replacement texts within a training text candidate are 'pepperoni', 'pepperoni', and 'pepporoni' and a replacement target text is 'pepperoni', the text normalizer module may include a rule table that defines 'pepperoni', 'pepperoni', and 'pepporoni' as an input text and 'pepperoni' as an output text as shown in Table 1 below.

TABLE 1

| Input | Output |
| --- | --- |
| Pepparoni | Pepperoni |
| Papperoni | Pepperoni |
| Pepporoni | Pepperoni |

Figure 22:
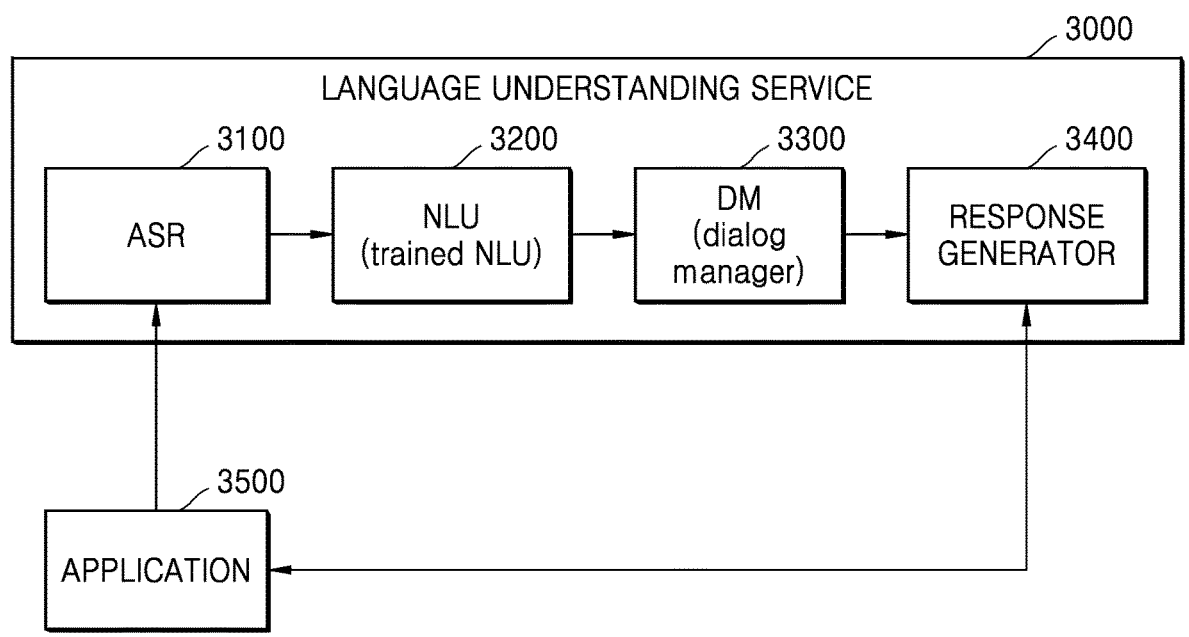
FIG. 22 is a block diagram of a language understanding service according to an embodiment.

The text normalizer module may provide the input text and the output text to a dialog manager 3300 of FIG. 22 or a response generator 3400 of FIG. 22.

In the above-described embodiment, the text normalizer module has been described as including a rule table. It is understood, however, that embodiments are not limited thereto. For example, according to another embodiment, the text normalizer module may be implemented as a neural network. When the text normalizer module is implemented as a neural network, the neural network may be trained by receiving the replacement text within the training text candidate as input data and the original text of the replacement text as output data that is a ground truth. When the replacement text is input to a pre-trained neural network, the original text may be output via training. For example, when 'pepperoni', 'pepperoni', and 'pepporoni' as replacement texts are input to the pre-trained neural network, 'pepperoni' as the original text may be output via training.

Figure 3:
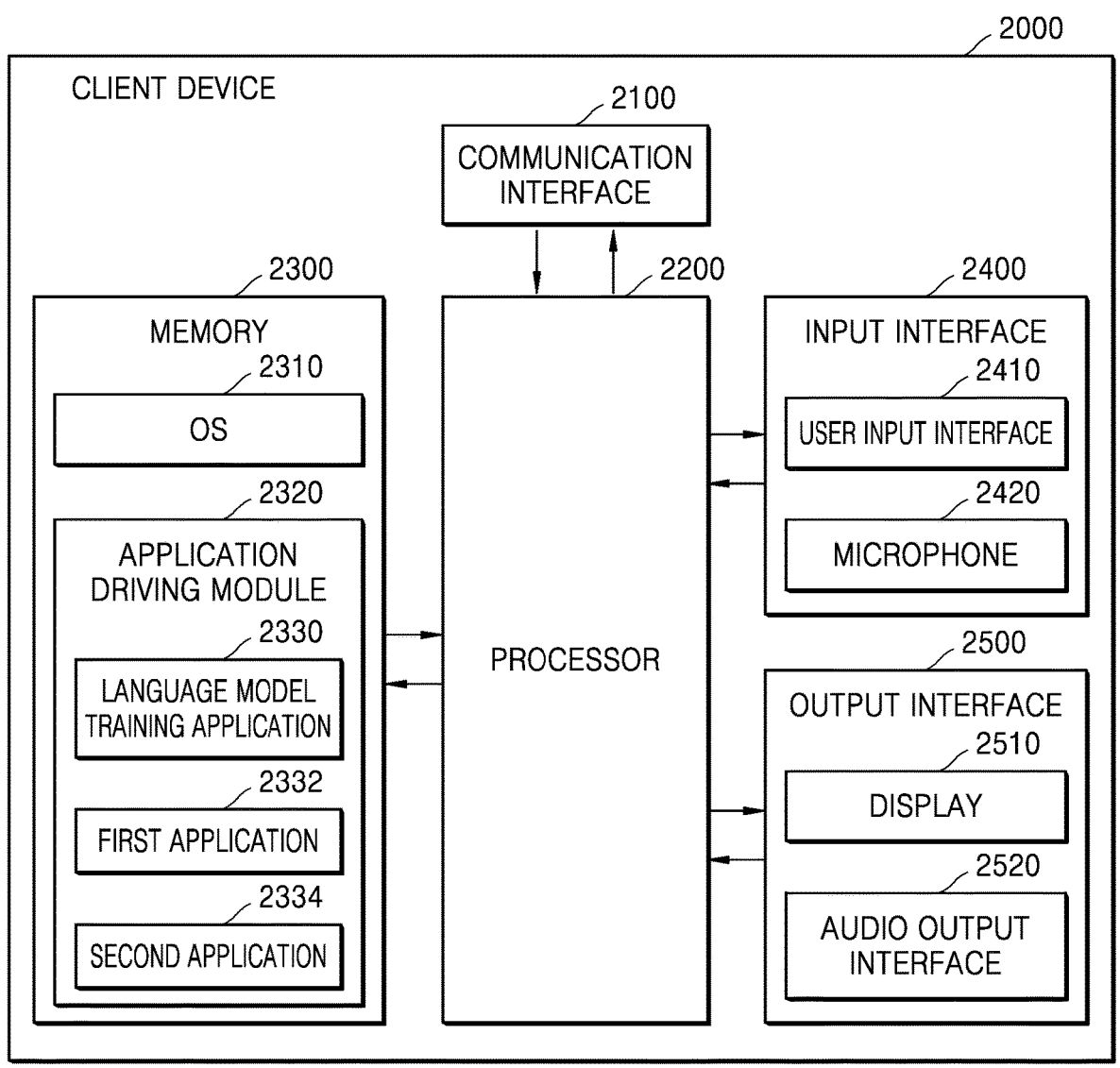
FIG. 3 is a block diagram of a client device according to an embodiment.

FIG. 3 is a block diagram of the client device 2000 according to an embodiment. FIG. 3 illustrates some components of the client device 2000, and it is understood that the client device 2000 may further include components not shown in FIG. 3.

The client device 2000 may be a computing device that receives a user input of inputting the input text and displays a graphical user interface (GUI) representing a result of training by using the input text and the one or more training text candidates. Examples of the client device 2000 may include, but are not limited to, a smartphone, a tablet personal computer (PC), a PC, a laptop computer, a smart television (TV), a mobile phone, a personal digital assistant (PDA), a media player, a global positioning system (GPS) device, an electronic book terminal, a digital broadcasting terminal, a navigation device, a kiosk, an MP3 player, a digital camera, home appliances, and other mobile or non-mobile computing devices. The client device 2000 may also be a watch, glasses, a hair band, or a ring each having a communication function and a data processing function. However, embodiments of the disclosure are not limited thereto, and the client device 2000 may include any kind of computing device capable of receiving or transmitting data from or to the server 1000 via a network to achieve speech recognition.

Referring to FIG. 3, the client device 2000 may include a communication interface 2100, a processor 2200, a memory 2300, an input interface 2400, and an output interface 2500.

The communication interface 2100 may include at least one component for communication with the server 1000 or an external device. The communication interface 2100 may transmit or receive data for speech recognition and a voice assistant service to or from the server 1000 and the external device under the control of the processor 2200. The communication interface 2100 may perform data communication with the server 1000 or another external device by using at least one of data communication methods including, for example, a wired LAN, a wireless LAN, Wi-Fi, Bluetooth, Zigbee, Wi-Fi Direct (WFD), infrared Data Association (IrDA), Bluetooth Low Energy (BLE), near field communication (NFC), wireless broadband Internet (Wibro), World Interoperability for Microwave Access (WiMAX), a shared wireless access protocol (SWAP), wireless gigabit alliance (WiGig), and RF communication.

The processor 2200 may execute one or more instructions of a program stored in the memory 2300, and a program code. The processor 2200 may be configured with a hardware component that performs arithmetic, logic, and input/output operations and signal processing. The processor 2200 may include, but is not limited to, at least one of, for example, a central processing unit, a microprocessor, a graphic processing unit, application specific integrated circuits (ASICs), digital signal processors (DSPs), digital signal processing devices (DSPDs), programmable logic devices (PLDs), or field programmable gate arrays (FPGAs).

The memory 2300 may include at least one type of non-volatile memory from among a flash memory type, a hard disk type, a multimedia card micro type, a card type memory (for example, a secure digital (SD) or extreme digital (XD) memory), a read-only memory (ROM), an electrically erasable programmable ROM (EEPROM), a programmable ROM (PROM), a magnetic memory, a magnetic disk, and an optical disk, and a volatile memory such as a random access memory (RAM) or a static random access memory (SRAM).

The memory 2300 may store instructions and a program code that may be read by the processor 1200. According to an embodiment, the processor 2200 may be implemented by executing instructions or codes of a program stored in the memory 2300.

The memory 2300 may include an operating system (OS) 2310 and an application driving module 2320. The OS 2310 is software for use in controlling an operation or function of the client device 2000. The processor 2200 may execute an application on the OS 2310.

The application driving module 2320 is used to drive an application program. The application driving module 2320 may be used to drive a language model training application 2330 and a plurality of applications, namely, first and second applications 2332 and 2334. The processor 2200 may load one or more application programs from the memory 2300 and execute the one or more application programs, by using data and a program code of the application driving module 2320. According to an embodiment, the processor 2200 may execute the language model training application 2330 by using the application driving module 2320.

The language model training application 2330 is a program that is provided to a developer to train or develop a new language model or update a pre-trained language model. The language model training application 2330 may include a developer tool for interacting with the server 1000 in order to achieve language model training. The language model training application 2330 may be an application for training, for example, the NLU model.

According to an embodiment, the processor 2200 may display, on a display 2510, a GUI for receiving a user input of inputting an input text for language model training, by executing the language model training application 2330. The processor 2200 may receive the input text through a user input interface 2410 and store the received input text in the memory 2300. According to an embodiment, the processor 2200 may transmit the input text input via the GUI to the server 1000 by controlling the communication interface 2100.

According to an embodiment, the processor 2200 may receive a domain, an intent, and slot tagging information identified from the input text by the server 1000, by controlling the communication interface 2100. The processor 2200 may display (or control to display) the identified domain, the identified intent, and the identified slot tagging information on the display 2510, by executing the language model training application 2330. In this case, the processor 2200 may also display a numerical value representing a confidence score for each of one or more domains and one or more intents. Similarly, the processor 2200 may display a numerical value representing confidence scores for one or more slots automatically tagged by the server 1000.

However, embodiments are not limited thereto, and the client device 2000 may store its own pre-trained NLU model in the memory 2300, and the processor 2200 may detect a domain and an intent from the input text by using the pre-trained NLU model stored in the memory 2300 and may perform slot tagging. A method in which the processor 2200 detects the domain, the intent, and the slot from the input text and performs slot tagging is the same as the method performed by the processor 1200 of FIG. 2 of the server 1000, and thus a detailed description thereof is omitted below.

According to an embodiment, the processor 2200 may display, on the display 2510, a GUI for receiving a user input of selecting or determining a domain, an intent action, and an intent object corresponding to the input text, by executing the language model training application 2330. The user input interface 2410 may receive, through a GUI, a user input of inputting the domain, the intent action, and the intent object into which the input text is classified. The processor 2200 may determine the domain, the intent action, and the intent object for the input text, based on the user input received via the user input interface 2410.

The language model training application 2330 may select one or more application program interfaces (APIs), based on a domain identified by the server 1000 or determined based on the user input, for example, the movie, the picture, sports, the weather, or the airline. According to an embodiment, the language model training application 2330 may include exemplary data (for example, an exemplary text) that is used to not only select or determine an existing domain but also to expand the existing domain or generate a new domain. According to an embodiment, the processor 2200 may receive a user input of selecting one or more APIs associated with a domain identified or determined for the input text, by executing the language model training application 2330.

The processor 2200 may display on the display 2510 a GUI configured to receive a user input of selecting a replacement target text within the input text, by executing the language model training application 2330. In this case, the user input interface 2410 may receive at least one user input from among a mouse input, touch input, or drag input of selecting a specific word or phrase within the input text. The processor 2200 may determine the word or phrase selected based on the user input received via the user input interface 2410 to be a replacement target text.

According to an embodiment, the processor 2200 may receive a user input of selecting a word or phrase corresponding to a slot associated with the domain and the intent detected from the input text, through a GUI. The processor 2200 may display one or more exemplary slots of slot tagging corresponding to a word or phrase determined as a slot, and may perform slot tagging, based on a user input of selecting one from the one or more exemplary slots, by executing the language model training application 2330. An embodiment of determining a slot from an input text, based on a user input, and performing slot tagging is described in detail below with reference to FIG. 19A.

According to an embodiment, when (or based on) the replacement target text is selected, the processor 2200 may control the display 2510 to display a GUI for receiving a user input of selecting at least one from among pieces of context information considered to generate a replacement text that replaces the replacement target text. The pieces of context information may include, for example, one or more pieces of information from among the age, the gender, the region, the used language, the accent, and the dialect of an application user who uses the replacement text. According to an embodiment, the processor 2200 may receive a user input of selecting characteristics of an application that takes into account the context information. An embodiment of selecting context information that is used to generate a replacement text, based on a user input, is described in detail below with reference to FIG. 19B.

The processor 2200 may receive from the server 1000 one or more training text candidates generated by replacing the replacement target text of the input text with the replacement text, by controlling the communication interface 2100. The one or more training text candidates are generated by the processor 1200 of the server 1000, and are the same as the one or more training text candidates described above with reference to FIG. 2. Thus, repeated descriptions thereof are omitted below.

Although an operation of identifying the replacement target text from the input text and replacing the identified replacement target text with the replacement text to generate the one or more training text candidates is performed by the server 1000 in FIG. 2, embodiments are not limited thereto. According to another embodiment, the client device 2000 may generate one or more training text candidates by identifying the replacement target text from the input text and replacing the identified replacement target text with the replacement text.

The processor 2200 may display, on the display 2510, a GUI for receiving a user input of selecting at least one from the input text and the one or more training text candidates, by executing the language model training application 2330. In this case, the user input interface 2410 may receive a user input of selecting at least one text from the input text and the one or more training text candidates through the GUI displayed on the display 2510. According to an embodiment, the processor 2200 may display a word corresponding to the replacement text replaced by the server 1000 from among the words included in the one or more training text candidates to be distinguished from the other words, by executing the language model training application 2330.

The processor 2200 may select at least one text, based on the received user input, and may transmit the ID value of the selected at least one text to the server 1000 by controlling the communication interface 2100.

According to an embodiment, the processor 2200 may display on the display 2510 one or more training text candidates output through a personalized TTS model in which context information of a specific region or specific person has been reflected, by executing the language model training application 2330. The processor 2200 may receive the one or more training text candidates output through the personalized TTS model from the server 1000. According to an embodiment, the processor 2200 may reflect the context information of the one or more training text candidates output through the personalized TTS model from the server 1000, and may output an audio signal through an audio output interface 2520. An embodiment of displaying one or more training text candidates output through a personalized TTS model or outputting an audio signal is described in detail below with reference to FIG. 21.

The input interface 2400 may include the user input interface 2410 and the microphone 2420. The user input interface 2410 may include, but is not limited to, a mouse, a keyboard, a key pad, a dome switch, a touch pad (e.g., a capacitive overlay type, a resistive overlay type, an infrared beam type, an integral strain gauge type, a surface acoustic wave type, a piezo electric type, or the like), a jog wheel, a jog switch, a rotatable dial, one or more push buttons, etc. When the user input interface 2410 is a touch pad, the user input interface 2410 may be configured with a touch screen by being incorporated with the display 2510. In this case, the user input interface 2410 may receive at least one of a touch input, a pinch input, a drag input, a swipe input, or a scroll input through the touch screen. According to an embodiment, the user input interface 2410 may receive a gesture of a user, for example, a stretch gesture, a pinch gesture, a selection and maintenance gesture, a guide gesture, a swiping action, a dragging action, or the like.

The microphone 2420 may receive an utterance of the user and process the utterance into an electrical audio signal. The processor 2200 may receive a speech input from the user through the microphone 2420, and may obtain an audio signal from the received speech input. According to an embodiment, the processor 2200 may convert sound received through the microphone 2420 into a wave signal, and obtain an audio signal by removing noise (for example, a non-audio component) from the wave signal.

The output interface 2500 may include the display 2510 and the audio output interface 2520.

The display 2510 may display information processed by the client device 2000, under the control of the processor 2200. For example, the display 2510 may display a GUI for language model training output by the language model training application 2330. According to an embodiment, the display 2510 may constitute a touch screen by forming a layer structure together with a touch pad. In this case, the display 2510 may be used as an input device as well as an output device.

The display 2510 may include at least one of a liquid crystal display (LCD), a thin film transistor-liquid crystal display (TFT-LCD), an organic light-emitting diode (OLED), a flexible display, a three-dimensional (3D) display, an electrophoretic display, etc.

The audio output interface 2520 may output audio data. The audio output interface 2520 may include, for example, a speaker and a buzzer.

According to the embodiments described with reference to FIGS. 1 through 3, the server 1000 may replace a replacement target text wrongly pronounced or difficult to be accurately pronounced because the output text of the ASR model 1310 of FIG. 2 mismatches with (or does not match) a text included in the pre-trained plurality of NLU models 1320*a* through 1320*c* or the user inaccurately knows a text with the replacement text phonetically similar to the replacement target text and predicted to be pronounced, generate one or more training text candidates that may be replacement candidates of the input text, as a result of the replacement, and train an NLU model, thereby providing a more accurate NLU model than when the NLU model is trained with only the input text.

The client device 2000 may provide a developer tool enabling the user, namely, a developer trying to generate a new NLU model by training a language model or update an existing NLU model, to determine a domain and an intent for the input text, and perform slot tagging for the input text through a user input, so that the developer may develop a language model specialized for an application desired by the developer. The client device 2000 may provide a developer tool enabling at least one of the one or more training text candidates generated by the server 1000 to be selected, so that the developer may perform language model training by using only the text desired by the developer, thereby improving accuracy of language model training.

Figure 4:
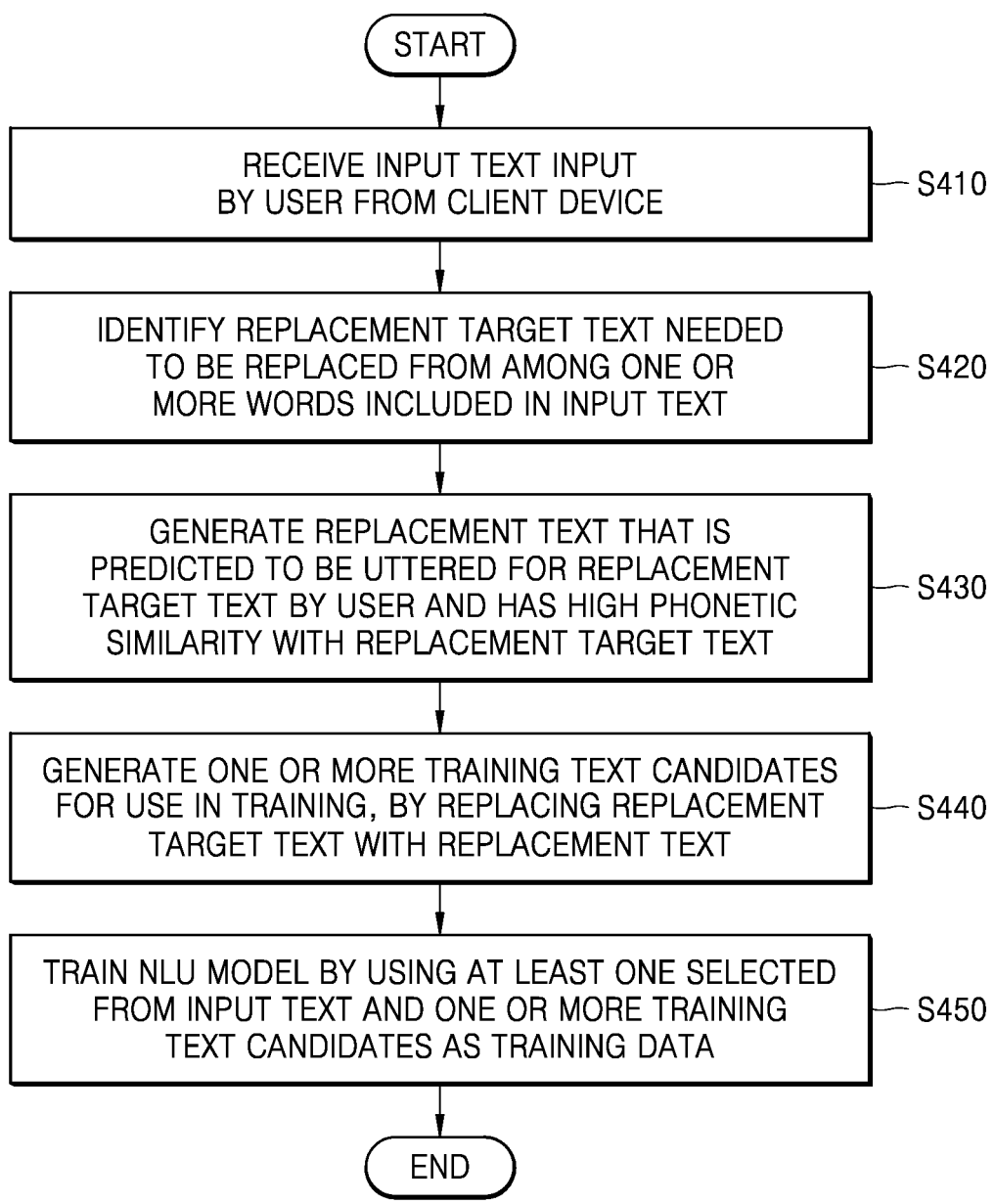
FIG. 4 is a flowchart of an embodiment in which a server trains a natural language understanding (NLU) model.

FIG. 4 is a flowchart of an embodiment in which the server 1000 trains an NLU model.

Referring to FIG. 4, in operation S410, the server 1000 receives an input text input by a user from the client device 2000. The client device 2000 may receive the input text through a typing input via the user input interface 2410 of FIG. 3, and may transmit the input text to the server 1000. It is understood, however, that embodiments are not limited thereto. For example, according to another embodiment, the client device 2000 may receive a speech input from the user through the microphone 2420, and may transmit an audio signal including the speech input to the server 1000. The processor 1200 of the server 1000 may convert the audio signal into a text and receive an input text from the text, by performing ASR on the received audio signal by using the ASR model 1310.

In operation S420, the server 1000 may identify a replacement target text to be replaced (e.g., needed to be replaced)

from among one or more words included in the input text. The replacement target text refers to a word or phrase wrongly uttered or difficult to be accurately pronounced because a user using an application including a newly-generated language model inaccurately knows or speaks the one or more words when uttering for a speech command or the like. For example, the replacement target text may include a named entity, a keyword, a place, a region name, a movie title, or a game term. According to an embodiment, the replacement target text may be a slot identified by interpreting the input text by using a pre-trained NLU model. For example, when the input text is "Order 3 pepperoni pizzas to be delivered to Eonju-ro 30-gil", the replacement target text may be 'pepperoni' or 'Eonju-ro 30-gil' identified as a named entity or a slot.

According to an embodiment, the replacement target text may be determined based on a user input. According to an embodiment, the client device 2000 may receive a user input for selecting a word or phrase included in the input text, and may transmit ID information of the word or phrase selected based on the received user input to the server 1000. The processor 1200 of the server 1000 may identify the word or phrase selected by the user input, based on the ID information received from the client device 2000, and determine the identified word or phrase to be the replacement target text.

According to an embodiment, the server 1000 may identify the replacement target text, based on a result of searching for a word pre-stored in the dictionary DB 1370 of FIG. 2. According to an embodiment, the processor 1200 of the server 1000 may parse the input text in units of words, morphemes, and phrases, search for one or more words from the dictionary DB 1370, and determine a word not found or having a use frequency lower than a preset first threshold to be the replacement target text, based on a result of searching the dictionary DB 1370.

According to an embodiment, the processor 1200 of the server 1000 may identify a slot from the input text by interpreting the input text by using the pre-trained NLU model, and determine the identified slot to be the replacement target text.

A method in which the server 1000 identifies a replacement target text is described in detail below with reference to FIGS. 5 through 7.

In operation S430, the server 1000 generates a replacement text that is predicted to be uttered for the replacement target text by the user and has a high phonetic similarity with the replacement target text. The replacement text may be an example of a text that is phonetically similar to a specific named entity, a keyword, or a word or phrase identified as a slot by a pre-trained NLU model or predicted to be pronounced for the specific named entity, the keyword, or the identified word or phrase by the user. For example, when the replacement target text is 'pepperoni pizza', replacement texts may be 'pepperoni', 'pepperoni', 'pepporoni', and the like that may be uttered with an inaccurate or similar pronunciation when the user pronounces the replacement target text.

The server 1000 generates a replacement text capable of replacing (or being replaced by) the replacement target text identified in operation S420. According to an embodiment, the processor 1200 may generate the replacement text capable of replacing the replacement target text, by using the replacement text generation module 1350 of FIG. 2.

When the replacement target text corresponds to a slot automatically identified as a result of the input text interpretation using the pre-trained NLU model, the replacement text may obtain or have the same slot information as the slot of the replacement target text. In other words, the replacement text may not only replace the replacement target text but also succeed and obtain the slot information of the replacement target text. For example, when a slot identified from the input text is 'pepperoni' referring to pizza topping, 'pepperoni', 'pepperoni', and 'pepporoni', which are replacement texts that replace 'pepperoni', may obtain, as slot information, the same pizza topping as the slot information of 'pepperoni' corresponding to the replacement target text.

According to an embodiment, the server 1000 may extract a phoneme sequence for the replacement target text, search for a text similar to the extracted phoneme sequence from a word pre-stored in the dictionary DB 1370 of FIG. 2, based on phonetic relevance of the phoneme sequence, and generate the replacement text by using at least one text having a high similarity to the extracted phoneme sequence, based on a result of the searching.

According to another embodiment, the server 1000 may convert the replacement target text into an embedding vector, generate a text having a similar vector value to the embedding vector by using a neural network model, and generate a replacement text by using the generated text.

According to another embodiment, the server 1000 may convert the replacement target text into the wave signal (e.g., audio signal or audio) by using the TTS model 1330 of FIG. 2, output the wave signal, and convert the output wave signal into an output text by using the ASR model 1310 of FIG. 2. The server 1000 may generate a replacement text by using the output text.

An embodiment in which the server 1000 generates a replacement text is described in detail below with reference to FIGS. 8 through 13.

In operation S440, the server 1000 generates one or more training text candidates for use in training, by replacing the replacement target text with the replacement text. The training text candidate refers to a text serving as a candidate of training data that is used as input data in language model training. According to an embodiment, the processor 1200 may generate the one or more training text candidates by performing a paraphrasing operation of replacing the replacement target text within the input text with the replacement text or concatenating a word or phrase obtained by excluding the replacement target text from the input text with the replacement text, by using the training text candidate generation module 1360.

For example, when the input text is "Order 3 pepperoni pizzas to be delivered to Eonju-ro 30-gil", the server 1000 may generate three training text candidates including "Order 3 pepparoni pizzas to be delivered to Eonju-ro 30-gil", "Order 3 papperoni pizzas to be delivered to Eonju-ro 30-gil", and "Order 3 papporoni pizzas to be delivered to Eonju-ro 30-gil" by replacing 'pepperoni' identified as the replacement target text with 'pepperoni', 'pepperoni', and 'pepporoni'.

In operation S450, the server 1000 trains an NLU model by using at least one selected from among the input text and the one or more training text candidates as the training data.

Between operation S440 and operation S450, the server 1000 may identify a domain, an intent, and a slot from the input text and the one or more training text candidates, by interpreting the input text and the one or more training text candidates by using a pre-trained NLU model. According to an embodiment, the server 1000 may perform training by using information about the identified domain, intent, and slot as input data in the NLU model.

According to an embodiment, the server 1000 may select one NLU model from among the plurality of NLU models 1320a through 1320c pre-stored in the memory 1300 of FIG. 2, based on the domain and intent identified from the input text and the one or more training text candidates, and may perform training using the selected NLU model.

It is understood, however, that embodiments are not limited thereto. For example, according to another embodiment, the server 1000 may generate a new NLU model via training using the input text and the one or more training text candidates.

According to an embodiment, the server 1000 may perform training by selecting only some of the one or more training text candidates without using all of the one or more training text candidates, and inputting the selected training text candidates as input data to the NLU model. The server 1000 may transmit the one or more training text candidates generated in operation S440 to the client device 2000, and may receive from the client device 2000 an ID value for a text selected based on a user input of selecting at least one from among the one or more training text candidates. The server 1000 may select at least one text, based on the received ID value, and perform training by inputting the selected at least one text and the input text as the input data to the NLU model.

Figure 5:
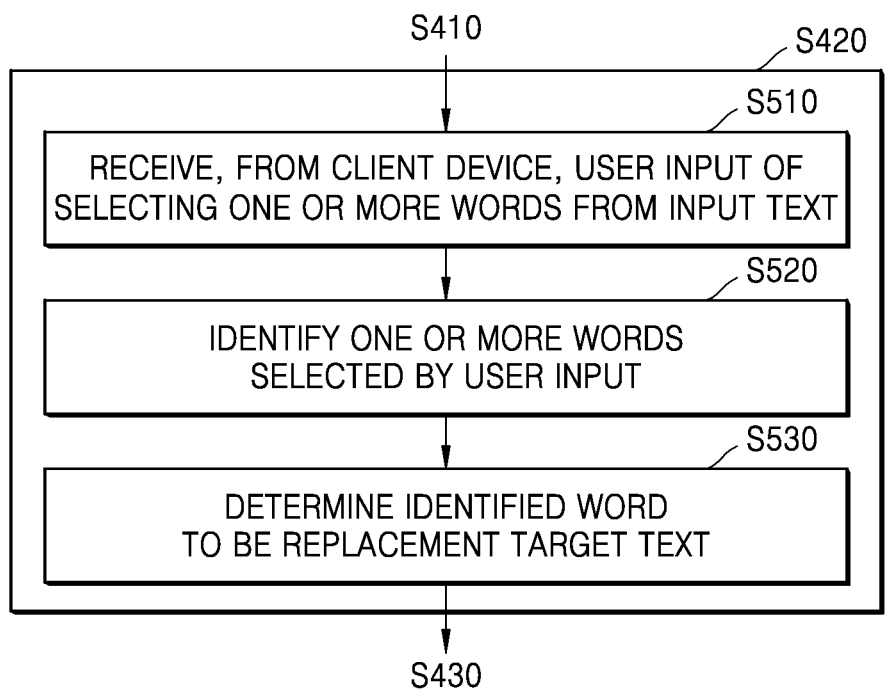
FIG. 5 is a flowchart of an embodiment in which a server determines a replacement target text, based on a user input.

FIG. 5 is a flowchart of an embodiment in which the server 1000 determines the replacement target text, based on a user input. The operations of FIG. 5 are operations included in operation S420 of FIG. 4, and operation S510 is performed after operation S410 of FIG. 4 is performed. After operation S530 of FIG. 5 is performed, operation S430 of FIG. 4 is performed.

Referring to FIG. 5, in operation S510, the server 1000 receives, from the client device 2000, the user input of selecting one or more words from the input text. According to an embodiment, the client device 2000 may receive a user input of selecting a word or phrase included in the input text. For example, the client device 2000 may receive a mouse click, drag input, or touch & drag input of selecting a specific word or phrase from the input text. The client device 2000 may select a word or phrase from the input text, based on the received user input. The word or phrase selected by the user input may include, but is not limited to, an entity name, a keyword, a place, a region name, a movie title, a game term, or the like.

According to an embodiment, the client device 2000 may receive a user input of selecting replacement target text, based on a development purpose of an application using a language model. For example, when the development purpose of the application is to take into account the dialect of a specific region, take into account a used language (for example, English or Spanish), and/or take into account users having a specific age range and a specific gender, a client device may receive, as a replacement target text, a user input of selecting a word that is wrongly pronounced as a word not included in an NLU model due to the dialect from an input text or is highly likely to be replaced according to the used language. According to an embodiment, the client device 2000 may receive a user input of selecting an application development purpose which takes into account the age, region, used language, gender, and the like of an application user, and may automatically recommend the replacement target text according to the received user input. An embodiment in which the client device 2000 receives the user input of selecting the replacement target text is described in detail below with reference to FIG. 18.

The client device 2000 may transmit ID information about the word or phrase selected as the replacement target text to the server 1000. The server 1000 may receive ID information about the word or phrase selected by the user input from the client device 2000.

In operation S520, the server 1000 identifies the one or more words selected by the user input. According to an embodiment, the server 1000 may identify the word or phrase selected by the user input from the input text, by analyzing the ID information received from the client device 2000.

In operation S530, the server 1000 determines the identified word to be the replacement target text. According to an embodiment, the server 1000 may determine not only the identified word, but also a phrase to be the replacement target text.

Figure 6:
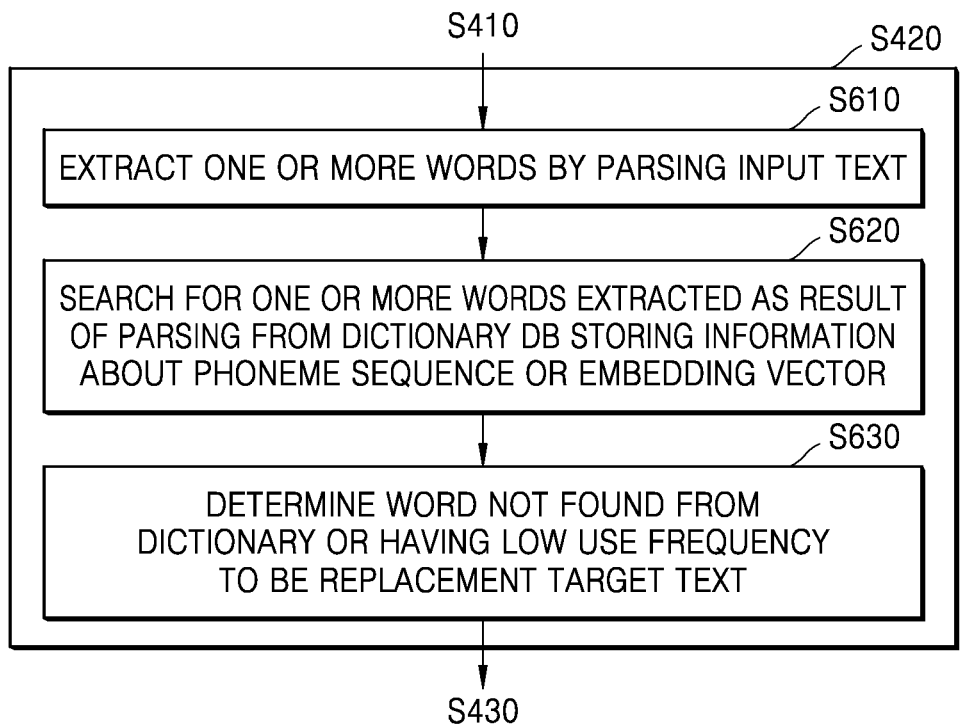
FIG. 6 is a flowchart of an embodiment in which a server determines a replacement target text, based on a result of searching a dictionary database (DB)

FIG. 6 is a flowchart of an embodiment in which the server 1000 identifies the replacement target text, based on a result of searching the dictionary DB 1370 of FIG. 2. The operations of FIG. 6 are a detailed version of operation S420 of FIG. 4, and operation S610 is performed after operation S410 of FIG. 4 is performed. After operation S630 of FIG. 6 is performed, operation S430 of FIG. 4 is performed.

Referring to FIG. 6, in operation S610, the server 1000 extracts one or more words by parsing the input text. According to an embodiment, the server 1000 may parse the input text in units of words, morphemes, and phrases, and extract one or more words from the parsed text by using linguistic characteristics (for example, syntactic elements) of the morpheme, the word, or the phrase.

In operation S620, the server 1000 searches for the one or more words extracted as a result of the parsing from the dictionary DB of FIG. 2 storing information about a phoneme sequence or an embedding vector. The dictionary DB 1370 may be configured with a DB that stores phoneme sequence information about words and an embedding vector about a phoneme sequence included in each of the words. The dictionary DB 1370 may be, for example, a phoneme sequence dictionary. According to an embodiment, the dictionary DB 1370 may include a look-up table including phoneme sequence information and an embedding vector for each of the words.

According to an embodiment, the server 1000 may convert the one or more words extracted as a result of the parsing into a phoneme sequence or an embedding vector. According to an embodiment, the server 1000 may convert the one or more words into the embedding vector by using a word embedding method. For example, the server 1000 may convert the one or more words into the embedding vector by using an embedding model such as Bag of Words or word2vec.

The server 1000 may search the dictionary DB 1370 for the phoneme sequence information or the embedding vector into which the one or more words are converted.

In operation S630, the server 1000 determines a word not found from the dictionary DB 1370 or having a low use frequency to be the replacement target text. According to an embodiment, the server 1000 may search the dictionary DB 1370 for the one or more words extracted by parsing the input text, and may determine, as the replacement target text, a word not found from the dictionary DB 1370 due to not being included in the dictionary DB 1370 or a word used in the dictionary DB 1370 with a lower frequency than a preset first threshold.

Figure 7:
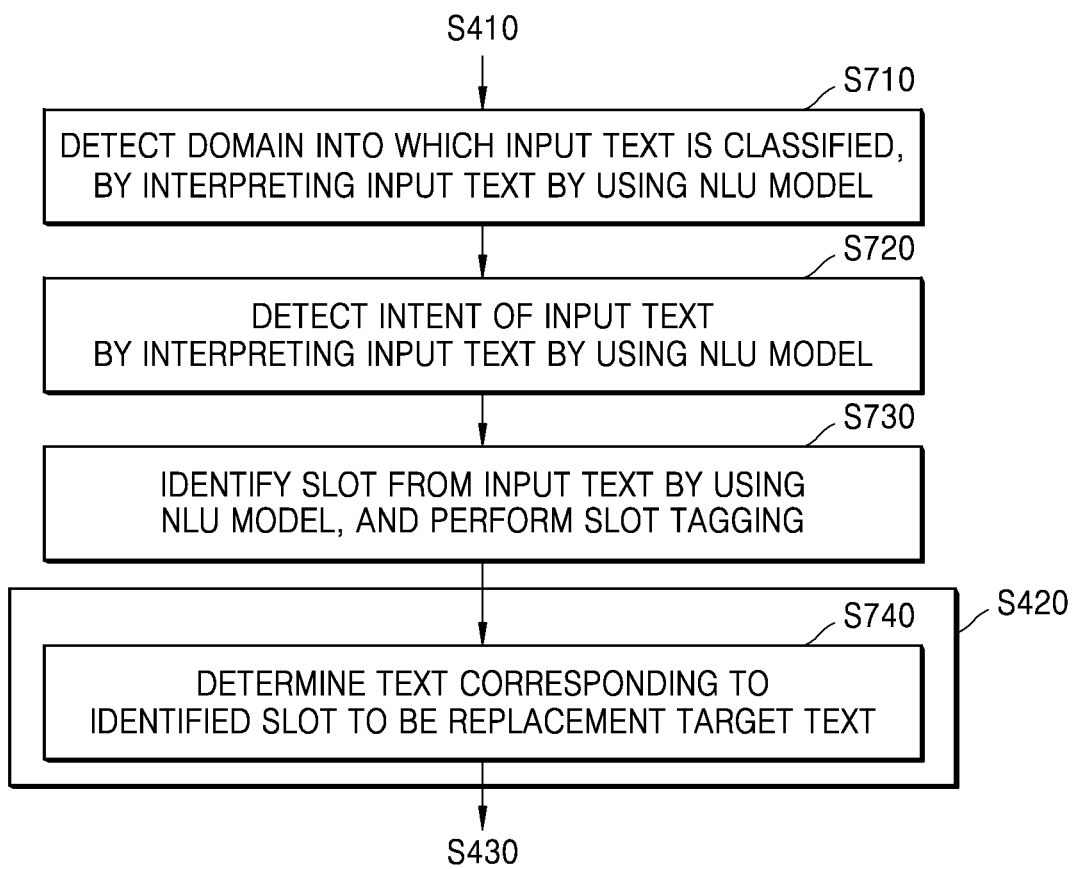
FIG. 7 is a flowchart of an embodiment in which a server automatically identifies a replacement target text by using an NLU model.

FIG. 7 is a flowchart of an embodiment in which the server 1000 automatically identifies the replacement target text by using an NLU mode. Operations S710 through S730 from among the operations of FIG. 7 are performed between operations S410 and S420. Operation S740 of FIG. 7 is a more detailed version of operation S420 of FIG. 4. Operation S430 of FIG. 4 is performed after operation S740 of FIG. 7 is performed.

Referring to FIG. 7, in operation S710, the server 1000 detects a domain into which the input text is classified, by interpreting the input text by using the NLU model. According to an embodiment, the server 1000 may detect a domain that is category information to which or into which the input text may belong or be classified, by interpreting the input text by using a domain identification model included in one of the pre-trained first through third NLU models 1320a through 1320c of FIG. 2. According to an embodiment, the server 1000 may identify one domain or a plurality of domains from the input text. According to an embodiment, the server 1000 may calculate a relationship between the input text and a domain as a numerical value by interpreting the input text by using the domain identification model. According to an embodiment, the server 1000 may calculate relationships between the input text and one domain or a plurality of domains as probability values and determine a domain having a highest probability value from among the calculated probability values to be the domain into which the input text is classified.

In operation S720, the server 1000 detects an intent of the input text by interpreting the input text by using the NLU model. According to an embodiment, the server 1000 may detect the intent from the input text by using an intent identification model of the pre-trained NLU model. According to an embodiment, the server 1000 may detect an intent action from the input text by using an intent action identification model included in one of the pre-trained first through third NLU models 1320a through 1320c, and may detect an intent object from the input text by using an intent action identification model included in one of the pre-trained first through third NLU models 1320a through 1320c.

The intent action refers to an action performed by the input text, for example, searching, posting, playing, purchasing, ordering, etc. The server 1000 may detect the intent action from the input text by performing syntactic analysis or semantic analysis by using the intent action identification model. According to an embodiment, the server 1000 may parse the input text in units of morphemes, words, or phrases by using the intent action identification model, and may infer the meaning of a word or phrase extracted from the parsed input text by using linguistic characteristics (e.g., a syntactic element) of the parsed morpheme, word, or phrase. The server 1000 may determine an intent action corresponding to the meaning of the inferred word or phrase by comparing the meaning of the inferred word or phrase with pre-defined intents provided by the NLU model.

The intent object refers to an object associated with the detected intent action. The intent object is an object that is a target of the detected intent action, and may refer to, for example, a movie, a picture, sports, a weather, or an airline. The server 1000 may detect the intent object associated with the intent action from the input text by interpreting the input text by using the intent object identification model.

In operation S730, the server 1000 identifies a slot from the input text by using the NLU model, and performs slot tagging. According to an embodiment, the server 1000 may identify the slot from the input text by using a slot tagging model included in one of the pre-trained first through third NLU models 1320a through 1320c, and may perform slot tagging to associate the identified slot with the domain, the intent action, and the intent object. The slot refers to variable information for obtaining detailed pieces of information associated with the domain, the intent action, and the intent object from the input text or determining a detailed operation. For example, the slot may include a named entity, a keyword, a place, a region name, a movie title, or a game term. According to an embodiment, the slot is information related to the intent action and the intent object, and a plurality of types of slots may correspond to one intent.

According to an embodiment, the server 1000 may identify one slot or a plurality of slots from the input text.

In operation S740, the server 1000 determines a text corresponding to the identified slot to be the replacement target text. When (or based on) a plurality of slots are detected from the input text, the server 1000 may determine one slot to be the replacement target text.

According to an embodiment, the server 1000 may determine, as the replacement target text, one or more slots selected based on a user input of selecting one or more slots from the plurality of slots. The server 1000 may receive the user input of selecting one or more slots from the plurality of slots, through the client device 2000. For example, the client device 2000 may display a list of a plurality of slots identified from the input text, receive a user input of selecting one or more slots from among the plurality of slots included in the list, and select one or more slots, based on the received user input. The client device 2000 may transmit ID information about the selected one or more slots to the server 1000. An embodiment in which the client device 2000 receives the user input for selecting, from among the plurality of slots, the one or more slots which are to be determined as the replacement target text is described in detail below with reference to FIG. 18.

According to an embodiment, the server 1000 may determine one of the plurality of slots to be the replacement target text, based on the characteristics of an application that uses the replacement text. According to an embodiment, the server 1000 may determine one of the plurality of slots to be the replacement target text, based on pieces of characteristic information such as the age, gender, region, used language, dialect, and/or intonation of a user who uses an application using a language understanding model. According to an embodiment, the client device 2000 may receive a user input of selecting one or more pieces of characteristic information from respective pieces of characteristic information of a plurality of applications, and may transmit the one or more pieces of information selected based on the received user input to the server 1000. The server 1000 may determine one of the plurality of slots to be the replacement target text, based on the characteristic information of an application received from the client device 2000. An embodiment in which the client device 2000 receives a user input of selecting characteristic information of an application is described in detail below with reference to FIG. 19B.

The server 1000 may generate a replacement text that is predicted to be uttered for the replacement target text by the user and has a high phonetic similarity with the replacement target text (see operation S430 of FIG. 4). In this case, the replacement text may be tagged on the same slot as the slot on which the replacement target text is tagged. In other words, the replacement text may succeed slot information of the replacement target text without changes.

The domain detected in operation S710, the intent detected in operation S720, and slot tagging information detected in operation S730 may be provided as the input data to the NLU model.

Operations S710 through S730 are performed before operation S420 of determining the replacement target text in FIG. 7, but embodiments of the disclosure are not limited thereto. For example, according to another embodiment, an operation of detecting the domain and the intent from the input text and performing slot tagging may be performed after the training text candidate is generated. This is described in greater detail below with reference to FIG. 14.

Figure 8:
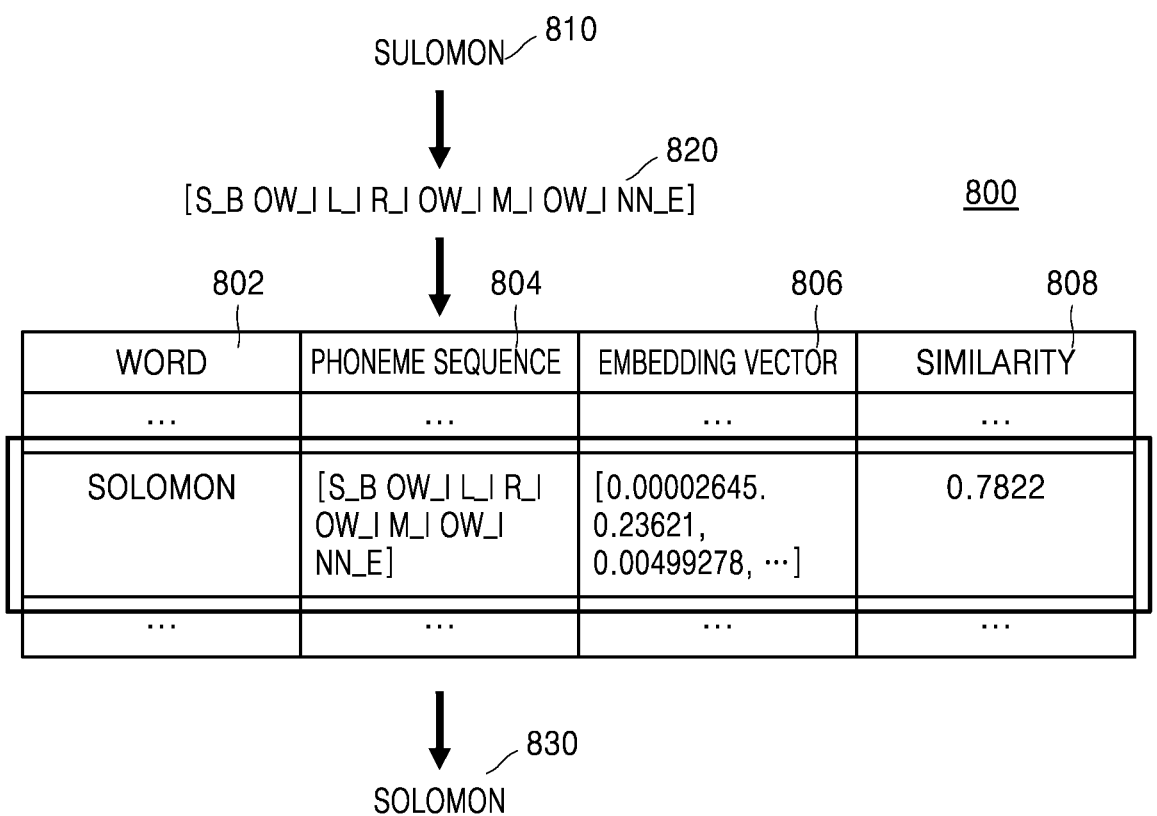
FIG. 8 is a flowchart of an embodiment in which a server generates a replacement text from a replacement target text.

FIG. 8 illustrates an embodiment in which the server 1000 obtains a replacement text 830 from a replacement target text 810.

Referring to FIG. 8, the server 1000 may obtain the replacement text 830 from the replacement target text 810 by using a dictionary DB 800. The dictionary DB 800 stores information about a phoneme sequence 804 for each of a plurality of words 802, and information about an embedding vector 806 into which each of the plurality of words 802 is converted. The dictionary DB 800 may be, for example, a phoneme sequence dictionary. According to an embodiment, the dictionary DB 800 may be replaced by or may be used in addition to a look-up table including the phoneme sequence 804 for each of the plurality of words 802 and the embedding vector 806 for each of the plurality of words 802.

According to an embodiment, the processor 1200 of FIG. 2 of the server 1000 may split the replacement target text 810 in units of word segments or morphemes and may extract the phoneme sequence 820 from a corpus including word segments and morphemes as a result of the splitting. According to an embodiment, the processor 1200 may extract the phoneme sequence 820 from the replacement target text 810 by using a rule-based defined model. For example, when the replacement target text 810 is 'Sulomon', the processor 1200 may extract the phoneme sequence 820 such as '[S_B OW_I L_I R_I OW_I M_I OW_I NN_E]' by splitting 'Sulomon' in units of word segments.

The server 1000 may obtain the replacement text 830, which is to replace the replacement target text 810, based on phonetic relevance of phoneme sequences. According to an embodiment, the processor 1200 may search the dictionary DB 800 for the replacement target text 810, and may determine a replacement text, based on a similarity 808 of phoneme sequences as a result of the searching. According to an embodiment, the processor 1200 may generate a list by extracting one or more words of which similarities 808 are equal to or greater than a preset second threshold, from among the words found from the dictionary DB 800, and may determine a word having a highest similarity from among the one or more words included in the list to be the replacement text 830. The second threshold is a value that is a reference for determining a similarity between a word found from the dictionary DB 800 and the replacement target text 810. According to an embodiment, the second threshold may be set by a user input received through the client device 2000. A UI for setting the second threshold is described in detail below with reference to FIG. 18.

For example, when the second threshold is set to be relatively low, a probability that words similar to the replacement target text 810 are found from the dictionary DB 800 is high, and thus a relatively large number of replacement texts 830 may be determined. On the other hand, when the second threshold is set to be relatively high, the probability that words similar to the replacement target text 810 are found from the dictionary DB 800 is low, and thus a relatively small number of replacement texts 830 may be determined.

According to the embodiment of FIG. 8, because a similarity of 'Sulomon' with 'Solomon' is found as 0.7822 as a result of searching for 'Sulomon' from the dictionary DB 800 and exceeds the preset second threshold, the processor 1200 may obtain 'Solomon' as the replacement text 830 for replacing 'Sulomon'.

Figure 9:
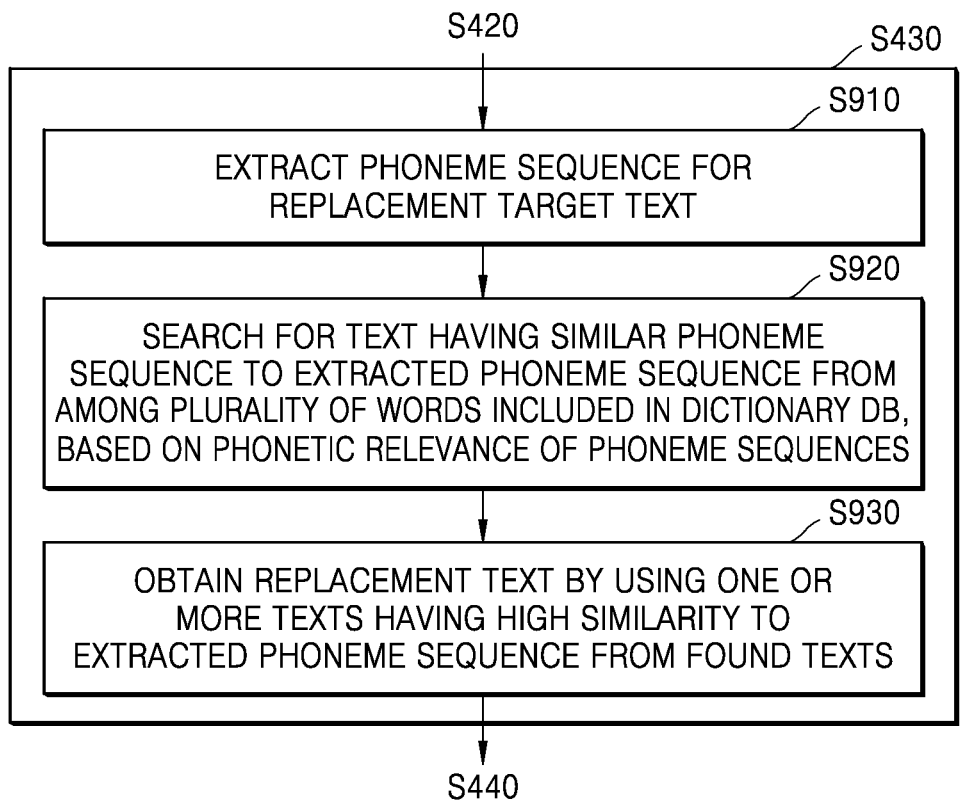
FIG. 9 is a flowchart of an embodiment in which a server generates a replacement text from a replacement target text.

FIG. 9 is a flowchart of an embodiment in which the server 1000 obtains the replacement text from the replacement target text. The operations of FIG. 9 are a more detailed version of operation S430 of FIG. 4, and operation S910 is performed after operation S420 of FIG. 4 is performed. After operation S930 of FIG. 9 is performed, operation S440 of FIG. 4 is performed.

Referring to FIG. 9, in operation S910, the server 1000 extracts a phoneme sequence for the replacement target text. According to an embodiment, the server 1000 may split the replacement target text in units of word segments or morphemes, and may extract the phoneme sequence from a corpus including word segments and morphemes as a result of the splitting. According to an embodiment, the server 1000 may extract the phoneme sequence from the replacement target text by using a rule-based defined model. It is understood, however, that embodiments of the disclosure are not limited thereto. The server 1000 may extract the phoneme sequence from the replacement target text by using a well-known method.

In operation S920, the server 1000 searches for a text having a similar phoneme sequence to the extracted phoneme sequence from among a plurality of words included in a dictionary DB, based on the phonetic relevance of phoneme sequences.

In operation S930, the server 1000 obtains the replacement text by using one or more texts having a high similarity to the extracted phoneme sequence from found texts. According to an embodiment, the server 1000 may search the dictionary DB for the replacement target text, and extract one or more words of which similarities are equal to or greater than the preset second threshold from among the words found from the dictionary DB to generate a list. The server 1000 may determine, as the replacement text, a word having a highest similarity with the replacement target text from among the one or more words included in the list.

Figure 10:
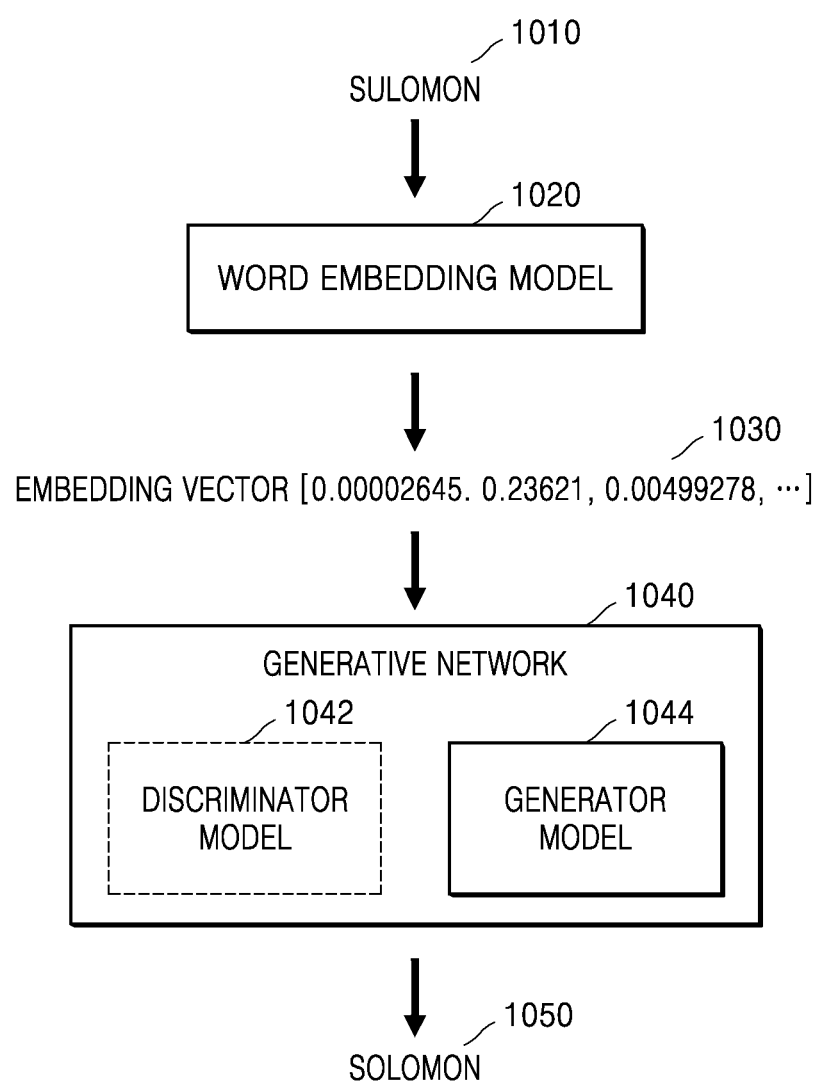
FIG. 10 is a flowchart of an embodiment in which a server generates a replacement text from a replacement target text by using a neural network.

FIG. 10 illustrates an embodiment in which a server 1000 generates a replacement text 1050 from a replacement target text 1010 by using a neural network.

Referring to FIG. 10, the server 1000 may convert the replacement target text 1010 into an embedding vector 1030. According to an embodiment, the processor 1200 of the server 1000 may convert the replacement target text 1010 into the embedding vector 1030 by using a word embedding model 1020. The word embedding model 1020 is configured to quantify, as a numerical value, a word that constitutes a text. For example, the word embedding model 1020 may convert the replacement target text 1010 into the embedding vector 1030 by using an embedding model such as Bag of Words or word2vec. However, embodiments are not limited thereto, and the processor 1200 may convert the replacement target text 1010 into the embedding vector 1030 by using any of well-known embedding models. According to the embodiment of FIG. 10, the processor 1200 may convert a replacement target text 1010 of 'Sulomon' into an N-dimensional embedding vector 1030 having a vector value of [0.00002645. 0.23621, 0.00499278, . . . ] by using the word embedding model 1020.

The server 1000 may generate a replacement text 1050 having a similar vector value to the vector value of the embedding vector 1030, by using the neural network. According to an embodiment, the processor 1200 may generate a text having a similar vector value to the vector value of the embedding vector 1030 of the replacement target text 1010 by using a generative network 1040. The generative network 1040 may include a generator model 1044.

The generative network 1040 may include, for example, a generative adversarial Network (GAN). When the generative network 1040 includes a GAN, the generative network 1040 may include a discriminator model 1042 and the generator model 1044. The discriminator model 1042 and the generator model 1044 may be trained adversarially with each other. The generator model 1044 is a model trained to generate a fake text capable of deceiving the discriminator model 1042, based on the embedding vector 1030 included in the replacement target text 1010 and input to the generative network 1040. The discriminator model 1042 is a model trained to discriminate that the fake text generated by the generator model 1044 is fake. The discriminator model 1042 and the generator model 1044 may be trained until they reach a point of equilibrium with each other. While the discriminator model 1042 and the generator model 1044 are reaching a point of equilibrium with each other, a loss function of the GAN may be appropriately corrected so that the generator model 1044 may sufficiently mimic a data probability distribution of a genuine text, namely, the replacement target text 1010.

According to an embodiment, a probability that fake texts generated by the generator model 1044 are discriminated by the discriminator model 1042 to be not fake texts, but texts capable of replacing the replacement target text 1010 may converge to 0.5. In this case, the processor 1200 may determine a text generated by the generator model 1044 to be the replacement text 1050. According to the embodiment of FIG. 10, the processor 1200 may generate 'Solomon' as the replacement text 1050 for 'Sulomon' as the replacement target text 1010.

Although the replacement text 1050 similar to the embedding vector 1030 of the replacement target text 1010 has been described as being generated using the generative network 1040 in FIG. 10, it is understood that embodiments are not limited thereto. For example, according to another embodiment, the server 1000 may generate the replacement text 1050 by using at least one neural network of a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN) or Deep Q-Networks.

Figure 11:
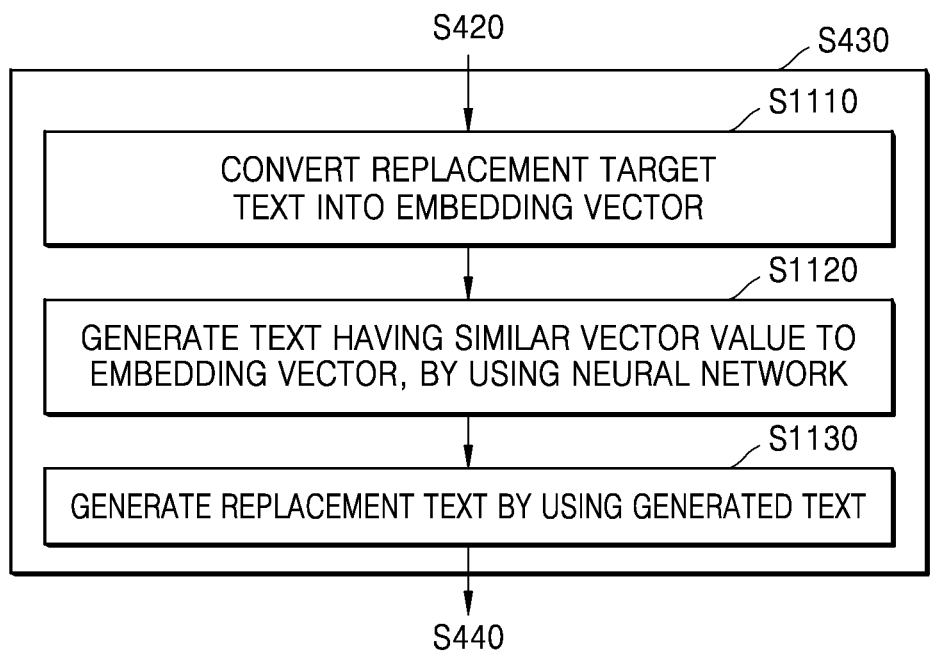
FIG. 11 is a flowchart of an embodiment in which a server generates a replacement text by using a neural network.

FIG. 11 is a flowchart of an embodiment in which the server 1000 generates the replacement text by using a neural network. The operations of FIG. 11 are a more detailed version of operation S430 of FIG. 4, and operation S1110 is performed after operation S420 of FIG. 4 is performed. After operation S1130 of FIG. 11 is performed, operation S440 of FIG. 4 is performed.

Referring to FIG. 11, in operation S1110, the server 1000 converts the replacement target text into an embedding vector. According to an embodiment, the server 1000 may convert the replacement target text into the embedding vector by using a word embedding method, which is a method of quantifying, as a vector value, one word that constitutes a text. For example, the server 1000 may convert the replacement target text into the embedding vector by using an embedding model such as Bag of Words or word2vec.

In operation S1120, the server 1000 generates a text having a similar vector value to the embedding vector, by using a neural network. The server 1000 may generate the text having a similar vector value to the embedding vector of the replacement target text, by using at least one neural network of a CNN, a DNN, an RNN, a GAN, a Deep Convolutional Generative Adversarial Network (DCGAN), an RBM, a DBN, a BRDNN, or Deep Q-Networks.

According to an embodiment, the server 1000 may generate the text having a similar vector value to the embedding vector of the replacement target text, by using a generative network. The generative network may include, for example, a GAN. According to an embodiment, the server 1000 may perform adversarial training of discriminating whether a fake text generated based on the embedding vector of the replacement target text by the generator model 1044 of FIG. 10 included in the GAN are fake by using the discriminator model 1042 of FIG. 10. When a probability that the fake texts generated by the generator model 1044 are discriminated by the discriminator model 1042 to be not fake texts, but texts capable of replacing the replacement target text as a result of the adversarial training converges to 0.5, the server 1000 may output a text.

In operation S1130, the server 1000 generates the replacement text by using the generated text.

Figure 12:
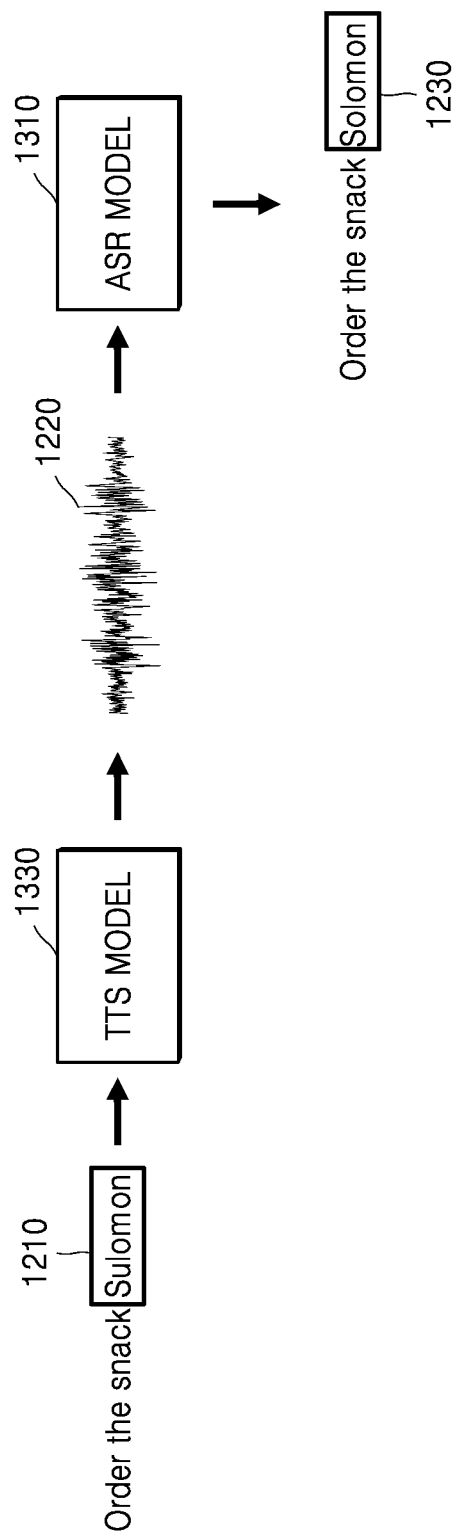
FIG. 12 is a flowchart of an embodiment in which a server generates a replacement text from a replacement target text.

FIG. 12 illustrates an embodiment in which the server 1000 generates a replacement text 1230 from a replacement target text 1210 by using an ASR model 1310 and a TTS model 1330.

Referring to FIG. 12, the processor 1200 of the server 1000 may convert the replacement target text 1210 into a wave signal 1220 by using the TTS model 1330. The TTS model 1330 is configured to convert a text into a wave signal. According to an embodiment, the processor 1200 may convert the replacement target text 1210 into the wave signal 1220 by using the TTS model 1330, and may output the wave signal 1220 as a signal in a binary data streaming form. According to the embodiment of FIG. 12, the processor 1200 may convert 'Sulomon' as the replacement target text 1210 within an input text of 'Order the snack Sulomon' into the wave signal 1220 by using the TTS model 1330, may encode the wave signal 1220 into the signal in a binary data streaming form, and may output the signal in a binary data streaming form.

According to an embodiment, the processor 1200 may convert the replacement target text 1210 into a custom wave signal by using a personalized TTS model. The personalized TTS model generates a wave signal from a text by reflecting personalized characteristics such as the age, gender, region, dialect, intonation, and pronunciation (for example, England English or American English) of an utterer. The personalized TTS model may be generated by performing training by recording the wave signal of a specific user and inputting the recorded wave signal and a text as training data to a DNN. The personalized TTS model may be pre-stored in the memory 1300 of FIG. 2. According to an embodiment, the server 1000 may receive, from the client device 2000, a personalized characteristic value selected based on a user input of inputting information such as a use region, age, gender, intonation, dialect, and pronunciation of an application user. The processor 1200 of the server 1000 may convert the replacement target text 1210 into the wave signal 1220 by reflecting the personalized characteristic value received from the client device 2000, by using the personalized TTS model.

An embodiment in which the client device 2000 receives the personalized characteristic value selected based on a user input of inputting information such as a use region, age, gender, intonation, dialect, and pronunciation of the application user is described in detail below with reference to FIG. 19B.

The server 1000 may convert the output wave signal 1220 into a text by using the ASR model 1310. According to the embodiment of FIG. 12, the processor 1200 may convert the output wave signal 1220 into a text by using the ASR model 1310, and may generate 'Solomon' as the replacement text 1230 which is to replace 'Sulomon' as the replacement target text 1210.

Figure 13:
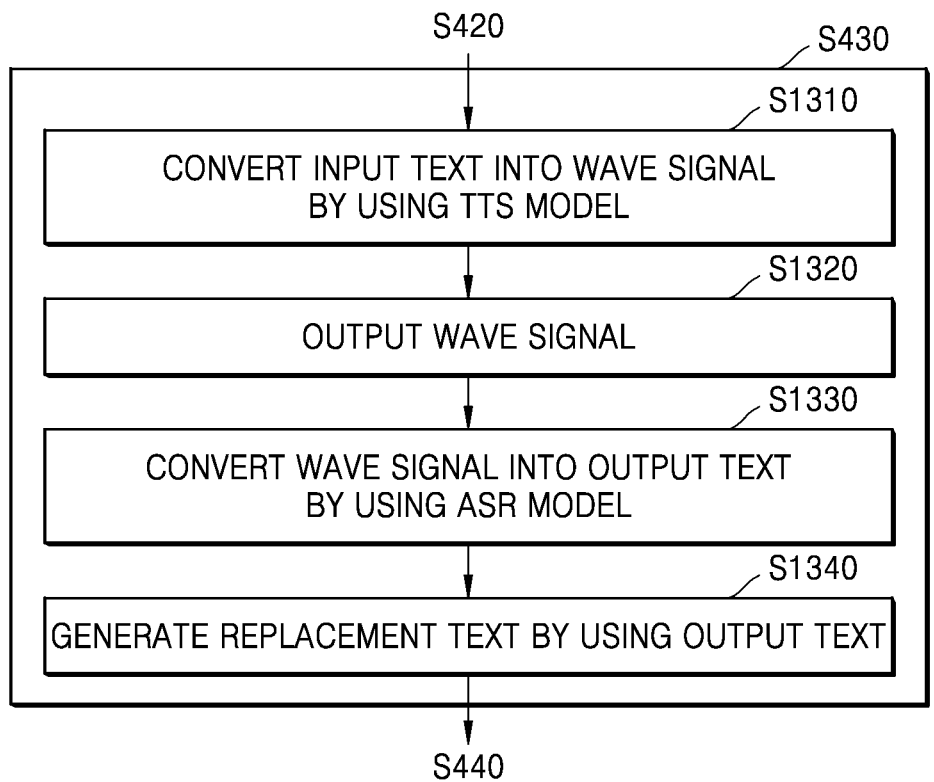
FIG. 13 is a flowchart of an embodiment in which a server generates a replacement text from a replacement target text.

FIG. 13 is a flowchart of an embodiment in which the server 1000 generates the replacement text from the replacement target text. The operations of FIG. 13 are a more detailed version of operation S430 of FIG. 4, and operation S1310 is performed after operation S420 of FIG. 4 is performed. After operation S1340 of FIG. 13 is performed, operation S440 of FIG. 4 is performed.

Referring to FIG. 13, in operation S1310, the server 1000 converts the input text into a wave signal by using a TTS model. The TTS model is a model that converts a text into a wave signal wave signal, and thus the server 1000 may convert the replacement target text included in the input text into the wave signal by using the TTS model.

According to an embodiment, the server 1000 may convert the input text into the wave signal by using a personalized TTS model. The personalized TTS model generates a wave signal from a text by reflecting personalized characteristics such as the age, gender, region, dialect, intonation, and pronunciation (for example, England English or American English) of an utterer. According to an embodiment, the server 1000 may receive, from the client device 2000, a personalized characteristic value selected based on a user input of inputting information such as a use region, age, gender, intonation, dialect, and pronunciation of an application user, and may convert the replacement target text included in the input text into the wave signal, based on the received personalized characteristic value.

In operation S1320, the server 1000 outputs the wave signal. According to an embodiment, the server 1000 may encode the wave signal into a binary data streaming signal configured with binary data including 0 and 1, and may output the binary data streaming signal.

In operation S1330, the server 1000 converts the wave signal into an output text by using an ASR model. The ASR model converts a speech input or an audio signal into a text.

In operation S1340, the server 1000 generates the replacement text by using the output text. According to an embodiment, the replacement text may be a text in which personalized characteristics such as the age, gender, region, dialect, intonation, and pronunciation (for example, England English or American English) of an utterer have been reflected.

Figure 14:
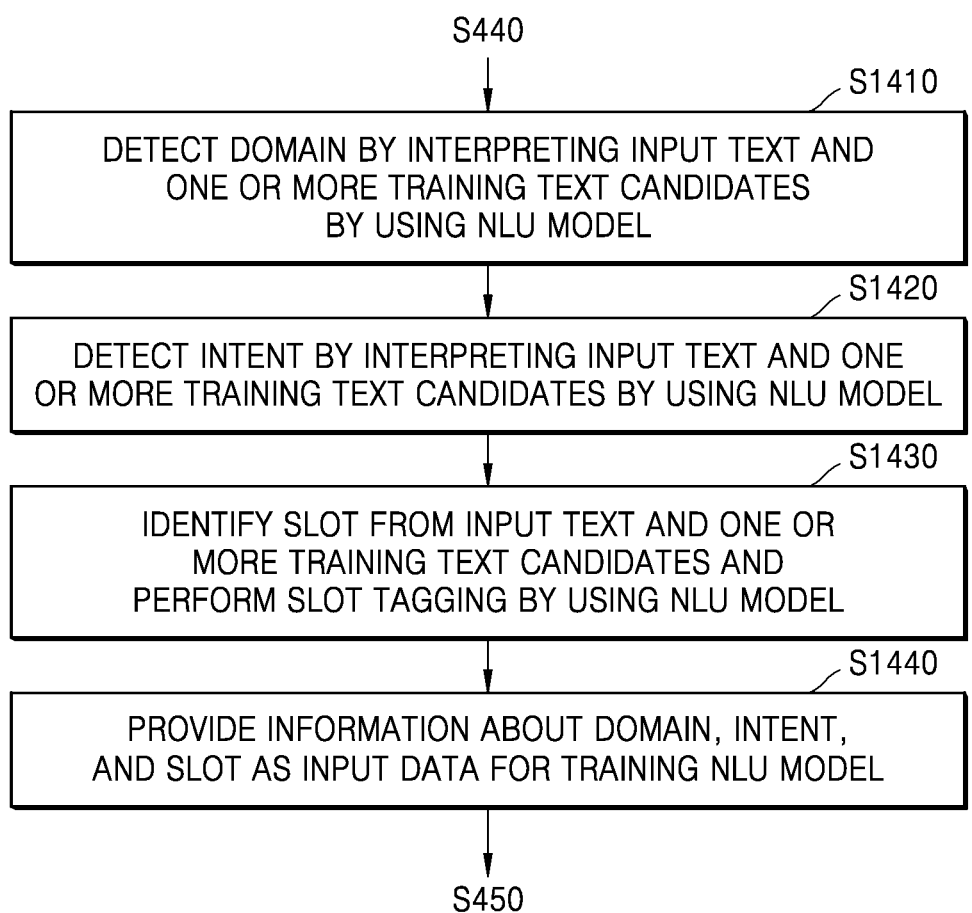
FIG. 14 is a flowchart of a method, performed by a server, of interpreting an input text and one or more training text candidates by using an NLU model and generating information about a result of the interpretation, according to an embodiment.

FIG. 14 is a flowchart of a method, performed by the server 1000, of interpreting an input text and one or more training text candidates by using an NLU model and generating information about a result of the interpretation, according to an embodiment. The operations of the method of FIG. 14 may be performed between operations S440 and S450 of FIG. 4. Operation S1410 of FIG. 14 may be performed after operation S440 of FIG. 4, and operation S450 of FIG. 4 may be performed after operation S1440 of FIG. 14.

Referring to FIG. 14, in operation S1410, the server 1000 detects a domain by interpreting the input text and the one or more training text candidates by using the NLU model. According to an embodiment, the server 1000 may detect a domain that is category information to which or into which the input text and the one or more training text candidates may belong or be classified, by interpreting the input text and the one or more training text candidates by using a domain identification model included in one of the pre-trained first through third NLU models 1320*a* through 1320*c* of FIG. 2. According to an embodiment, the server 1000 may identify one domain or a plurality of domains from the input text and the one or more training text candidates. According to an embodiment, the server 1000 may calculate a relationship between a text and a domain as a numerical value by interpreting the input text and the one or more training text candidates by using the domain identification model. According to an embodiment, the server 1000 may calculate relationships between one domain or a plurality of domains and the input text and the one or more training text candidates as probability values, and may determine a domain having a highest probability value from among the calculated probability values to be the domain into which the input text is classified.

The same domain may be detected from the input text and the one or more training text candidates, but embodiments are not limited thereto. According to another embodiment, for example, the input text and the one or more training text candidates may be classified into different domains, and the one or more training text candidates may be classified into different domains.

In operation S1420, the server 1000 detects an intent by interpreting the input text and the one or more training text candidates by using the NLU model. The server 1000 may detect the intent from the input text and the one or more training text candidates by using an intent identification model of a pre-trained NLU model. According to an embodiment, the server 1000 may detect an intent action from the input text and the one or more training text candidates by using an intent action identification model included in one of the pre-trained first through third NLU models 1320*a* through 1320*c*. According to an embodiment, the server 1000 may detect an intent object from the input text and the one or more training text candidates by using an intent object identification model included in one of the pre-trained first through third NLU models 1320*a* through 1320*c*.

The intent action refers to an action performed by the input text, for example, searching, posting, playing, purchasing, ordering, etc. The server 1000 may detect the intent action from the input text and the one or more training text candidates by performing syntactic analysis or semantic analysis by using the intent action identification model. According to an embodiment, the server 1000 may parse each of the input text and the one or more training text candidates in units of morphemes, words, or phrases by using the intent action identification model, and may infer the meaning of a word or phrase extracted from the parsed input text by using linguistic characteristics (e.g., a syntactic element) of the parsed morphemes, words, or phrases. The server 1000 may determine an intent action corresponding to the meaning of the inferred word or phrase by comparing the meaning of the inferred word or phrase with pre-defined intents provided by the NLU model.

The intent object refers to an object associated with the detected intent action. The intent object is an object that is a target of the detected intent action, and may refer to, for example, a movie, a picture, sports, a weather, or an airline. The server 1000 may detect the intent object related to the intent action from the input text and the one or more training text candidates, by interpreting the input text and the one or more training text candidates by using the intent object identification model.

The same intent may be detected from the input text and the one or more training text candidates, but embodiments are not limited thereto. For example, according to another embodiment, different intents may be detected from the input text and the one or more training text candidates, and different intents may be detected from the one or more training text candidates.

In operation S1430, the server 1000 identifies a slot from the input text and the one or more training text candidates and performs slot tagging by using the NLU model. According to an embodiment, the server 1000 may identify the slot from the input text and the one or more training text candidates by using a slot tagging model included in one of the pre-trained first through third NLU models 1320a through 1320c, and may perform slot tagging to associate the identified slot with the domain, the intent action, and the intent object. The slot refers to variable information for obtaining detailed pieces of information associated with the domain, the intent action, and the intent object from the input text or determining a detailed operation. For example, the slot may include a named entity, a keyword, a place, a region name, a movie title, or a game term. According to an embodiment, the slot is information related to the intent action and the intent object, and a plurality of types of slots may correspond to one intent.

According to an embodiment, the server 1000 may identify one slot or a plurality of slots from the input text and the one or more training text candidates.

Although it has been described above that the server 1000 detects a domain and an intent from the input text and performs slot tagging in operation S1410, operation S1420, and operation S1430, it is understood that embodiments are not limited thereto. According to an embodiment, the server 1000 may determine a domain and an intent corresponding to the input text, based on a user input received through the client device 2000, and perform slot tagging. According to an embodiment, the server 1000 may detect one or more intent candidates related to the input text and one or more slots for slot tagging, by interpreting the input text by using the pre-trained plurality of NLU models 1320a through 1320c, and may transmit the detected one or more intent candidates and the detected one or more slots to the client device 2000. The client device 2000 may display a GUI associated with the detected one or more intent candidates and one or more slots received from the server 1000, and may transmit an intent and slot tagging information selected based on a user input received through the GUI to the server 1000. The server 1000 may determine an intent related to the input text, based on the received intent and slot tagging information, and may perform slot tagging. This is described in greater detail below with reference to FIG. 18.

In operation S1440, the server 1000 provides information about the domain, the intent, and the slot as input data for training the NLU model. According to an embodiment, the server 1000 may select an NLU model related to the input text and the one or more training text candidates from among the pre-stored plurality of NLU models, based on the detected domain and the detected intent.

Figure 15:
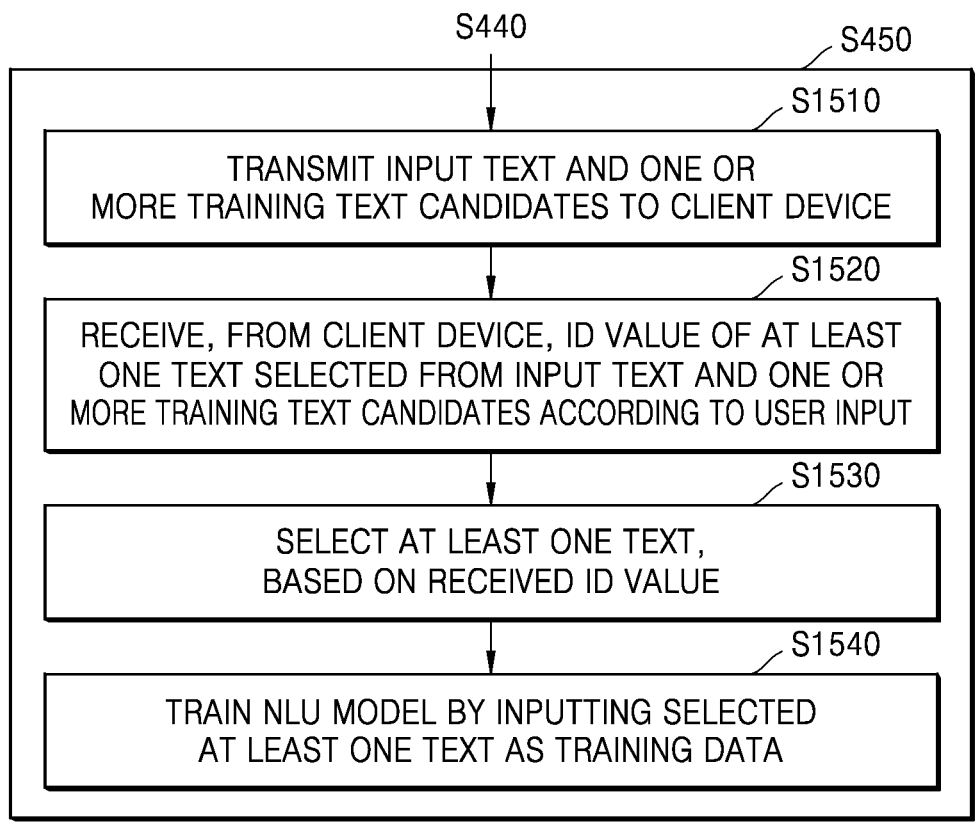
FIG. 15 is a flowchart of an embodiment in which a server determines a text that is input to an NLU model as training data.

FIG. 15 is a flowchart of an embodiment in which the server 1000 determines a text that is input as training data to an NLU model, based on a user input received by the client device 2000. The operations of FIG. 15 are a more detailed version of operation S450 of FIG. 4, and operation S1510 is performed after operation S440 of FIG. 4 is performed.

Referring to FIG. 15, in operation S1510, the server 1000 transmits the input text and the one or more training text candidates to the client device 2000.

In operation S1520, the server 1000 receives, from the client device 2000, the ID value of at least one text selected from among the input text and the one or more training text candidates according to the user input. According to an embodiment, the client device 2000 may receive the input text and the one or more training text candidates from the server 1000, and may display a list of the one or more training text candidates and a GUI for receiving a user input of selecting at least one text from the list. The client device 2000 may select at least one from among the one or more training text candidates, based on a user input received through the GUI, and may transmit the ID value of the selected at least one training text candidate to the server 1000. An embodiment in which the client device 2000 receives the user input for selecting at least one from among the one or more training text candidates is described in detail below with reference to FIG. 20.

In operation S1530, the server 1000 selects at least one text, based on the received ID value. The server 1000 may identify at least one from among the one or more training text candidates included in the list, based on the ID value received from the client device 2000, and may select the identified at least one training text candidate.

In operation S1540, the server 1000 trains the NLU model by using the selected at least one training text candidate as the training data. The server 1000 may perform training by inputting the input text and the at least one training text candidate selected in operation S1530 as the training data. According to an embodiment, the server 1000 may receive information about the domain, the intent, and the slot identified from the input text and the one or more training text candidates in operation S1440 of FIG. 14, and may perform training by using the received domain, intent, and slot information and the at least one text selected in operation S1530 as the input data. It is understood, however, that embodiments are not limited thereto, and the server 1000 may be provided with the domain detected in operation S710 of FIG. 7, the intent detected in operation S720 of FIG. 7, and information about the slot tagging performed in operation S730 of FIG. 7, and may perform training by using the domain, the intent, and the slot tagging information and the at least one text selected in operation S1530 as the input data, according to another embodiment.

An embodiment of training an NLU model will now be described in detail with reference to FIG. 16.

Figure 16:
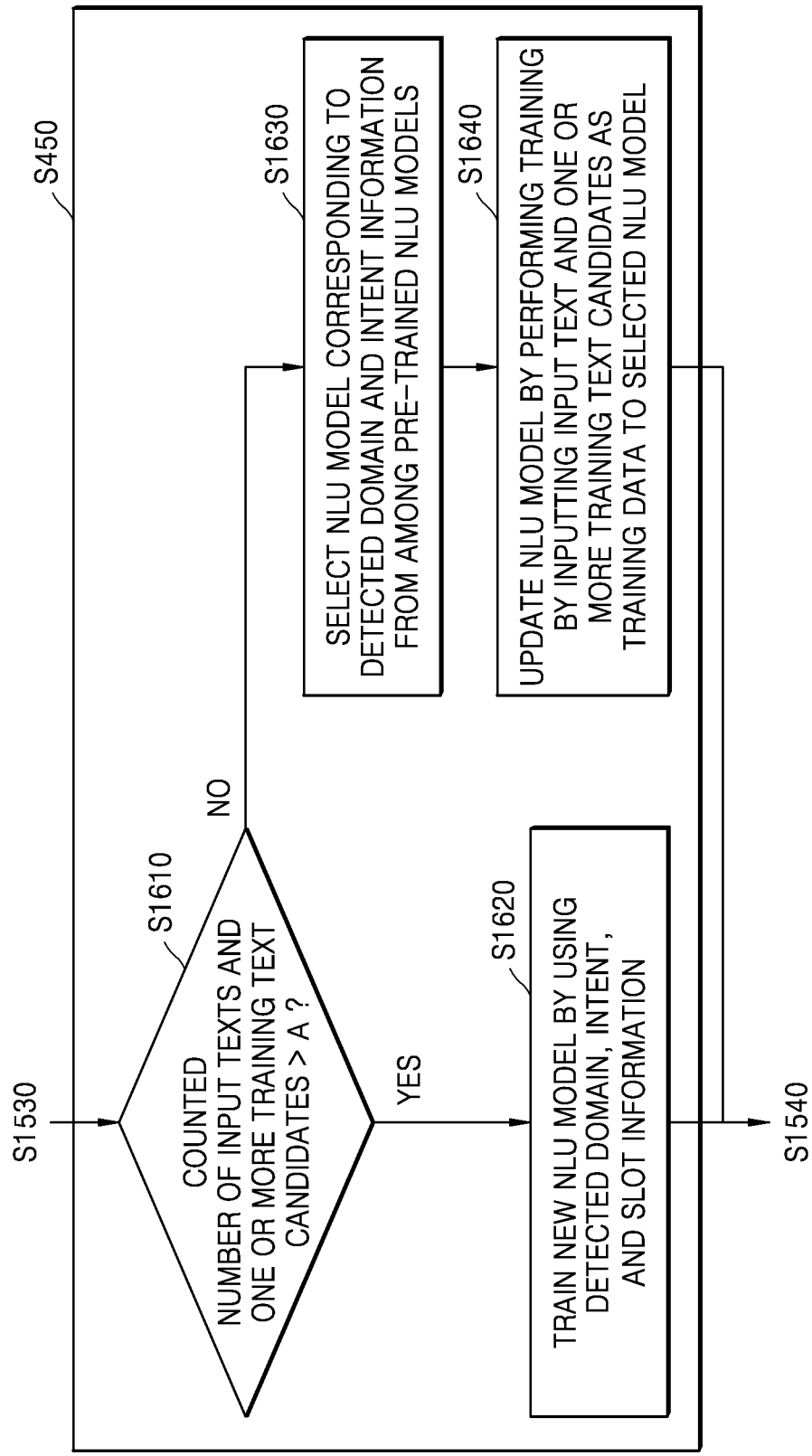
FIG. 16 is a flowchart of an embodiment in which a server trains an NLU model, based on the number of input texts and one or more training text candidates.

FIG. 16 is a flowchart of an embodiment in which the server 1000 trains an NLU model, based on the number of input texts and one or more training text candidates. The operations of FIG. 16 are a more detailed version of operation S450 of FIG. 4. Operations S1610 through S1640 are performed between operations S1530 and S1540.

Referring to FIG. 16, in operation S1610, the server 1000 counts the number of input texts and one or more training text candidates and determines whether the counted number of input texts and one or more training text candidates exceeds a preset third threshold a. The third threshold a is a sum of the number of input texts and one or more training text candidates, and may be set by a user input. The third threshold a may be set by a user input received through a UI displayed by the client device 2000. The UI for setting the third threshold a is described in detail below with reference to FIG. 18.

The preset third threshold a may be, for example, 10, though it is understood that embodiments are not limited thereto.

When the counted number of input texts and one or more training text candidates exceeds the preset third threshold a in operation S1610, the server 1000 trains a new NLU model by using the detected domain, intent, and slot information, in operation S1620. According to an embodiment, the server 1000 may train a new NLU model by using, as the training data, label values of the domain, intent, and slot detected from the input text and the one or more training text candidates and the input text and the one or more training text candidates respectively corresponding to the label values. The NLU model may be trained through a rule-based system using the label values of the domain, intent, and slot respectively corresponding to the input text and the one or more training text candidates as the input data, although it is understood that embodiments are not limited thereto. The NLU model may be, for example, a CNN or an RNN, an SVM, a linear regression, a logistic regression, Naive Bayes, a random forest, a decision tree, or a k-nearest neighbor algorithm. Alternatively, the NLU model may be trained using a combination of the aforementioned systems or an AI model other than the aforementioned systems.

For example, when the number of texts including "Order 3 pepperoni pizzas to be delivered to Eonju-ro 30-gil" as an input text and "Order 3 pepparoni pizzas to be delivered to Eonju-ro 30-gil", "Order 3 papperoni pizzas to be delivered to Eonju-ro 30-gil", and "Order 3 papporoni pizzas to be delivered to Eonju-ro 30-gil" as a plurality of training text candidates exceeds the preset third threshold a, the server 1000 may train a new NLU model having a domain related to 'Order' or 'Deliver'. The server 1000 may train the new NLU model by inputting 'Food ordering' as a label value of an intent for the input text and the plurality of training text candidates and inputting 'pepperoni', 'pepperoni', 'pepperoni', and 'pepporoni' as label values of slots for the input text and the plurality of training text candidates.

When the counted number of input texts and one or more training text candidates is less than or equal to the preset third threshold a in operation S1610, the server 1000 selects an NLU model corresponding to the detected domain and intent information from among pre-trained NLU models, in operation S1630. According to an embodiment, the server 1000 may select an NLU model from the plurality of pre-trained NLU models 1320a through 1320c of FIG. 2 stored in the memory 1300, based on the domain detected from the input text and the one or more training text candidates. According to an embodiment, each of the plurality of pre-trained NLU models 1320a through 1320c is a model trained to be specialized for a specific domain, and the server 1000 may select an NLU model trained with a similar domain to the domain detected from the input text and the one or more training text candidates from among the plurality of pre-trained NLU models 1320a through 1320c. A similarity between the domain detected from the input text and the one or more training text candidates and the domain with which the plurality of pre-trained NLU models 1320a through 1320c are trained may be calculated as a probability value.

For example, the first NLU model 1320a may be a model trained with a movie domain, the second NLU model 1320b may be a model trained with a game domain, and the third NLU model 1320c may be a model trained with a home appliance control domain. According to an embodiment, the server 1000 may detect an intent action and an intent object about the movie from the input text and the one or more training text candidates and identify a slot such as a movie title or a movie actor's name, by interpreting the input text and the one or more training text candidates by using a pre-trained NLU model, and may perform slot tagging. In this case, the server 1000 may calculate a first probability value that the input text and the one or more training text candidates are related to the movie domain, a second probability value that the input text and the one or more training text candidates are related to the game domain, and a third probability value that the input text and the one or more training text candidates are related to the home appliance control domain, and may determine the first probability value from among the first through third probability values to be a maximum value. Accordingly, the server 1000 may select the first NLU model 1320a from the first through third NLU models 1320a through 1320c, based on the first probability value.

In operation S1640, the server 1000 updates the NLU model by performing training by inputting the input text and the one or more training text candidates as the training data to the selected NLU model. According to an embodiment, the server 1000 may update the first NLU model 1320a by inputting the input text, the at least one text, and label values for the domain, intent, and slot as input data to the first NLU model 1320a selected from among the first through third NLU models 1320a through 1320c and performing training by using the input data. According to an embodiment, the domain identification model 1322a of FIG. 2, the intent action identification model 1323a of FIG. 2, the intent object identification model 1324a of FIG. 2, and the slot tagging model 1325a of FIG. 2 included in the first NLU model 1320a may be updated.

According to an embodiment, in order to support a new intent action not yet included in the intent action identification model 1323a of the first NLU model 1320a, the server 1000 may update the intent action identification model 1323a by performing training by inputting the input text and the one or more training text candidates to the intent action identification model 1323a and inputting a label value of the new intent action corresponding to the input text and the one or more training text candidates. According to an embodiment, an intent action related to a new domain may be supported by the intent action identification model 1323a before being updated.

According to an embodiment, in order to support a new intent object not yet included in the intent object identification model 1324a of the first NLU model 1320a, the server 1000 may update the intent object identification model 1324a by performing training by inputting the input text and the one or more training text candidates to the intent object identification model 1324a and inputting a label value of the new intent object corresponding to the input text and the one or more training text candidates. According to an embodiment, an intent object related to a new domain may be supported by the intent object identification model 1324a before being updated.

According to an embodiment, the server 1000 may update the slot tagging model 1325a by performing training by inputting the slot identified from the input text and the one or more training text candidates and a label value of the slot.

For example, when the input text is "Search for the release date of the movie Avengers Endgame" and the plurality of training text candidates are "Search for the release date of the movie Avengers Endgame", "Search for the release date of the movie Avengers Endgame", and "Search for the release date of the movie Avengeours Endgame", the server 1000 may detect a 'movie' domain from the input text and the plurality of training text candidates, calculate probability values representing connection degrees between the 'movie' domain and the domains of the first through third NLU models 1320a through 1320c, and select the first NLU model 1320a. According to an embodiment, the server 1000 may update the intent action identification model 1323a by performing training by using a label value for 'search' as the new intent action not yet included in the intent action identification model 1323a of the first NLU model 1320a, the input text, and the plurality of training text candidates. According to an embodiment, the server 1000 may update the intent object identification model 1324*a* by performing training by using a label value for 'release date' as the new intent object not yet included in the intent action identification model 1324*a* of the first NLU model 1320*a*, the input text, and the plurality of training text candidates. According to an embodiment, the server 1000 may update the slot tagging model 1325*a* by performing training by using label values for 'Avengers Endgame', 'Avengers Endgame', 'Avengers Endgame', and 'Avengeours Endgame' as slot elements not yet included in the slot tagging model 1325*a* of the first NLU model 1320*a*, the input text, and the plurality of training text candidates.

Figure 17:
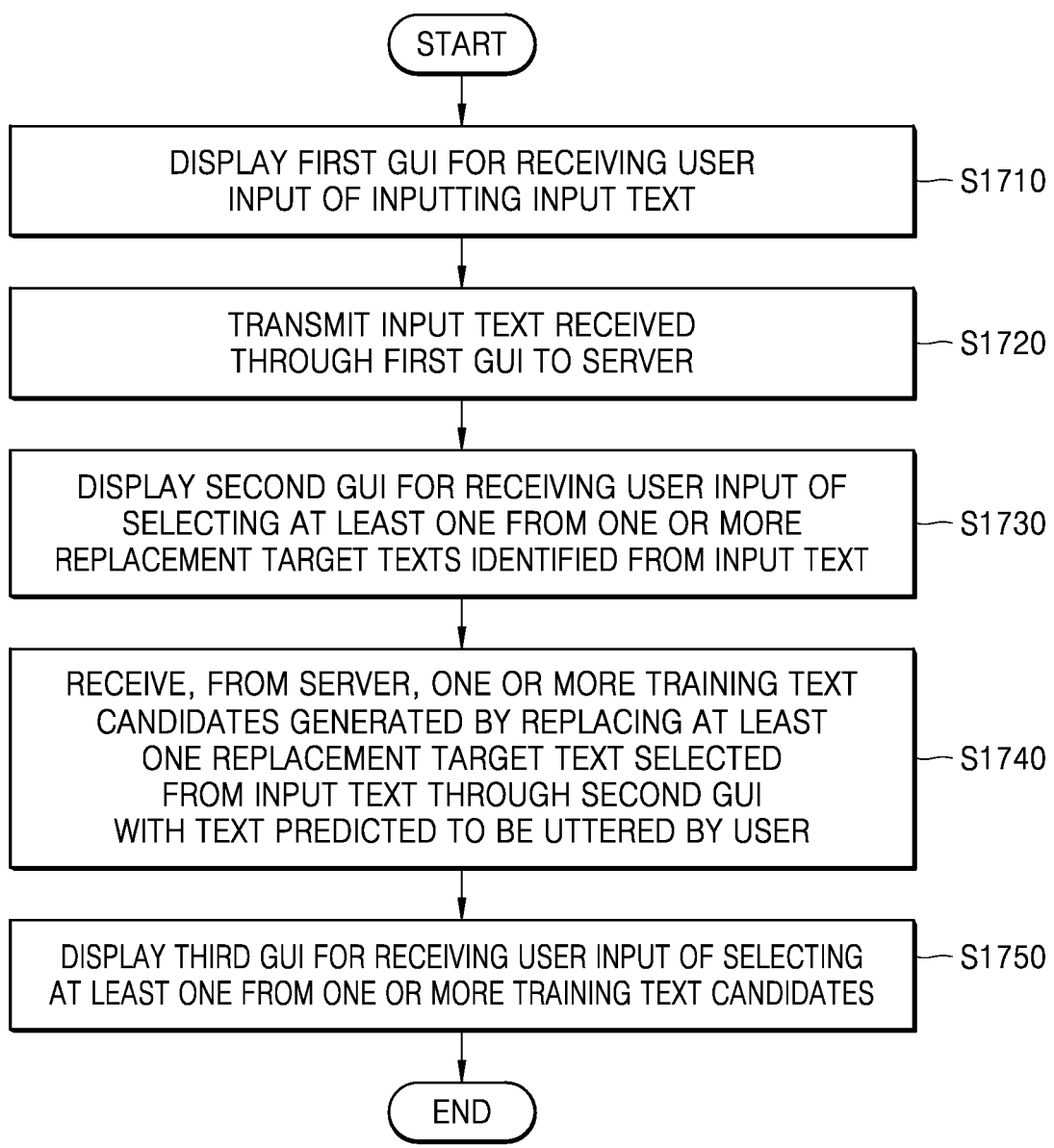
FIG. 17 is a flowchart of an operation of a client device, according to an embodiment.

FIG. 17 is a flowchart of an operation of the client device 2000, according to an embodiment.

Referring to FIG. 17, in operation S1710, the client device 2000 displays a first GUI for receiving a user input of inputting the input text. The processor 2200 of the client device 2000 may display the first GUI on the display 2510, and may receive the input text from the user through the user input interface 2410.

In operation S1720, the client device 2000 transmits the input text received through the first GUI to the server 1000. According to an embodiment, the processor 2200 may control the communication interface 2100 to transmit the input text received from the user to the server 1000.

In operation S1730, the client device 2000 displays a second GUI for receiving a user input of selecting at least one from among the one or more replacement target texts identified from the input text. According to an embodiment, the one or more replacement target texts may be identified by the server 1000, and the client device 2000 may receive the ID values of the one or more replacement target texts from the server 1000 by using the communication interface 2100. According to an embodiment, the processor 2200 may display a list including the one or more replacement target texts, on the display 2510. According to an embodiment, the processor 2200 may display, on the display 2510, a second GUI for receiving a user input of selecting at least one from the one or more replacement target texts included in the list. The processor 2200 may receive a user input of selecting at least one from among the one or more replacement target texts included in the list, through the user input interface 2410.

It is understood, however, that embodiments are not limited thereto, and the client device 2000 may autonomously identify the replacement target text from the input text. A method, performed by the processor 2200 of the client device 2000, of identifying the replacement target text from the input text is the same as the method performed by the processor 1200 of FIG. 2 of the server 1000, and thus a redundant description thereof is omitted below.

In operation S1740, the client device 2000 receives, from the server 1000, the one or more training text candidates generated by replacing the at least one replacement target text selected from the input text through the second GUI with a text predicted to be uttered by the user. According to an embodiment, the one or more training text candidates may be generated by the server 1000, and the processor 2200 may receive the ID values of the one or more training text candidates from the server 1000 by using the communication interface 2100.

It is understood, however, that embodiments are not limited thereto, and the client device 2000 may generate the one or more training text candidates by autonomously replacing the replacement target text with the replacement text predicted to be uttered by the user according to another embodiment. A method, performed by the processor 2200 of the client device 2000, of generating the one or more training text candidates by replacing the replacement target text with the replacement text is the same as the method performed by the processor 1200 of FIG. 2 of the server 1000, and thus a redundant description thereof is omitted below.

In operation S1750, the client device 2000 displays a third GUI for receiving a user input of selecting at least one from among the one or more training text candidates. According to an embodiment, the processor 2200 may display a list including the one or more training text candidates on the display 2510. According to an embodiment, the processor 2200 may display, on the display 2510, a third GUI for receiving a user input of selecting at least one from the one or more training text candidates included in the list.

The processor 2200 may receive a user input of selecting at least one from among the one or more training text candidates included in the list, through the user input interface 2410.

Figure 18:
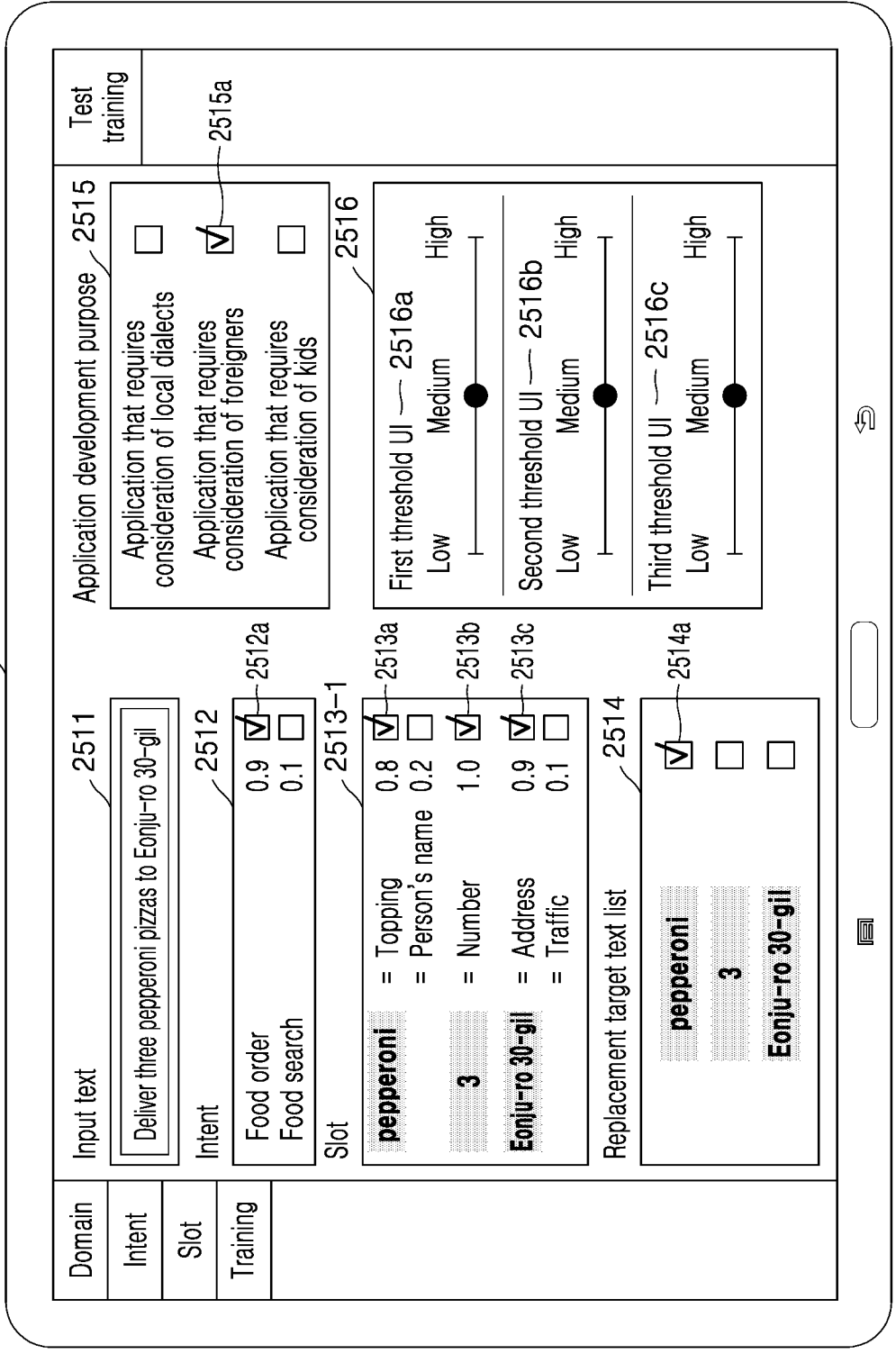
FIG. 18 illustrates an example in which a client device according to an embodiment displays a graphical user interface (GUI)

FIG. 18 illustrates an example in which the client device 2000 displays a GUI, according to an embodiment.

Referring to FIG. 18, the client device 2000 may display a first GUI 2511, a second GUI 2512, a third GUI 2513-1, a fourth GUI 2514, a fifth GUI 2515, and a sixth GUI 2516 on the display 2510. The first GUI 2511, the second GUI 2512, the third GUI 2513-1, the fourth GUI 2514, the fifth GUI 2515, and the sixth GUI 2516 are GUIs for receiving an input from a user, and the user may be a developer trying to train a language model that is to be included in an application that the developer is developing.

The first GUI 2511 is a GUI for receiving a user input of inputting the input text. The processor 2200 of FIG. 3 of the client device 2000 may display the first GUI 2511 on the display 2510, and may receive the input text from the developer through the user input interface 2410 of FIG. 3. According to the embodiment of FIG. 18, the processor 2200 may receive the input text of "Deliver three pepperoni pizzas to Eonju-ro 30-gil" from the developer.

The second GUI 2512 represents information about the intent detected from the input text. According to an embodiment, the intent may be detected from the input text by the server 1000, and the processor 2200 of the client device 2000 may receive information about the detected intent through the communication interface 2100 of FIG. 3. The processor 2200 may display, on the display 2510, the second GUI 2512 representing the received information about the intent. However, embodiments are not limited thereto, and the processor 2200 may detect the intent from the input text by autonomously interpreting the input text by using a pre-trained NLU model according to another embodiment. The intent may include an intent action and an intent object.

The second GUI 2512 may include one or more intent candidates, respective confidence scores for the one or more intent candidates, and a selection option GUI 2512*a*. The confidence scores for the one or more intent candidates are numerical values representing whether the intent has been accurately detected from the input text. According to an embodiment, the confidence score may be a figure ranging from 0 to 1, and, when the confidence score increases, this may mean that the intent is more related to an utterance intention of the input text. The selection option GUI 2512*a* may provide one or more intent candidates detected from the input text to the developer, and the processor 2200 may receive an input of selecting or determining one from among the one or more intent candidates, from the developer through the selection option GUI 2512*a*. According to the embodiment of FIG. 18, the second GUI 2512 may display 'food order' and 'food search' as the intent candidates detected from the input text, and may display a confidence score for 'food order' as 0.9 and a confidence score for 'food search' as 0.1. The client device 2000 may receive an input of determining 'food order' as the intent from among the two intent candidates through the selection option GUI 2512*a*.

The second GUI 2512 may further include a GUI for adding a new intent.

The third GUI 2513-1 may include one or more slots detected from the input text, respective confidence scores for the one or more slots, and selection option GUIs 2513*a*, 2513*b*, and 2513*c*. The confidence scores for the one or more slots are numerical values representing the accuracy of slot tagging of the slots detected from the input text. The selection option GUIs 2513*a*, 2513*b*, and 2513*c* may provide the one or more slots detected from the input text to the developer, and the processor 2200 may receive an input of performing tagging with respect to each of the one or more slots from the developer through the selection option GUIs 2513*a*, 2513*b*, and 2513*c*. According to the embodiment of FIG. 18, the third GUI 2513-1 may display 'pepperoni', '3', and 'Eonju-ro 30-gil' as slots detected from the input text, display a topping and a person's name as a result of slot tagging with respect to 'pepperoni', display the number as a result of slot tagging with respect to '3', and display an address and traffic as a result of slot tagging with respect to 'Eonju-ro 30-gil'. In the third GUI 2513-1, a numerical value for the topping as a result of slot tagging of 'pepperoni' may be 0.8, and a numerical value for the person's name as a result of slot tagging of 'pepperoni' may be 0.2. In the third GUI 2513-1, a numerical value for the number as a result of slot tagging of '3' may be 1.0. In the third GUI 2513-1, a numerical value for the address as a result of slot tagging of 'Eonju-ro 30-gil' may be 0.9, and a numerical value for the traffic as a result of slot tagging of 'Eonju-ro 30-gil' may be 0.1. The processor 2200 may receive, from the developer, an input of selecting one of the topping and the person's name displayed as a result of the slot tagging with respect to 'pepperoni' through the selection option GUI 2513*a*. The processor 2200 may receive, from the developer, an input of selecting the number displayed as a result of the slot tagging with respect to '3' through the selection option GUI 2513*b*. The processor 2000 may receive, from the developer, an input of selecting one of the address and the traffic displayed as a result of the slot tagging with respect to 'Eonju-ro 30-gil' through the selection option GUI 2513*c*.

The third GUI 2513-1 may further include a GUI for adding a new slot.

The fourth GUI 2514 may include a list of a plurality of replacement target texts and a selection option GUI 2514*a* for selecting each of the plurality of replacement target texts included in the list. The replacement target texts displayed through the fourth GUI 2514 may be the slots identified from the input text by the server 1000, but it is understood that embodiments are not limited thereto. According to another embodiment, for example, the replacement target texts may be the slots identified from the input text by the processor 2200 of the client device 2000. According to another embodiment, the processor 2200 may receive, from the developer, an input of selecting a word or phrase included in the input text through the user input interface 2410 of FIG. 3, and may determine the word or phrase selected based on the received input, as a replacement target text. For example, the developer may select 'pepperoni' included in the input text through a touch and drag input or through a click and drag input through a mouse.

According to the embodiment of FIG. 18, the processor 2200 may receive, from the developer, an input of selecting each of 'pepperoni', '3', and 'Eonju-ro 30-gil' included in the replacement target text list as a replacement target text through the selection option GUI 2514*a*.

The fifth GUI 2515 may include a list of the characteristics of the application, and a selection option GUI 2515*a* for receiving an input of selecting at least one from among the characteristics of the application included in the list. The characteristics of the application may represent application development purposes of the developer trying to develop an application including a trained language model. The application development purposes may be determined based on context information including at least one of the age, gender, region, used language, intonation, or dialect of the application user, like development of an application that requires consideration of local dialects, development of an application that requires consideration of foreigners, and development of an application that requires consideration of kids. The processor 2200 may receive from the developer an input of selecting one from among the application development purposes through the selection option GUI 2515*a*.

The client device 2000 may determine the replacement target text and the application development purpose, based on the input received from the developer, and may generate the replacement text by taking into account context information according to the determined replacement target text and the determined application development purpose. According to an embodiment, the processor 2200 of the client device 2000 may determine the replacement target text, based on the application development purpose selected based on the user input. The processor 2200 may determine the replacement target text based on the application development purpose selected through the user input, by using a deep neural network pre-trained using the application development purpose and the replacement target text as training data or by using a rule-based model that defines a pairing relationship between the application development purpose and the replacement target text. For example, when an application that requires consideration of foreigners (or non-native speakers) is selected as the application development purpose through the fifth GUI 2515, the processor 2200 may determine "pepperoni" highly likely to be relatively inaccurately pronounced from among the words included in the replacement target text list, as the replacement target text, by using the pre-trained deep neural network or the rule-based model.

The client device 2000 may generate a replacement text by taking into account context information according to the determined replacement target text and the determined application development purpose. For example, when the replacement target text is determined to be 'pepperoni' and the application development purpose is determined to be 'application that requires consideration of foreigners', the processor 2200 may generate texts frequently pronounced for 'pepperoni' by foreigners, such as 'pepperoni' and 'pepporoni', as replacement texts, by taking into account context information such as the region, the used language, and the like of the application user.

The sixth GUI 2516 is a GUI for receiving a user input of setting a threshold. According to an embodiment, the sixth GUI 2516 may include a first threshold UI 2516*a* for receiving a user input of setting a first threshold, a second threshold UI 2516*b* for receiving a user input of setting a second threshold, and a third threshold UI 2516*c* for receiving a user input of setting a third threshold.

The first threshold UI 2516*a* is a UI for receiving a user input for setting a threshold of a use frequency serving as a reference value for determining a replacement target text, as a result of searching for each of a plurality of words included in the input text input through the first GUI 2511 from the dictionary DB 1370 of FIG. 2. The first threshold UI 2516*a* may include, for example, a bar including a low level, a medium level, and a high level, and a UI of a cursor for adjusting the threshold. The user may set or adjust the threshold to be high or low by, for example, moving the cursor. However, it is understood that embodiments are not limited thereto, and the first threshold UI 2516*a* may include a UI for directly inputting a numerical value of the use frequency according to another embodiment.

For example, when (or based on) the first threshold is set to be relatively low through the first threshold UI 2516*a*, a small number of words of which use frequencies are less than the first threshold may be found from the dictionary DB 1370, and thus the number of replacement target texts may be relatively small. According to the embodiment of FIG. 18, when the first threshold is set to be low, only 'pepperoni' from the input text may be determined to be a replacement target text.

On the other hand, when (or based on) the first threshold is set to be relatively high through the first threshold UI 2516*a*, even words of which use frequencies are lower than the first threshold may be highly likely to be determined as replacement target texts as a result of searching the dictionary DB 1370, and thus a relatively large number of replacement target texts may be determined. According to the embodiment of FIG. 18, when the first threshold is set to be relatively high, all of 'pepperoni', '3', and 'Eonju-ro 30-gil' from the input text may be determined to be replacement target texts.

The second threshold UI 2516*b* is a UI for receiving a user input of setting a threshold of a similarity serving as a reference for determining a replacement text, as a result of searching for the replacement target text identified from the input text from the dictionary DB 1370. The second threshold is a value that is a reference for determining a similarity between a word found from the dictionary DB 1370 and the replacement target text. According to an embodiment, the second threshold UI 2516*b* may include a bar including a low level, a medium level, and a high level, and a UI of a cursor for adjusting a threshold, like the first threshold UI 2516*a*. The user may set or adjust the second threshold to be high or low, by, for example, moving the cursor.

For example, when the second threshold is set to be relatively low through the second threshold UI 2516*b*, a probability that words similar to the replacement target text are found from the dictionary DB 1370 is high, and thus a relatively large number of replacement texts may be determined. On the other hand, when the second threshold is set to be relatively high through the second threshold UI 2516*b*, the probability that words similar to the replacement target text are found from the dictionary DB 1370 is low, and thus a relatively small number of replacement texts may be determined.

The third threshold UI 2516*c* is a UI for receiving a user input of setting a threshold of the number of texts used to perform training using an NLU model from among the input text and the one or more training text candidates. The third threshold is a sum of the number of input texts and one or more training text candidates, and may be set by the user input received through the third threshold UI 2516*c*. The third threshold UI 2516*c* may include a bar including a low level, a medium level, and a high level, and a UI of a cursor for adjusting the threshold, like the first and second threshold UIs 2516*a* and 2516*b*. The user may set or adjust the third threshold to be high or low, by, for example, moving the cursor. It is understood, however, that embodiments are not limited thereto, and the third threshold UI 2516*c* may include a UI for directly inputting the number of training text candidates that are to be used as training data to train the NLU model.

Figure 19A:
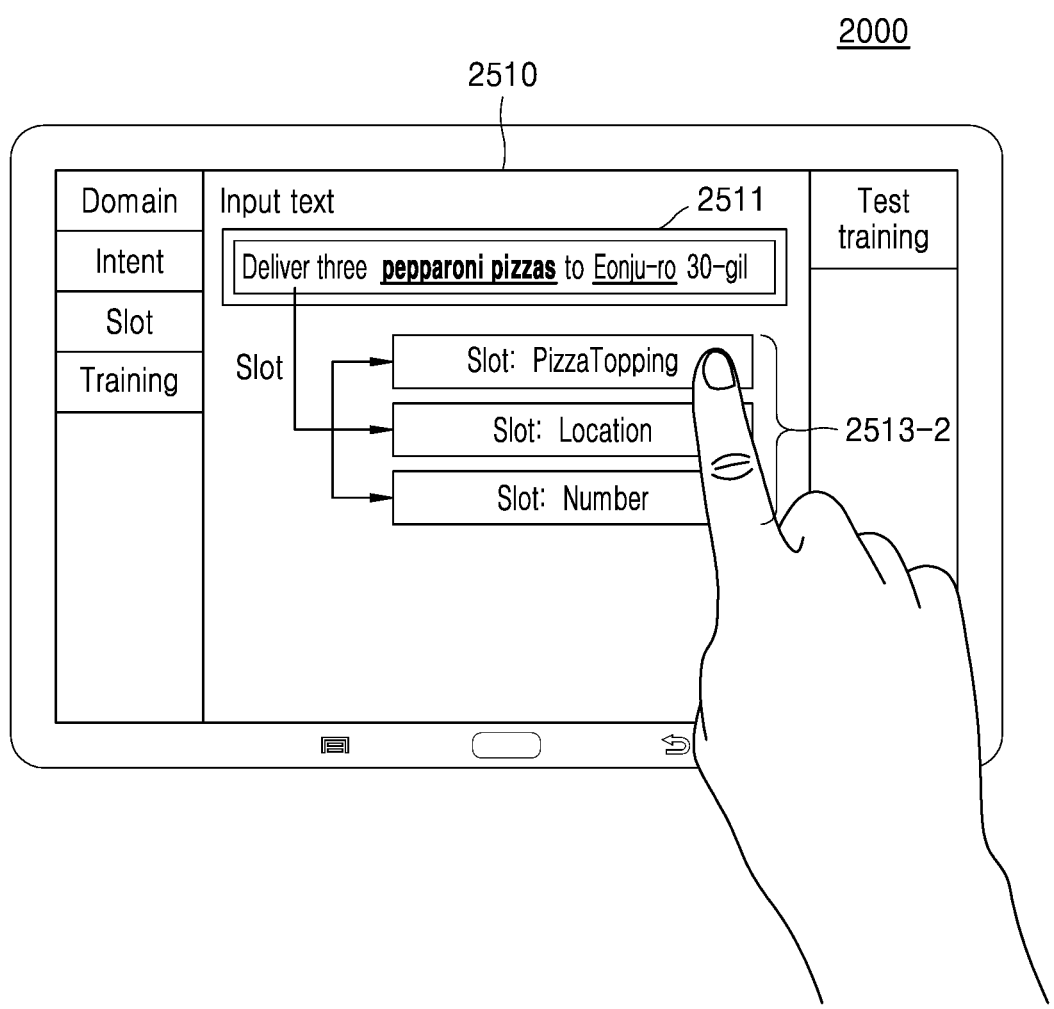
FIG. 19A illustrates an example in which a client device according to an embodiment displays a GUI.

FIG. 19A illustrates an example in which the client device 2000 displays a GUI according to an embodiment.

Referring to FIG. 19A, the client device 2000 may display the first GUI 2511 and a slot tagging GUI 2513-2 on the display 2510. The client device 2000 may receive an input text from a developer through the first GUI 2511. The client device 2000 may receive an input of tagging a slot detected from the input text or selected through the slot tagging GUI 2513-2.

According to an embodiment, the slot tagging GUI 2513-2 may enumerate slot candidates that may be tagged for the slot detected from the input text or selected, and may receive from the developer an input of selecting one from the enumerated slot candidates. According to the embodiment of FIG. 19A, for 'pepperoni' as a slot element detected from the input text of "Deliver 3 pepperoni pizzas to Eonju-ro 30-gil" or selected, the slot tagging GUI 2513-2 may display PizzaTopping, Location, and Number as the slot candidates that are to be tagged. The processor 2200 of the client device 2000 may receive, from the developer, an input of selecting a slot that is to be tagged on 'pepperoni', from among PizzaTopping, Location, and Number, through the slot tagging GUI 2513-2.

Figure 19B:
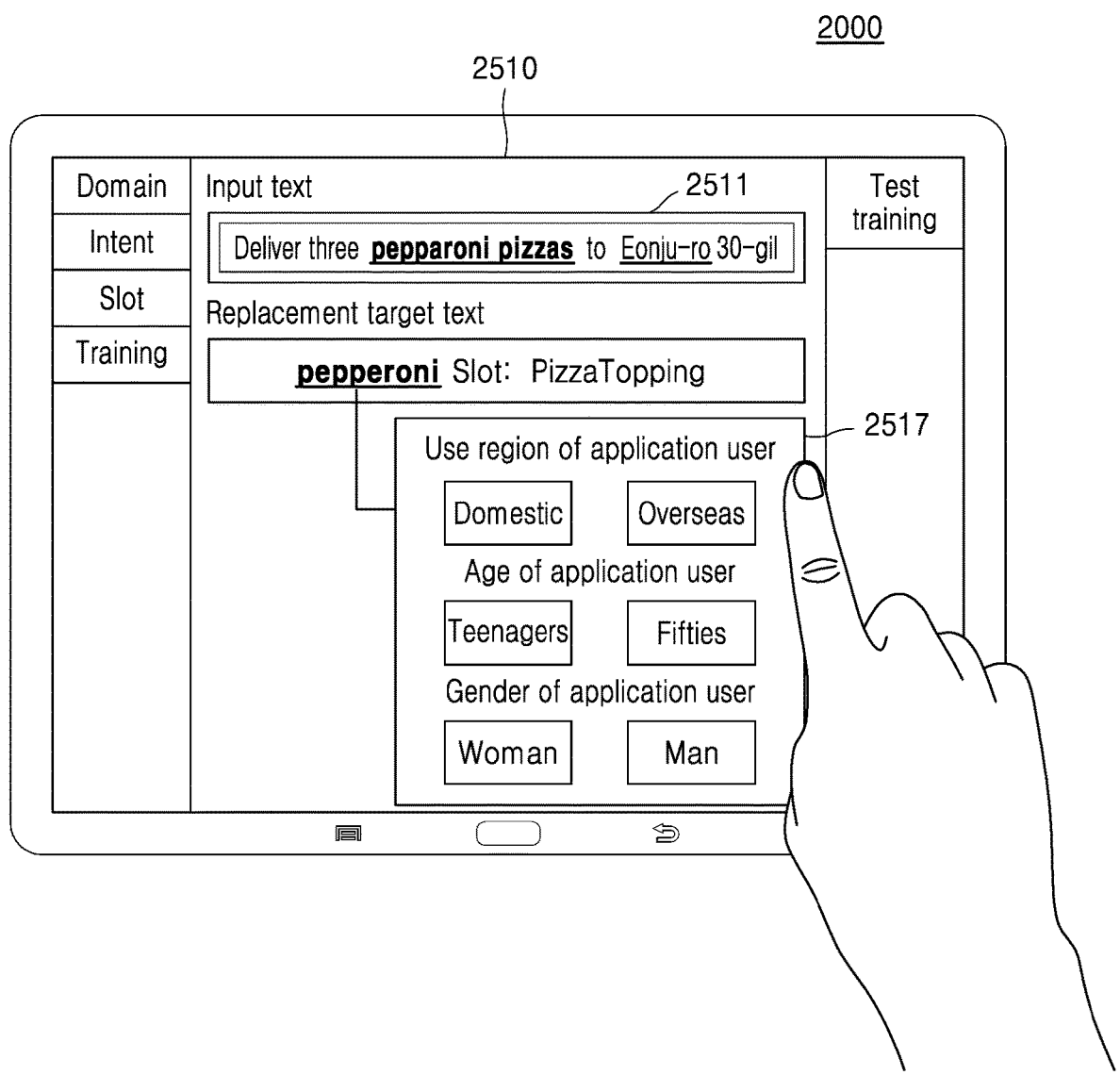
FIG. 19B illustrates an example in which a client device according to an embodiment displays a GUI.

FIG. 19B illustrates an example in which the client device 2000 displays a GUI according to an embodiment.

Referring to FIG. 19B, the client device 2000 may display the first GUI 2511 and an application characteristic selection GUI 2517 on the display 2510. The processor 2200 may receive an input text from a developer through the first GUI 2511. The processor 2200 may display one or more application characteristics through the application characteristic selection GUI 2517, and may receive an input of selecting at least one from among the one or more application characteristics.

The application characteristic selection GUI 2517 may be configured to enumerate pieces of context information of a user who uses an application using a trained language model, and receive an input of selecting at least one from among the enumerated pieces of context information. The pieces of context information may include, for example, at least one of the age, the gender, the region, the used language, or the dialect of the application user. According to the embodiment of FIG. 19B, the application characteristic selection GUI 2517 may display a GUI for selecting the use region of the application user, the age of the application user, and the gender of the application user, and the processor 2200 may receive an input of selecting the use region of the application user, the age of the application user, and the gender of the application user, from the developer through the application characteristic selection GUI 2517.

According to an embodiment, the processor 2200 of the client device 2000 may obtain context information of the application user, based on the input received through the application characteristic selection GUI 2517, and may generate a replacement text that is to replace the replacement target text, based on the context information. For example, when the region of the application user is overseas, the processor 2200 of the client device 2000 may generate the replacement text by using a personalized TTS model specialized for pronunciation for each country and an ASR model. Similarly, as for the age and gender of the application user, the processor 2200 of the client device 2000 may generate the replacement text by using personalized TTS models specialized for the age and gender of the application user and an ASR model. A method of generating the replacement text using the personalized TTS model and the ASR model is the same as the method described above with reference to FIGS. 12 and 13, and thus a redundant description is omitted below.

According to an embodiment, the processor 2200 of the client device 2000 may transmit the context information of the application user selected through the application characteristic selection GUI 2517 to the server 1000. The server 1000 may select a personalized TTS model, based on the context information, convert the replacement target text into the wave signal by using the selected personalized TTS model, output the wave signal, and convert the output wave signal back into a text by using the ASR model 1310 of FIG. 2, thereby generating the replacement text. The server 1000 may transmit the generated replacement text to the client device 2000. According to another embodiment, the server 1000 may convert the replacement target text into the wave signal by using the general TTS model 1330 of FIG. 2, and convert the wave signal output through the TTS model 1330 into a replacement text in which the context information has been reflected, by using the Vocal Tract Length Perturbation (VTLP) technique, thereby generating the replacement text. For example, the server 1000 may convert a frequency of the output wave signal of the TTS model 1330 such that a child voice, an adult voice, or a grandmother voice is reflected in the output wave signal, by using the VTLP technique, and perform ARS on the frequency-converted wave signal through the ASR model 1310, thereby generating a replacement text in which the context information including at least one of the age, the gender, the region, the use language, the intonation, or the dialect has been reflected.

It is understood, however, that embodiments are not limited thereto, and the client device 2000 may autonomously generate the replacement text in which the context information has been reflected, by using the personalized TTS model.

According to an embodiment, the application characteristic selection GUI 2517 may be displayed in a pop-up window form.

Figure 20:
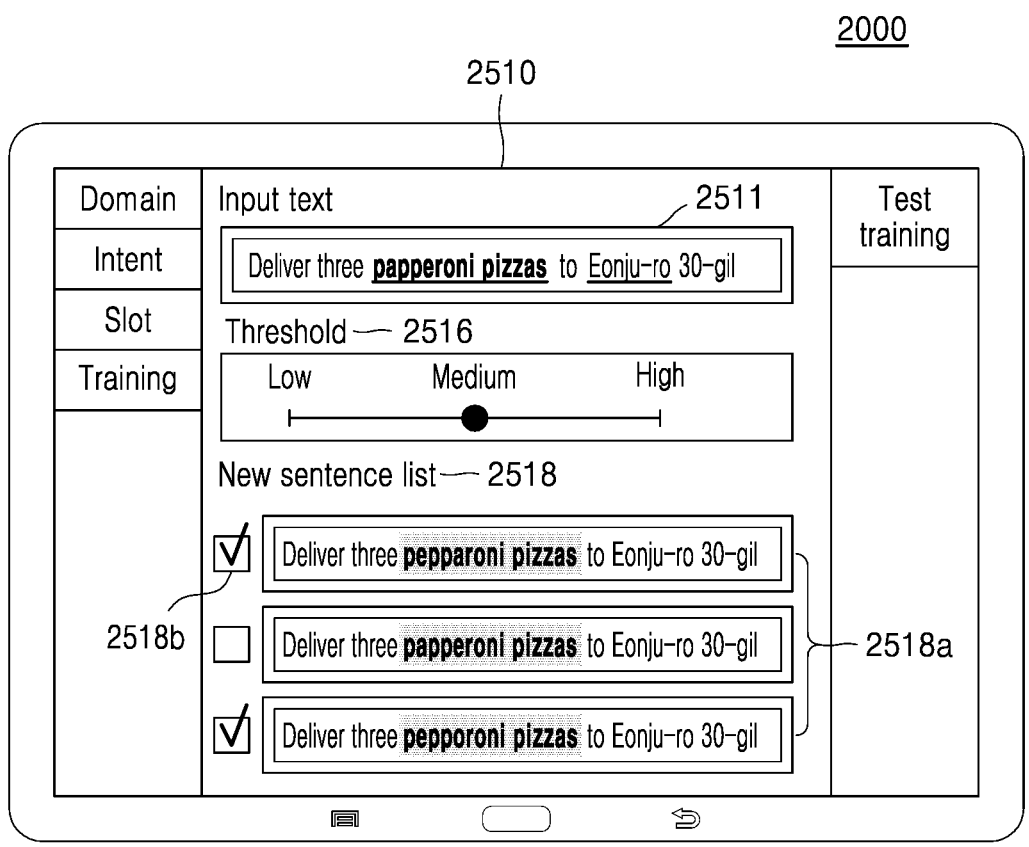
FIG. 20 illustrates an example in which a client device according to an embodiment displays a GUI.

FIG. 20 illustrates an example in which the client device 2000 displays a GUI.

Referring to FIG. 20, the client device 2000 may display the first GUI 2511, the sixth GUI 2516, and a new sentence list GUI 2518 on the display 2510. The client device 2000 may receive an input text from a developer through the first GUI 2511. The client device 2000 may display the sixth GUI 2516 for receiving a user input of setting a threshold. The client device 2000 may display a list including the one or more training text candidates, through the new sentence list GUI 2518.

The sixth GUI 2516 may include at least one of the first threshold UI 2516a for receiving a user input of setting the first threshold as a reference value of a use frequency for determining the replacement target text, the second threshold UI 2516b for receiving a user input of setting the second threshold as a reference value of a similarity for obtaining the replacement text, or the third threshold UI 2516c for receiving a user input of setting the third threshold as a reference value of the number of training text candidates that are to be used as input data to train the NLU model. The first threshold UI 2516a, the second threshold UI 2516b, and the third threshold UI 2516c have been described above with reference to FIG. 18, and thus redundant descriptions thereof may be omitted below. For example, when the sixth GUI 2516 is a UI for setting the first threshold for a word use frequency in the dictionary DB 1370 for determining the replacement target text, only 'pepperoni' from the input text may be determined as the replacement target text or all of 'pepperoni', 'three', and 'Eonju-ro 30-gil' may be determined as the replacement target texts, according to settings of the first threshold.

According to an embodiment, the new sentence list GUI 2518 may include a list 2518a and a selection option GUI 2518b. The list 2518a includes the one or more training text candidates. According to an embodiment, the processor 2200 of the client device 2000 may receive the one or more training text candidates generated by the server 1000 from the server 1000, and may display the list 2518a including the one or more training text candidates. It is understood, however, that embodiments are not limited thereto, and the processor 2200 may generate the one or more training text candidates by identifying the replacement target text from the input text and replacing the identified replacement target text with the replacement text. The processor 2200 of the client device 2000 may display the list 2518a including autonomously-generated one or more training text candidates on the display 2510.

The selection option GUI 2518b may be a GUI for receiving an input for selecting at least one from among the one or more training text candidates. The processor 2200 may receive, from the developer, an input of selecting at least one from the one or more training text candidates through the selection option GUI 2518b.

According to the embodiment of FIG. 20, the client device 2000 may display the list 2518a including three first through third training text candidates of "Deliver 3 pepparoni pizzas to Eonju-ro 30-gil", "Deliver 3 papperoni pizzas to Eonju-ro 30-gil", and "Deliver 3 papporoni pizzas to Eonju-ro 30-gil" through the new sentence list GUI 2518, and may receive from the developer an input of selecting the first training text candidate of "Deliver 3 pepparoni pizzas to Eonju-ro 30-gil" and the second training text candidate of "Deliver 3 pepporoni pizzas to Eonju-ro 30-gil" through the selection option GUI 2518b.

Figure 21:
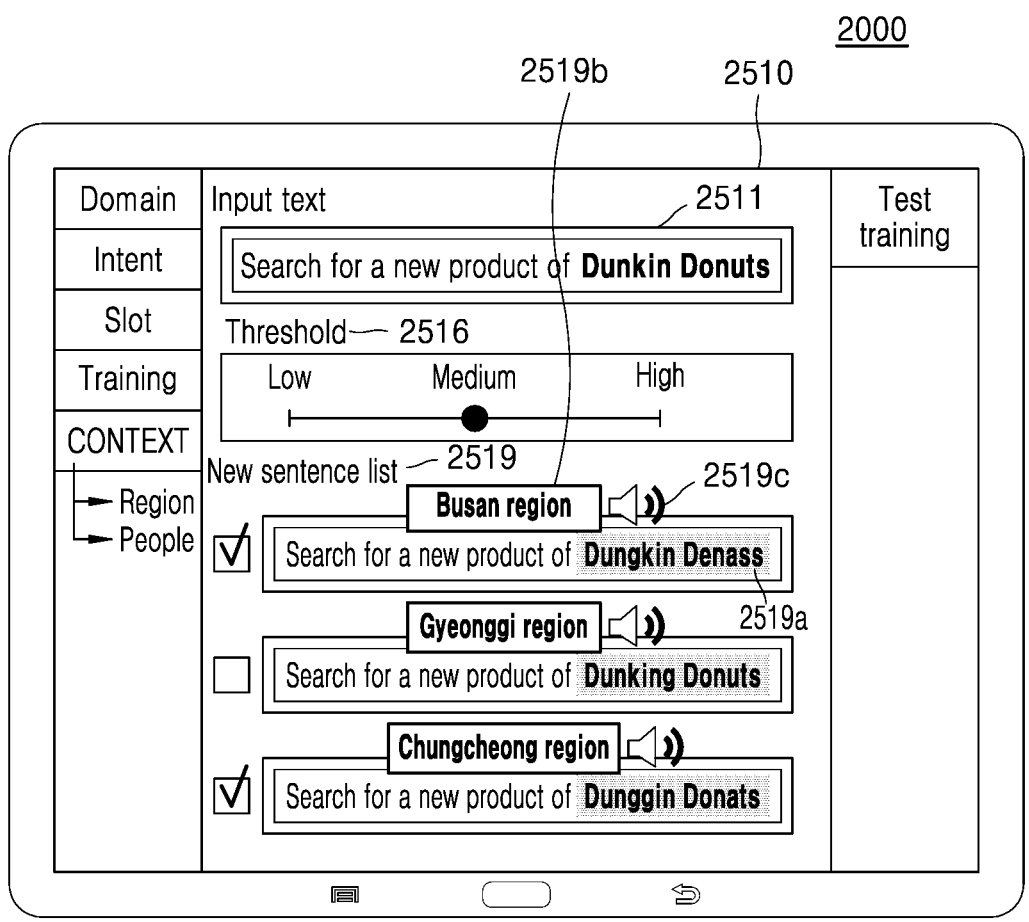
FIG. 21 illustrates an example in which a client device according to an embodiment displays a GUI.

FIG. 21 illustrates an example in which the client device 2000 displays a GUI according to an embodiment.

Referring to FIG. 21, the client device 2000 may display the first GUI 2511, the sixth GUI 2516, and a new sentence list GUI 2519 on the display 2510. The processor 220 of the client device 2000 may receive an input text from a developer through the first GUI 2511. The processor 2200 may display the sixth GUI 2516 for receiving a user input for setting a threshold, on the display 2510, and may receive the threshold from the developer through the sixth GUI 2516. The processor 2200 may display a list including one or more training text candidates, through the new sentence list GUI 2519.

The sixth GUI 2516 may include at least one of the first threshold UI 2516a for receiving a user input of setting the first threshold as a reference value of a use frequency for determining the replacement target text, the second threshold UI 2516b for receiving a user input of setting the second threshold as a reference value of a similarity for obtaining the replacement text, or the third threshold UI 2516c for receiving a user input for setting the third threshold as a reference value of the number of training text candidates that are to be used as input data to train the NLU model. The first threshold UI 2516a, the second threshold UI 2516b, and the third threshold UI 2516c have been described above with reference to FIG. 18, and thus redundant descriptions thereof may be omitted below.

According to an embodiment, the new sentence list GUI 2519 may include a replacement text GUI 2519a, a context GUI 2519b, and an audio output GUI 2519c. The replacement text GUI 2519a displays replacement texts that replace a replacement target text detected from the input text or selected. The replacement text GUI 2519a may display the replacement texts of the training text candidate such that each of the replacement texts is distinguished from other words or phrases of the training text candidate. For example, the replacement text GUI 2519a may visually distinguish each replacement text from the other words or phrases of the training text candidate, by displaying the color of the replacement text differently from the other words or phrases, displaying the replacement text in bold, displaying the replacement text using a different font from the other words or phrase, or highlighting the replacement text. According to the embodiment of FIG. 21, "Dungkin Denass", "Dunking Donuts", and "Dunggin Donats", which are replacement texts, may be displayed with yellow highlighting, in contrast to the other words.

The context GUI 2519b may display context information that is considered to generate the replacement texts. The context information may include, for example, at least one of the age, the gender, the region, the used language, or the dialect of the application user. According to the embodiment of FIG. 21, the context GUI 2519b may represent information about the region of the application user that has been considered to generate the replacement text. For example, because 'Dungkin Denass' from the replacement texts is a Busan region dialect, the context information is a Busan region that is a use region of the application user, and the context GUI 2519b may display information 'Busan region'.

The audio output GUI 2519c is configured to convert the replacement texts into wave signals and output the wave signals by using a TTS model. According to an embodiment, the client device 2000 may select a personalized TTS model, based on the context information, and may convert the replacement texts into the wave signals by using the selected personalized TTS model. For example, when the context information is a Busan region or a Busan region dialect, the client device 2000 may convert 'Dungkin Denass' into a wave signal by using a personalized TTS model trained by recording a Busan region dialect, and may output the wave signal.

FIG. 22 is a block diagram of a language understanding service 3000 according to an embodiment.

Referring to FIG. 22, the language understanding service 3000 may include an ASR model 3100, an NLU model 3200, a dialog manager 3300, and a response generator 3400. The language understanding service 3000 of FIG. 22 may be pre-stored in the memory 1300 of the server 1000 of FIG. 2, but embodiments of the disclosure are not limited thereto. All or some of the components of the language understanding service 3000 may be pre-stored in the memory 2300 of FIG. 3 of the client device 2000.

An application 3500 may be configured to interoperate with the language understanding service 3000. According to an embodiment, the application 3500 may include a natural user interface (NUI) for interoperating with the language understanding service 3000. A combination of nonverbal aspects representing a natural language dialog and an intent through the application 3500, for example, a gesture, a touch, staring, an image, or video, may be used for interaction with the language understanding service 3000. According to an embodiment, the language understanding service 3000 may be configured to dialog with a user by receiving a speech input such as an utterance of the user through the application 3500 and understanding and responding to the received speech input.

The ASR model 3100 converts the speech input of the user received through the application 3500 into a text. The ASR model 3100 may provide the text to the NLU model 3200.

Although the text is provided to the NLU model 3200 by the ASR model 3100 in FIG. 22, it is understood that embodiments are not limited thereto. According to another embodiment, the language understanding service 3000 may include an input interface that receives a different type of user input other than the speech input and provides the received user input to the NLU model 3200. The input interface may receive at least one of a touch input, a gesture input, or a text input of the user received from an application, and provide text information corresponding to the received input to the NLU model 3200.

The NLU model 3200 is configured to interpret or analyze the text obtained from the ASR model 3100. The NLU model 3200 may be an AI model trained to detect a domain and an intent from the text and identify information about a slot, by tagging the text and performing semantic analysis. The NLU model 3200 may be a model trained through the embodiments described with reference to FIGS. 2 through 16. According to an embodiment, the NLU model 3200 may be a model generated or updated as a result of identifying the one or more replacement target texts from the input text, generating replacement texts predicted to be uttered for the one or more replacement target texts by the user and having a phonetic similarity to the one or more replacement target texts, generating the one or more training text candidates by replacing the one or more replacement target texts with the replacement texts, and performing training by using the input text and the one or more training text candidates.

The NLU model 3200 may provide information about the domain, intent, and slot detected from the text to the dialog manager 3300.

The language understanding service 3000 may further include a text normalizer module (or text normalizer). The text normalizer module may include a rule table that receives a replacement text within a training text candidate and outputs a replacement target text that is the original text of the replacement text. For example, when an input text is "Search for a new product of Dunkin Donuts", a replacement target text identified from the input text is 'Dunkin Donuts', and replacement texts are 'Dungkin Denass', 'Dunking Donuts', and 'Dunggin Donats', the text normalizer module may include a rule table that defines 'Dungkin Denass', 'Dunking Donuts', and 'Dunggin Donats', which are the replacement texts, as an input text, and 'Dunkin Donuts', which is the replacement target text, as an output text, as in Table 2 below.

TABLE 2

| Input | Output |
|---|---|
| Dungkin Denass | Dunkin Donuts |
| Dunking Donuts | Dunkin Donuts |
| Dunggin Donats | Dunkin Donuts |

According to an embodiment, the text normalizer module may be arranged between the NLU model 3200 and the dialog manager 3300. The NLU model 3200 may provide slot information of the replacement text and the replacement target text to the text normalizer module, and the text normalizer module may output the replacement target text, which is the original text of the replacement text, and may provide the replacement target text to the dialog manager 3300.

It is understood, however, that embodiments are not limited thereto, and the text normalizer module may provide the replacement target text to the response generator 3400.

Even when 'Dungkin Denass', 'Dunking Donuts', and 'Dunggin Donats' are input through the text normalizer module, because 'Dunkin Donuts', which is the original text, is output, the dialog manager 3300 may determine a machine action for 'Dunkin Donuts', which is the original text.

According to an embodiment, the text normalizer module may be stored in a third party server other than the language understanding service 3000.

The dialog manager 3300 is configured to manage a dialog by determining a response action of responding to an intent and a slot output by the NLU model 3200. According to an embodiment, the dialog manager 3300 may determine a machine action of responding to the intent and the slot of the obtained text, based on a predefined question-response pair.

The response generator 3400 determines a response that is to be provided to the user, and outputs the determined response. According to an embodiment, the response generator 3400 may include a natural language generator (NLG) and a TTS model.

According to an embodiment, the response generator 3400 may determine the type of a response to be output, based on the characteristics of the application 3500 or the characteristics of a device that drives the application 3500. For example, when the application 3500 receives a text response, the response generator 3400 may generate a response text by the NLG, and provide the response text in a text form to the application 3500. When the application 3500 is driven through a device having an audio output function, for example, an AI speaker, the response generator 3400 may convert the response text into an audio signal and output the audio signal by using the TTS model.

In contrast with related art speech assistant services, the language understanding service 3000 may interpret a user input by using the NLU model 3200 even when a user wrongly utters the user input during a speech command or an utterance or inaccurately pronounces the user input due to not accurately knowing names, and may output a response message by using the dialog manager 3300 and the response generator 3400.

According to an embodiment, the NLU model 3200 of the language understanding service 3000 may be trained using context information including at least one of the age, gender, region, used language, or dialect of the user. For example, when the NLU model 3200 is a model trained by reflecting the context information of a user who uses a Busan region dialect and the user inputs a speech command of "Search for a new product of Dungkin Denass" through the application 3500, the language understanding service 3000 may detect an intent of 'Product search' and a slot of 'Dunkin Donuts' from the speech command by interpreting the speech command by using the NLU model 3200, and may output a result of searching for a new product of Dunkin Donuts by using the dialog manager 3300 and the response generator 3400.

In related art speech assistant services, the meaning of 'Dungkin Denass' is not accurately recognized, and thus a message of "Say that again" may be output. However, according to an embodiment, the language understanding service 3000 may accurately ascertain an utterance intention of the user and personalized context information, thereby improving satisfaction of usage and providing an advanced User eXperience (UX).

A program executed by the server 1000 or client device 2000 described above may be implemented as a hardware component, a software component, and/or a combination of hardware components and software components. The program can be executed by any system capable of executing computer-readable instructions.

The software may include a computer program, a code, instructions, or a combination of one or more of the foregoing, and may configure a processing device so that the processing device can operate as desired, or may independently or collectively give instructions to the processing device.

The software may be implemented as a computer program including instructions stored in computer-readable storage media. Examples of the computer-readable recording media include magnetic storage media (e.g., read-only memory (ROM), random-access memory (RAM), floppy disks, hard disks, etc.), and optical recording media, (e.g., compact disc-ROM (CD-ROM) and digital versatile discs (DVDs)). The computer-readable recording media can also be distributed over network coupled computer systems so that the computer-readable code is stored and executed in a distributive manner. This media can be read by a computer, stored in a memory, and executed by a processor.

The computer-readable storage media may be provided as non-transitory storage media. Here, 'non-transitory' means that a storage medium does not include a signal and is tangible, but does not include distinguish whether data is stored semi-permanently or temporarily in the storage medium.

Also, programs according to embodiments may be provided by being included in a computer program product. The computer program product may be traded as a commodity between a seller and a purchaser.

The computer program product may include a software program and a computer-readable storage medium having the software program stored thereon. For example, the computer program product may include a product in the form of a software program (e.g., a downloadable app) that is electronically distributed through the manufacturer of a device or an electronic market (e.g., GOOGLE PLAY STORE or APPSTORE). For electronic distribution, at least a portion of the software program may be stored on a storage medium or may be created temporarily. In this case, the storage medium may be a server of a manufacturer, a server of an electronic market, or a storage medium of a relay server for temporarily storing a software program.

The computer program product may include, in a system including the server 1000 and the client device 2000, a storage medium of the server 1000 or a storage medium of the client device 2000. Alternatively, if there is a third device (e.g., a smartphone) in communication with the server 1000 or client device 2000, the computer program product may include a storage medium of the third device. Alternatively, the computer program product may include the software program itself transmitted from the server 1000 to the device or the third device, or transmitted from the third device to the device.

In this case, one of the server 1000, the client device 2000, and the third device may execute the computer program product to perform the methods according to embodiments. Alternatively, at least two of the server 1000, the client device 2000, and the third device may execute the computer program product to distribute and perform the methods according to the disclosed embodiments.

For example, the server 1000 may execute a computer program product stored in the memory 1300 of FIG. 2 to control the client device 2000 communicating with the server 1000 to perform the methods according to the disclosed embodiments.

As another example, the third device may execute a computer program product to control a device in communication with the third device to perform the methods according to the disclosed embodiments.

When the third device executes the computer program product, the third device may download the computer program product from the server 1000 and execute the downloaded computer program product. Alternatively, the third device may execute a computer program product provided in a preloaded state to perform the methods according to the disclosed embodiments.

While embodiments have been particularly shown and described with reference to examples thereof, it will be understood by those of ordinary skill in the art that various changes in form and details may be made therein without departing from the spirit and scope of the disclosure as defined by at least the following claims. For example, an appropriate result may be attained even when the above-described techniques are performed in a different order from the above-described methods, and/or components, such as the above-described computer system or module are coupled or combined in a different form from the above-described methods or substituted for or replaced by other components or equivalents thereof.

What is claimed is:

1. A method, performed by a server, of training a language model by using a text, the method comprising:
    receiving, from a client device, an input text input by a user;
    identifying a replacement target text to be replaced from among one or more words included in the input text;
    generating a replacement text that is predicted to be uttered for the identified replacement target text by the user and has a phonetic similarity with the identified replacement target text;
    generating one or more training text candidates by replacing, within the input text, the replacement target text with the generated replacement text; and
    training a natural language understanding (NLU) model by using the input text and the one or more training text candidates as training data
    wherein the generating of the replacement text comprises:
        converting the replacement target text into a custom wave signal by using a personalized text-to-speech (TTS) model, wherein the personalized TTS model is an artificial intelligence model trained to generate a wave signal from a text by reflecting personalized characteristics including at least one of age, gender, region, dialect, intonation, and pronunciation of the user;
        outputting the custom wave signal; and
        generating the replacement text by converting the custom wave signal into an output text using an automatic speech recognition (ASR) model.

2. The method of claim 1, wherein the identifying the replacement target text comprises:
    receiving, from the client device, a user input of selecting at least one word or phrase from the input text;
    identifying, from the input text, the selected at least one word or phrase; and
    determining the identified at least one word or phrase as the replacement target text.

3. The method of claim 1, wherein the identifying the replacement target text comprises:
    parsing the received input text in units of words, morphemes, and phrases;
    searching for at least one parsed word in a dictionary database (DB) including phoneme sequence information about a plurality of words or information about an embedding vector; and
    determining, based on a result of the searching the dictionary DB, a word not found in the dictionary DB or having a lower use frequency than a preset threshold as the replacement target text.

4. The method of claim 1, wherein the identifying the replacement target text comprises:
    detecting a domain into which the input text is classified, by interpreting the input text by using a pre-trained NLU model;
    detecting an intent from the input text by interpreting the input text by using the pre-trained NLU model;
    identifying a slot from the input text by interpreting the input text by using the pre-trained NLU model, and performing slot tagging; and
    determining a text corresponding to the identified slot as the replacement target text.

5. The method of claim 4, wherein the generating the one or more training text candidates comprises determining the generated replacement text to have a same slot as the slot identified from the input text.

6. The method of claim 1, wherein the generating the replacement text comprises:
    extracting a phoneme sequence for the replacement target text;
    searching, from among words pre-stored in a dictionary DB, for a text having a similar phoneme sequence to the extracted phoneme sequence, based on phonetic relevance of phoneme sequences; and
    generating the replacement text by using at least one text having a high similarity to the extracted phoneme sequence, based on a result of the searching.

7. The method of claim 1, wherein the training the NLU model comprises:
    transmitting the input text and the one or more training text candidates to the client device;
    receiving, from the client device, an identification (ID) value of at least one text selected, according to a user input, from among the input text and the one or more training text candidates;
    selecting, based on the received ID value, at least one text from the input text and the one or more training text candidates; and
    training the NLU model by using the selected at least one text as training data.

8. A server for training a language model by using a text, the server comprising:
    a communication interface configured to perform data communication with a client device;
    a memory storing a program comprising one or more instructions; and a processor configured to execute the stored one or more instructions to:

receive, from the client device through the communication interface, an input text input by a user, identify a replacement target text to be replaced from among one or more words included in the input text, generate a replacement text that is predicted to be uttered for the identified replacement target text by the user and has a phonetic similarity with the identified replacement target text, generate one or more training text candidates by replacing, within the input text, the replacement target text with the generated replacement text, and train a natural language understanding (NLU) model by using the input text and the one or more training text candidates as training data, wherein the processor is further configured to:

convert the replacement target text into a custom wave signal by using a personalized text-to-speech (TTS) model, wherein the personalized TTS model is an artificial intelligence model trained to generate a wave signal from a text by reflecting personalized characteristics including at least one of age, gender, region, dialect, intonation, and pronunciation of the user, output the custom wave signal, and generate the replacement text by converting the custom wave signal into an output text using an automatic speech recognition (ASR) model.

9. The server of claim 8, wherein the processor is further configured to execute the stored one or more instructions to:

receive, from the client device through the communication interface, a user input of selecting at least one word or phrase from the input text;

identify, from the input text, the selected at least one word or phrase, and determine the identified at least one word or phrase as the replacement target text.

10. The server of claim 8, wherein:

the memory stores a dictionary database (DB) including phoneme sequence information about a plurality of words or information about an embedding vector; and the processor is further configured to execute the stored one or more instructions to:

parse the received input text in units of words, morphemes, and phrases and search for at least one parsed word in the dictionary DB, and determine, as the replacement target text, a word not found in the dictionary DB or having a lower use frequency than a preset threshold.

11. The server of claim 8, wherein:

the memory stores at least one pre-trained NLU model; and the processor is further configured to execute the stored one or more instructions to:

detect a domain, into which the input text is classified, and an intent by interpreting the input text by using an NLU model from among the at least one pre-trained NLU model stored in the memory, identify a slot from the input text by interpreting the input text by using the pre-trained NLU model, and perform slot tagging, and determine a text corresponding to the identified slot as the replacement target text.

12. The server of claim 8, wherein the processor is further configured to execute the stored one or more instructions to:

extract a phoneme sequence for the replacement target text, and search, from among words included in a dictionary DB stored in the memory, for a text having a similar phoneme sequence to the extracted phoneme sequence, based on phonetic relevance of phoneme sequences; and generate the replacement text by using at least one text having a high similarity to the extracted phoneme sequence, based on a result of the searching.

13. The server of claim 8, wherein:

the personalized TTS model is stored in the memory.

14. The server of claim 8, wherein the processor is further configured to execute the stored one or more instructions to:

transmit the input text and the one or more training text candidates to the client device by using the communication interface, and receive, from the client device, an identification (ID) value of at least one text selected, according to a user input, from among the input text and the one or more training text candidates;

select, based on the received ID value, at least one text from the input text and the one or more training text candidates; and train the NLU model by using the selected at least one text as training data.

15. A non-transitory computer-readable recording medium having recorded thereon a computer program, which, when executed by a server, cause the server to:

receive, from the client device through the communication interface, an input text input by a user, identify a replacement target text to be replaced from among one or more words included in the input text, generate a replacement text that is predicted to be uttered for the identified replacement target text by the user and has a phonetic similarity with the identified replacement target text, generate one or more training text candidates by replacing, within the input text, the replacement target text with the generated replacement text, and train a natural language understanding (NLU) model by using the input text and the one or more training text candidates as training data, wherein the processor is further configured to:

convert the replacement target text into a custom wave signal by using a personalized text-to-speech (TTS) model, wherein the personalized TTS model is an artificial intelligence model trained to generate a wave signal from a text by reflecting personalized characteristics including at least one of age, gender, region, dialect, intonation, and pronunciation of the user, output the custom wave signal, and generate the replacement text by converting the custom wave signal into an output text using an automatic speech recognition (ASR) model.

\* \* \* \* \*